(12) United States Patent
Rakib et al.

(10) Patent No.: US 12,538,290 B2
(45) Date of Patent: *Jan. 27, 2026

(54) SPECTRAL SHARING WIRELESS SYSTEMS

(71) Applicant: Cohere Technologies, Inc., Santa Clara, CA (US)

(72) Inventors: Shlomo Selim Rakib, Santa Clara, CA (US); Ronny Hadani, Santa Clara, CA (US); Shachar Kons, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 18/004,168

(22) PCT Filed: Jun. 15, 2021

(86) PCT No.: PCT/US2021/037391
§ 371 (c)(1),
(2) Date: Jan. 3, 2023

(87) PCT Pub. No.: WO2021/257540
PCT Pub. Date: Dec. 23, 2021

(65) Prior Publication Data
US 2024/0015725 A1 Jan. 11, 2024

Related U.S. Application Data

(60) Provisional application No. 62/705,182, filed on Jun. 15, 2020.

(51) Int. Cl.
*H04W 72/121* (2023.01)
*H04B 7/0456* (2017.01)
(Continued)

(52) U.S. Cl.
CPC ........ *H04W 72/121* (2013.01); *H04B 7/0456* (2013.01); *H04L 5/14* (2013.01); *H04W 72/542* (2023.01)

(58) Field of Classification Search
CPC ...... H04B 7/0452; H04B 7/0617; H04B 7/10; H04L 25/021; H04L 25/0222;
(Continued)

(56) References Cited

U.S. PATENT DOCUMENTS 10,469,146 B1 * 11/2019 Ekbatani .............. H04B 7/0632
11,916,638 B2 * 2/2024 Kons .................... H04B 7/0456
(Continued)

FOREIGN PATENT DOCUMENTS

CN 105052176 11/2015
CN 105554899 A 5/2016

OTHER PUBLICATIONS

Extended European Search Report for co-pending EP appl. No. 21825860.6, dated Jun. 7, 2024, 6 pages.
(Continued)

*Primary Examiner* — Dung B Huynh
(74) *Attorney, Agent, or Firm* — Perkins Coie LLP

(57) ABSTRACT

Methods, systems, and devices for spectral sharing wireless systems, wherein multiple user devices share time and frequency resources for uplink and/or downlink transmissions, are described. One example wireless communication system includes a network station, and multiple user devices, wherein data transmissions over the same time and frequency resources are shared between multiple user devices, in downlink and/or uplink, using spatial user device separation that is dynamically computed by the network station, and where the network station derives spatial user device separation based on uplink channel measurements.

15 Claims, 30 Drawing Sheets

(51) Int. Cl.
*H04L 5/14* (2006.01)
*H04W 72/542* (2023.01)

(58) Field of Classification Search
CPC ............ H04L 25/0224; H04L 25/0226; H04L 25/03006; H04L 25/03343; H04L 25/4975; H04L 5/14
See application file for complete search history.

(56) References Cited

U.S. PATENT DOCUMENTS

| | | | |
|---|---|---|---|
| 2006/0285504 A1* | 12/2006 | Dong | H04B 7/0617 370/254 |
| 2008/0311939 A1* | 12/2008 | Hugl | H04B 7/0634 455/507 |
| 2009/0150746 A1* | 6/2009 | Chaichanavong | H03M 13/3746 714/752 |
| 2010/0238984 A1 | 9/2010 | Sayana et al. | |
| 2012/0009960 A1* | 1/2012 | Baldemair | H04B 7/0426 455/507 |
| 2012/0039419 A1* | 2/2012 | Maddah-Ali | H04L 25/03343 375/340 |
| 2012/0087310 A1* | 4/2012 | Hui | H04W 52/346 370/328 |
| 2012/0195183 A1 | 8/2012 | Nuzman et al. | |
| 2012/0258729 A1* | 10/2012 | Siomina | G01S 5/08 455/456.1 |
| 2013/0114763 A1* | 5/2013 | Park | H04B 7/0469 375/296 |
| 2013/0177094 A1* | 7/2013 | Jongren | H04L 27/20 375/267 |
| 2013/0265960 A1* | 10/2013 | Wang | H04B 7/0617 370/328 |
| 2013/0322280 A1* | 12/2013 | Pi | H04W 56/0005 370/252 |
| 2014/0023154 A1 | 1/2014 | Rajagopal et al. | |
| 2014/0045510 A1* | 2/2014 | Yue | H04L 1/0077 455/450 |
| 2014/0334564 A1* | 11/2014 | Singh | H04B 7/0413 375/267 |
| 2015/0063254 A1* | 3/2015 | Yue | H04B 7/0465 375/267 |
| 2015/0365143 A1* | 12/2015 | Chai | H04B 7/0452 455/101 |
| 2016/0088648 A1* | 3/2016 | Xue | H04L 1/0026 370/252 |
| 2016/0156397 A1* | 6/2016 | Onggosanusi | H04L 5/0048 370/252 |
| 2016/0344461 A1* | 11/2016 | Frank | H04B 7/0478 |
| 2016/0353271 A1* | 12/2016 | Stephenne | H04W 8/005 |
| 2017/0127296 A1* | 5/2017 | Gustafsson | H04B 7/0413 |
| 2017/0141823 A1* | 5/2017 | Fodor | H04B 7/0404 |
| 2017/0201300 A1* | 7/2017 | Parkvall | H04L 5/0051 |
| 2017/0264346 A1* | 9/2017 | Yue | H04B 7/0417 |
| 2017/0302346 A1* | 10/2017 | Jeong | H04B 7/0626 |
| 2017/0310376 A1* | 10/2017 | Järmyr | H04B 7/0456 |
| 2017/0318150 A1* | 11/2017 | Tsiaflakis | H04L 1/0009 |
| 2018/0019795 A1* | 1/2018 | Zhang | H04B 7/0486 |
| 2018/0041258 A1* | 2/2018 | Tong | H04B 7/0632 |
| 2018/0048363 A1* | 2/2018 | Okuyama | H04B 7/0456 |
| 2018/0077595 A1* | 3/2018 | Park | H04L 5/0055 |
| 2018/0109305 A1* | 4/2018 | Obara | H04B 7/0695 |
| 2018/0242327 A1* | 8/2018 | Frenne | H04L 5/0062 |
| 2018/0287687 A1* | 10/2018 | Wu | G01S 3/043 |
| 2018/0295631 A1* | 10/2018 | Fröberg Olsson | H04B 7/0634 |
| 2018/0323846 A1* | 11/2018 | Tsai | H04B 7/0617 |
| 2018/0324730 A1* | 11/2018 | Lee | H04J 11/0069 |
| 2018/0331859 A1* | 11/2018 | Kim | H04L 25/03343 |
| 2018/0337717 A1* | 11/2018 | Nasiri Khormuji | H04B 7/0421 |
| 2018/0375554 A1* | 12/2018 | Faxér | H04W 52/36 |
| 2019/0037548 A1* | 1/2019 | Costa | H04L 5/0053 |
| 2019/0097700 A1* | 3/2019 | Zhu | H04L 1/0003 |
| 2019/0181928 A1* | 6/2019 | Pan | H04B 7/02 |
| 2019/0190569 A1* | 6/2019 | Nayeb Nazar | H04B 7/0452 |
| 2019/0260459 A1* | 8/2019 | Jeon | H04B 7/088 |
| 2019/0280757 A1 | 9/2019 | Yang et al. | |
| 2019/0296809 A1* | 9/2019 | Li | H04W 72/20 |
| 2019/0357159 A1* | 11/2019 | Pan | H04L 1/1861 |
| 2019/0393931 A1* | 12/2019 | Huang | H04B 7/0689 |
| 2020/0007247 A1* | 1/2020 | Gulati | H04L 1/0003 |
| 2020/0028558 A1* | 1/2020 | Yerramalli | H04B 7/0417 |
| 2020/0177249 A1* | 6/2020 | Ramireddy | H04B 7/0673 |
| 2020/0358509 A1* | 11/2020 | Wernersson | H04L 5/0051 |
| 2020/0389214 A1* | 12/2020 | De Carvalho | H04B 7/0686 |
| 2021/0036745 A1* | 2/2021 | Wu | H04B 7/0658 |
| 2021/0036901 A1* | 2/2021 | Robinson | H04L 9/001 |
| 2021/0083735 A1* | 3/2021 | Sundararajan | H04B 7/0456 |
| 2021/0111767 A1* | 4/2021 | Benjebbour | H04W 16/28 |
| 2021/0127408 A1* | 4/2021 | Huang | H04W 72/1268 |
| 2021/0175951 A1* | 6/2021 | Hao | H04B 7/0632 |
| 2021/0212123 A1* | 7/2021 | Reial | H04B 7/0617 |
| 2021/0258049 A1* | 8/2021 | Esswie | H04W 72/1263 |
| 2021/0328633 A1* | 10/2021 | Perlman | H04B 15/00 |
| 2021/0337568 A1* | 10/2021 | Xu | H04W 72/0453 |
| 2021/0359828 A1* | 11/2021 | Levitsky | H04L 25/0222 |
| 2022/0123800 A1* | 4/2022 | Li | H04L 5/0091 |
| 2022/0123971 A1* | 4/2022 | Malek-Mohammadi | H04L 25/0224 |
| 2022/0174609 A1* | 6/2022 | Kang | H04W 52/42 |
| 2022/0210676 A1* | 6/2022 | Chen | H04B 17/24 |
| 2022/0311489 A1* | 9/2022 | Rakib | H04B 7/0452 |
| 2022/0352932 A1* | 11/2022 | Malek Mohammadi | H04B 7/0632 |
| 2022/0352933 A1* | 11/2022 | Rakib | H04L 5/0023 |
| 2022/0360307 A1* | 11/2022 | Matsumura | H04L 1/08 |
| 2022/0417965 A1* | 12/2022 | Wang | H04B 7/0456 |
| 2023/0013510 A1* | 1/2023 | Ge | H04L 5/0094 |
| 2023/0052449 A1* | 2/2023 | Yuan | H04B 7/0404 |
| 2023/0062132 A1* | 3/2023 | Wu | H04W 74/0808 |
| 2023/0109687 A1* | 4/2023 | Frank | H04B 7/0465 375/267 |
| 2023/0361842 A1* | 11/2023 | Hajri | H04B 7/0639 |

OTHER PUBLICATIONS

International Search Report and Written Opinion for PCT/US2021/037391, dated Nov. 15, 2021, 18 pages.

CNIPA, First Office Action for Chinese Application No. 202180042766.4, mailed on Jun. 19, 2025, 21 pages with unofficial English translation.

Office Action for co-pending CN appl. No. 202180042766.4, dated Jun. 19, 2024, 20 pages with Google translation.

* cited by examiner

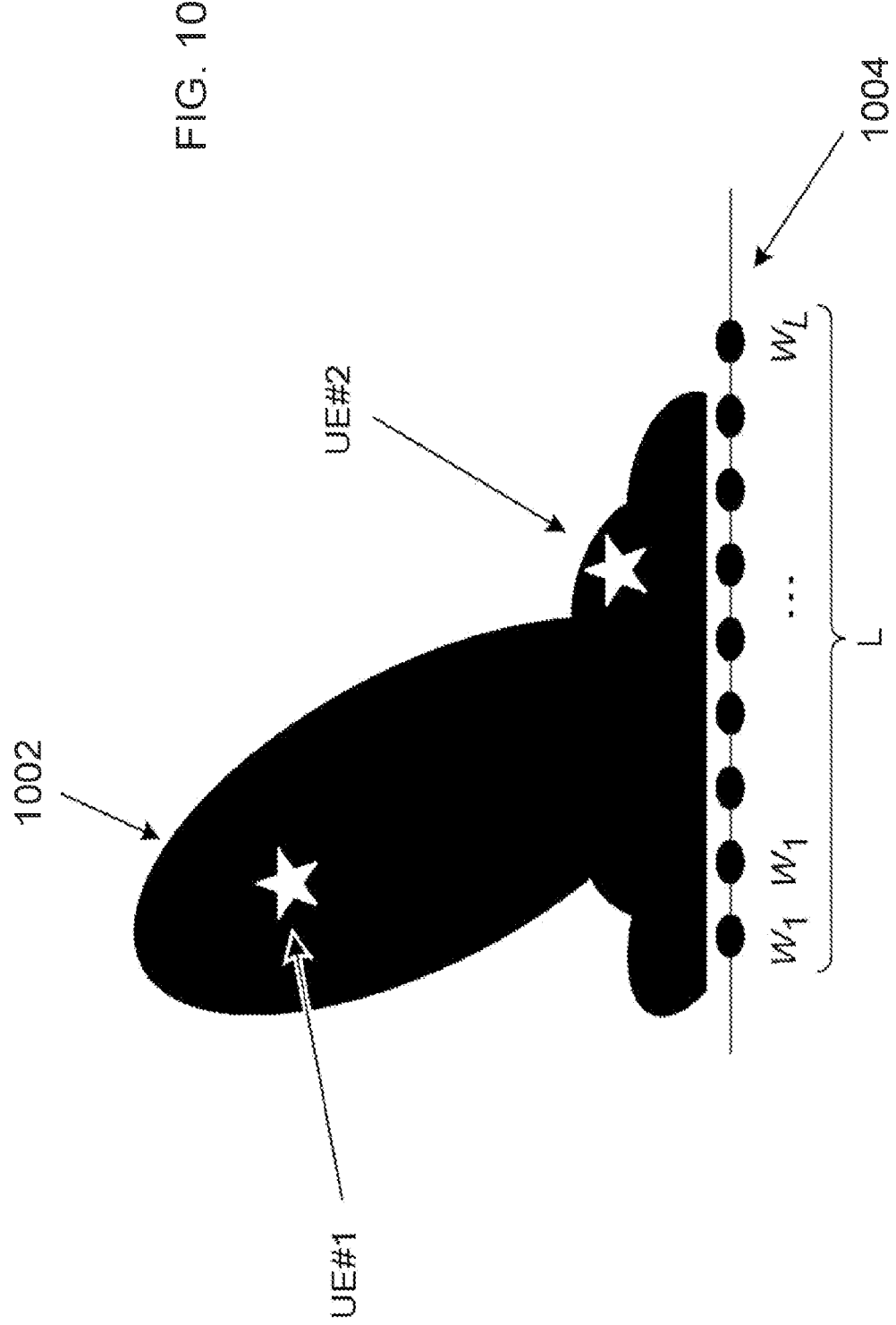

|    | 1     | 2     | 3     | 4     | 5     | 6     | 7     | 8     | 9     | 10    | 11    | 12    | 13    | 14    |
|----|-------|-------|-------|-------|-------|-------|-------|-------|-------|-------|-------|-------|-------|-------|
| 1  | PDCCH | PDCCH | PDSCH | PDSCH | PDSCH | PDSCH | PDSCH | PDSCH | PDSCH | CRS   | PDSCH | PDSCH | PDSCH | PDSCH |
| 2  | CRS   | PDSCH | PDSCH | CRS   | PDSCH | PDSCH | CRS   | PDSCH | PDSCH | PDSCH | PDSCH | PDSCH | CRS   | PDSCH |
| 3  | PDCCH | PDCCH | PDSCH | PDSCH | PDSCH | PDSCH | PDSCH | PDSCH | PDSCH | PDSCH | PDSCH | PDSCH | PDSCH | PDSCH |
| 4  | PDCCH | PDCCH | PDSCH | PDSCH | PDSCH | PDSCH | PDSCH | PDSCH | PDSCH | PDSCH | PDSCH | PDSCH | PDSCH | PDSCH |
| 5  | PDCCH | PDCCH | PDSCH | CRS   | PDSCH | PDSCH | CRS   | PDSCH | PDSCH | CRS   | PDSCH | PDSCH | CRS   | PDSCH |
| 6  | CRS   | PDCCH | PDSCH | PDSCH | PDSCH | PDSCH | PDSCH | PDSCH | PDSCH | PDSCH | PDSCH | PDSCH | PDSCH | PDSCH |
| 7  | PDCCH | PDCCH | PDSCH | PDSCH | PDSCH | PDSCH | PDSCH | PDSCH | PDSCH | PDSCH | PDSCH | PDSCH | PDSCH | PDSCH |
| 8  | PBCH  | PBCH  | PBCH  | PBCH  | PBCH  | PBCH  | PBCH  | PBCH  | PBCH  | PBCH  | PBCH  | PBCH  | PBCH  | PBCH  |
| 9  | PBCH  | PBCH  | PBCH  | PBCH  | PBCH  | PBCH  | PBCH  | PBCH  | PBCH  | PBCH  | PBCH  | PBCH  | PBCH  | PBCH  |
| 10 | ⋮     | ⋮     | ⋮     | ⋮     | ⋮     | ⋮     | ⋮     | ⋮     | ⋮     | ⋮     | ⋮     | ⋮     | ⋮     | ⋮     |
| 11 | PBCH  | PBCH  | PBCH  | PBCH  | PBCH  | PBCH  | PBCH  | PBCH  | PBCH  | PBCH  | PBCH  | PBCH  | PBCH  | PBCH  |
| 12 | PBCH  | PBCH  | PBCH  | PBCH  | PBCH  | PBCH  | PBCH  | PBCH  | PBCH  | PBCH  | PBCH  | PBCH  | PBCH  | PBCH  |
| 13 | PDSCH | PDSCH | PDSCH | PDSCH | PDSCH | PDSCH | PDSCH | PDSCH | PDSCH | PDSCH | PDSCH | PDSCH | PDSCH | PDSCH |
| 14 | ⋮     | ⋮     | ⋮     | ⋮     | ⋮     | ⋮     | ⋮     | ⋮     | ⋮     | ⋮     | ⋮     | ⋮     | ⋮     | ⋮     |
| 15 | PDSCH | PDSCH | PDSCH | PDSCH | PDSCH | PDSCH | PDSCH | PDSCH | PDSCH | PDSCH | PDSCH | PDSCH | PDSCH | PDSCH |
| 16 | PDSCH | DMRS  | PDSCH | CRS   | PDSCH | PDSCH | CRS   | PDSCH | DMRS  | CRS   | PDSCH | PDSCH | CRS   | PDSCH |
| 17 | CRS   | PDSCH | PDSCH | PDSCH | PDSCH | DMRS  | PDSCH | PDSCH | PDSCH | PDSCH | PDSCH | DMRS  | PDSCH | PDSCH |
| 18 | PDSCH | PDSCH | PDSCH | PDSCH | PDSCH | PDSCH | PDSCH | PDSCH | PDSCH | PDSCH | PDSCH | PDSCH | PDSCH | PDSCH |
| 19 | PDSCH | DMRS  | PDSCH | CRS   | PDSCH | DMRS  | CRS   | PDSCH | DMRS  | CRS   | PDSCH | DMRS  | CRS   | PDSCH |
| 20 | PDSCH | PDSCH | PDSCH | PDSCH | PDSCH | PDSCH | PDSCH | PDSCH | PDSCH | PDSCH | PDSCH | PDSCH | PDSCH | PDSCH |
| 21 | CRS   | PDSCH | PDSCH | CRS   | PDSCH | PDSCH | CRS   | PDSCH | PDSCH | CRS   | PDSCH | PDSCH | CRS   | PDSCH |
| 22 | PDSCH | PDSCH | PDSCH | PDSCH | PDSCH | PDSCH | PDSCH | PDSCH | PDSCH | PDSCH | PDSCH | PDSCH | PDSCH | PDSCH |

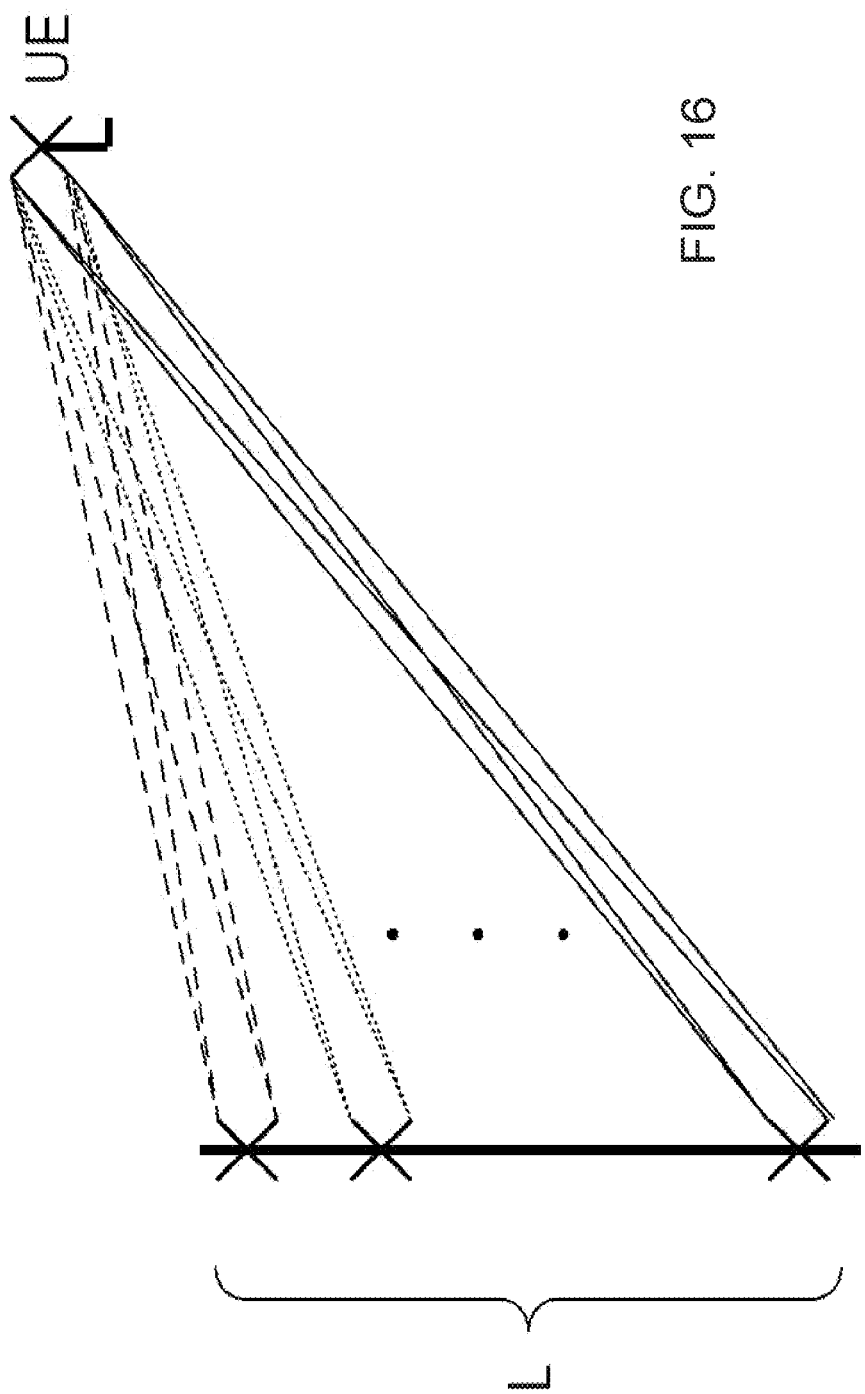

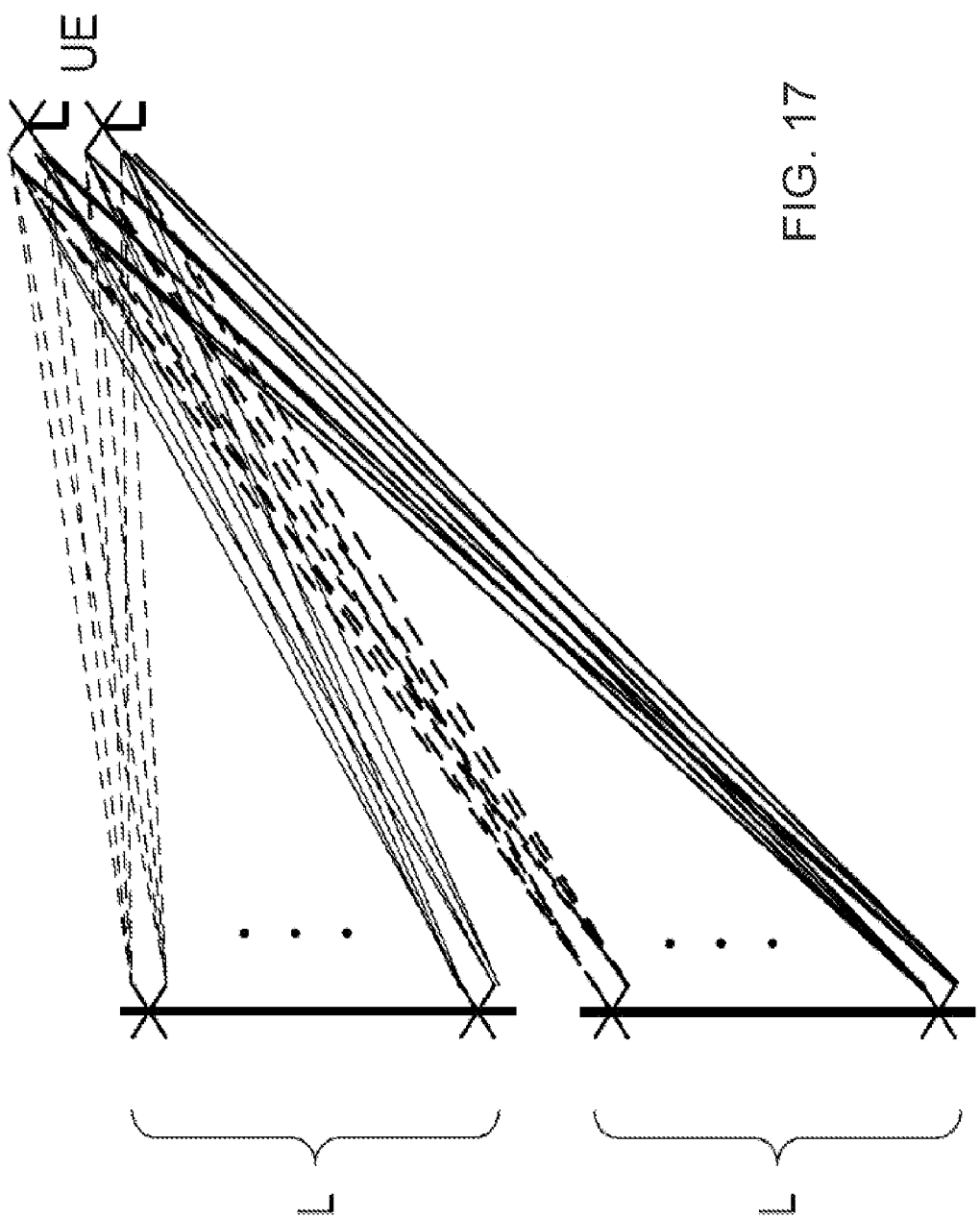

1900

1910 — Determining, by a first wireless device, a second wireless device specific first precoder used for precoding transmissions, the first precoder being determined to match a second precoder at a specific angular sector, and the first precoder being determined based on channel measurements of transmissions from the second wireless device to the first wireless device

FIG. 19 though a 371 National Phase Application of PCT Application No. PCT/US2021/037391 entitled "SPECTRAL SHARING WIRELESS SYSTEMS" filed on Jun. 15, 2021, which claims priority to and benefits of U.S. Provisional Application No. 62/705,182, filed on Jun. 15, 2020, the disclosure of which is hereby incorporated by reference herein in its entirety.

SPECTRAL SHARING WIRELESS SYSTEMS

CROSS-REFERENCE TO RELATED APPLICATIONS

The present document is a 371 National Phase Application of PCT Application No. PCT/US2021/037391 entitled "SPECTRAL SHARING WIRELESS SYSTEMS" filed on Jun. 15, 2021, which claims priority to and benefits of U.S. Provisional Application No. 62/705,182, filed on Jun. 15, 2020, the disclosure of which is hereby incorporated by reference herein in its entirety.

TECHNICAL FIELD

The present document relates to wireless communication.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks. Many of those activities involve situations in which a large number of user devices may be served by a network.

SUMMARY

This document discloses techniques useful for embodiments of wireless systems that share spectrum (e.g., time and frequency resources) between multiple user devices.

In one example aspect, a system for wireless communication is disclosed. The system includes a network station, and multiple user devices, wherein data transmissions over the same time and frequency resources are shared between multiple user devices, in downlink and/or uplink, using spatial user device separation that is dynamically computed by the network station, and wherein the network station derives spatial user device separation based on uplink channel measurements.

In another example aspect, a method of wireless communication is disclosed. The method, implemented by a network station in a wireless system comprising the network station and multiple user devices, includes transmitting transmission symbols from the network station to at least one user device by processing through a first precoder and a pre-compensation stage, wherein the pre-compensation stage is selected to have the transmission symbols receivable at the at least one user device to appear as if the transmission symbols are processed by a second precoder different from the first precoder.

In yet another example aspect, a method of wireless communication is disclosed. The method includes determining, by a first wireless device, a second wireless device specific first precoder used for precoding transmissions, wherein the first precoder is determined to match a second precoder at a specific angular sector, and wherein the first precoder is determined based on channel measurements of transmissions from the second wireless device to the first wireless device.

In yet another example aspect, a method of wireless communication is disclosed. The method includes determining a user device-specific precoder to apply to signal transmissions from a network station to a user device, and transmitting a stream of data symbols by precoding with the user device-specific precoder, to the user device, wherein the user device-specific precoder is unknown to the user device, and wherein the stream of symbols is without reference signals for receiver-side channel equalization.

In yet another example aspect, a method of wireless communication is disclosed. The method includes determining, by a network station, based on measurements made on one or more uplink signals received on an uplink channel, a first precoder, determining a second precoder by performing a scaling operation on the first precoder by a scale factor, and performing a downlink transmission on a downlink channel using the second precoder, wherein the downlink channel and the uplink channel are frequency division duplexed.

In yet another example aspect, a method of wireless communication is disclosed. The method includes determining, by a network station operating in a frequency division duplexed wireless system, a spatial covariance matrix based on measurements made on an uplink signal received on an uplink channel from a user device, and performing a downlink transmission on a downlink channel by precoding using a precoder corresponding to a scaled version of the spatial covariance matrix.

In yet another example aspect, a method of wireless communication is disclosed. The method includes determining, based on transmissions received from multiple user devices, angles of arrivals (AOA) corresponding to the multiple user devices, grouping, based on the AOA of the multiple user devices, the multiple user devices into groups of devices, and scheduling subsequent transmissions in the wireless system such that same time and frequency resources are used for transmissions to or from user devices in a same group, wherein the subsequent transmissions to or from the multiple user devices use a precoder or a postcoder that is entirely determined based on the transmissions received from the multiple user devices.

In yet another example aspect, a method of wireless communication is disclosed. The method, implemented by a network station of a wireless system, includes receiving a signal comprising uplink transmissions from multiple user devices, wherein the uplink transmissions share same time and frequency resource elements, and splitting the received signal into parallel independent data streams by dynamically applying user device-specific postcoders to the received signal, wherein the user device-specific postcoders are angular filters that are fully determined from uplink measurements and are designed to angularly filter for desired user transmission in each parallel independent data streams and reject other interfering transmissions.

In yet another example aspect, a method of wireless communication is disclosed. The method, implemented by a network station of a wireless system, includes applying, to parallel independent data streams corresponding to multiple user devices, user device-specific precoders, combining a result of the applying to generate a signal for transmission by sharing the same time and frequency resources, and transmitting the signal on a downlink channel to multiple user devices, wherein the user device-specific precoders are angular filters that are fully determined from uplink measurements and designed to minimize interference to other users.

In yet another example aspect, a method of wireless communication is disclosed. The method includes determining, by a network station, precodings to be used for transmissions to multiple user devices in a wireless coverage area of the network station, wherein the transmissions to the multiple user devices comprise use of a multi-carrier modulation scheme, and wherein, for each user device, the corresponding precoding is identical across all carriers of the multi-carrier modulation scheme, and generating one or more transmission waveforms for transmission to one or more of the multiple user devices by processing according to the precodings.

In yet another example aspect, a wireless communication apparatus that implements the above-described methods is disclosed.

In yet another example aspect, the methods may be embodied as processor-executable code and may be stored on a computer-readable program medium.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

FIG. 10 shows an example of a user-specific precoder.

FIGS. 11A and 11B show tabular representations of examples of sharing downlink and uplink physical channels, respectively.

FIG. 16 shows a dual polarization link example.

FIG. 17 shows an example with two antenna arrays, with each antenna array having L dual polarization antennas.

FIGS. 18-26 are flowcharts for example methods of wireless communication.

DETAILED DESCRIPTION

Figure 1A:
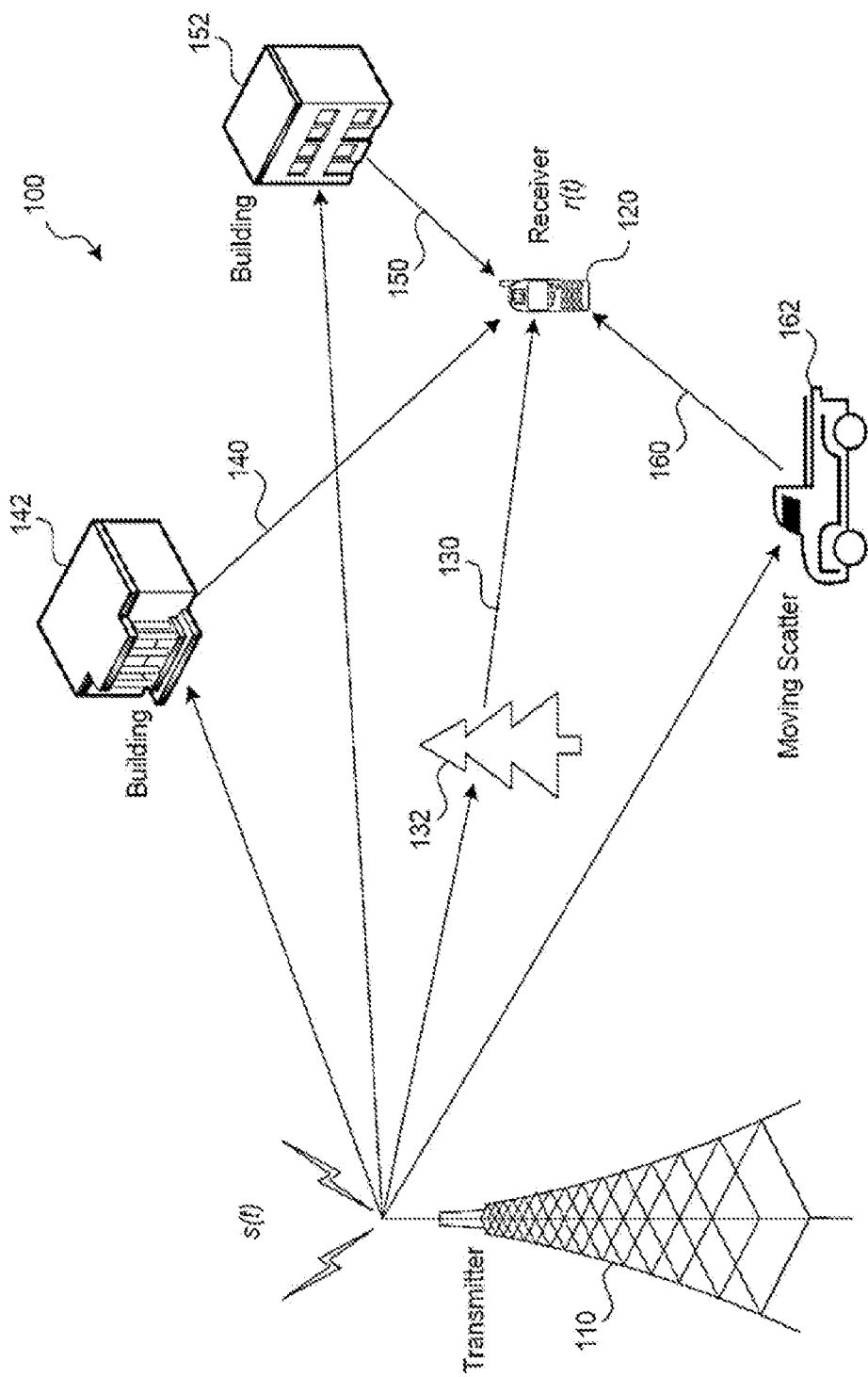
FIG. 1A shows an example of a mobile wireless network.

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document, including the appendices, to improve readability of the description and do not in any way limit the discussion to the respective sections only. The terms "hub" and user equipment/device are used to refer to the transmitting side apparatus and the receiving side apparatus of a transmission, and each may take the form of a base station, a relay node, an access point, a small-cell access point, user equipment, and so on.

In the description, the example of a fixed wireless access (FWA) system is used only for illustrative purpose and the disclosed techniques can apply to other wireless networks.

While some descriptions here refer to FWA systems with orthogonal time frequency space (OTFS) as modulation/multiple access format, the techniques developed are suitable for other modulation/multiple access formats as well, in particular orthogonal frequency division multiplexing (OFDM) or OFDM-Access (OFDMA).

1. Brief Introduction

Cellular wireless service providers have begun planning and deployment of next generation networks to support deployment of denser deployments of higher bandwidth user devices. Furthermore, the ever-increasing reliance on wireless connectivity has raised users' expectations of Quality of Service and seamless availability of wireless connectivity everywhere.

Cloud Radio Access Network (C-RAN) is one example of a network architecture in which a centralized cloud-based access network provides wireless connectivity to wireless terminals. However, C-RAN deployments rely on expensive deployments of fiber optic infrastructure to connect base stations with each other and with a central network controller. Furthermore, such an architecture requires planning, and deployments can be relatively slow due to the labor and resources required to lay down fiber. As a result, C-RAN and similar solutions are expensive, and cannot be quickly deployed (or taken down) to meet short term increase in demand of wireless services. Furthermore, when such an deployment reaches its maximum capacity, incremental deployment is often not possible without having to significantly alter the existing infrastructure.

The techniques described in the present document can be used in wireless network embodiments to overcome such problems. In one example aspect, network nodes may be deployed using short range, high speed mmwave links. Such installations have minimal footprint and power requirements and can be deployed and taken down to quickly meet time and geography-specific demand for wireless services.

In another beneficial aspect, the present technology may be used to deploy networks that provide short links between base stations, or network nodes, thereby providing reduced latency, jitter and fronthaul traffic loading in wireless networks.

In another beneficial aspect, the disclosed techniques may be used to manage a soft handover whereby a user equipment (UE) and N neighboring Base stations (typically N=3) constitute a cooperative multi-point (COMP) service zone.

In another beneficial aspect, embodiments may benefit from increased network performance without any change or replacement of existing antennas on towers, e.g., does require setting new mmwave links or computing platforms. The inventor's rough calculations have shown that it may be possible for embodiments to increase network capacity by at least a factor of two and at least 5 db Signal to Interference and Noise Ratio (SINR) improvement.

Some embodiments of the disclosed distributed COMP technology may be used to address both intra-cell and inter-cell interference, or alternatively inter-sector interference and cell edge poor coverage, using a computer platform that processes jointly all three sectors of all towers in a cluster. One advantage is that the physical front end, e.g., antennas on tower, may not have to be changed, and yet the techniques may be embodied for boosting performance.

As further described in the present document, in some embodiments, distributed COMP may include groups of cell towers in which all cell towers carry the functionality of a Remote Radio Head (RRH) while one of them carry the computation for the cluster and is connected to the network for TCP/IP traffic. In other words, there is no need for a fronthaul to the network. Cluster formation may be performed using one of the techniques described in the present document. A cluster takes advantage of shared resource management and load balancing.

Embodiments of the disclosed technology can be implemented in example systems, as shown in FIGS. 1A, 1B, 1C and 1D.

FIG. 1A shows an example of a mobile wireless network 100. In this simplified drawing, a wireless terminal 102 is provided wireless connectivity by a network-side node 104. The wireless terminal 102 may be, for example, a smartphone, a tablet, an Internet of Things (IoT) device, a smartwatch, etc. The network node 104 may be a base station that establishes and operates a cell of wireless communication. The communication channel between the wireless terminal 102 and the node 104 may include reflectors such as buildings, trees, moving objects such as vehicles that tend to distort signal transmissions to and from the wireless terminal 102. During operation, the wireless terminal 102 may move away from the node 104 and may have to be handed over to or share connectivity with another network node (not explicitly shown in the drawing). In some cases, the network node 104 may cooperatively operate with other nodes to provide a multi-point transmission/reception to the wireless terminal 102 such that the mobility of the wireless terminal 102 does not hamper connectivity with the wireless services.

Figure 1B:
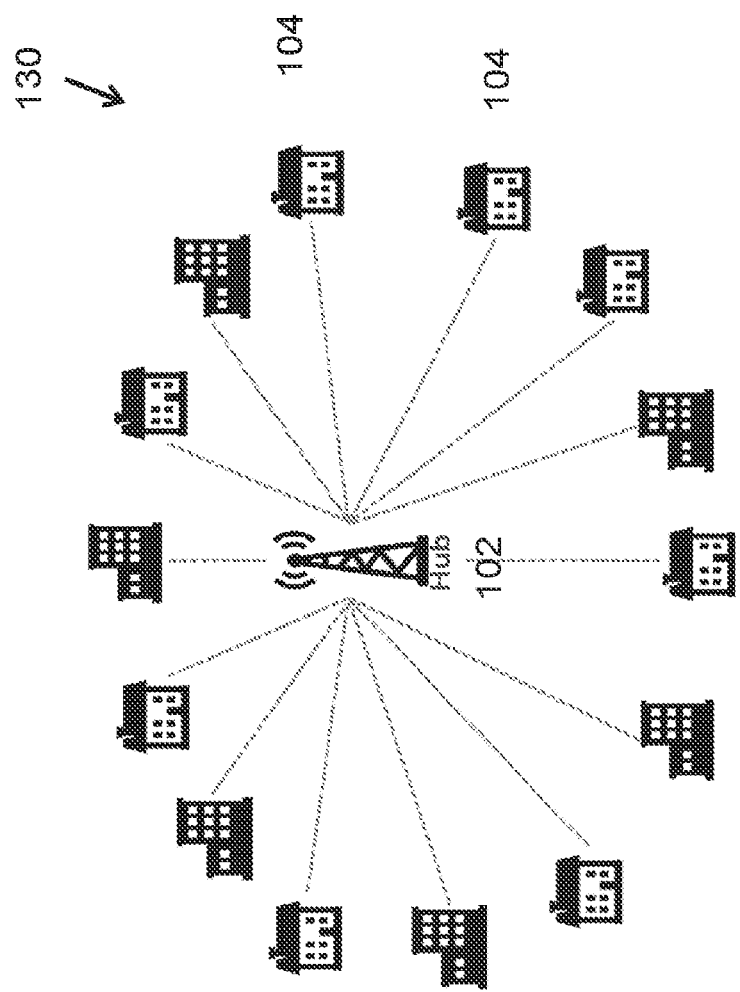
FIG. 1B shows an example of a fixed wireless access network.

FIG. 1B shows an example of a fixed wireless access system 130. A hub 102, that includes a transmission facility such as a cell tower, is configured to send and receive transmissions to/from multiple locations 104. For example, the locations could be user premises or business buildings. As described throughout this document, the disclosed embodiments can achieve very high cell capacity fixed wireless access, when compared to traditional fixed access technology. Some techniques disclosed herein can be embodied in implementations at the hub 102 or at transceiver apparatus located at the locations 104.

Figure 1C:
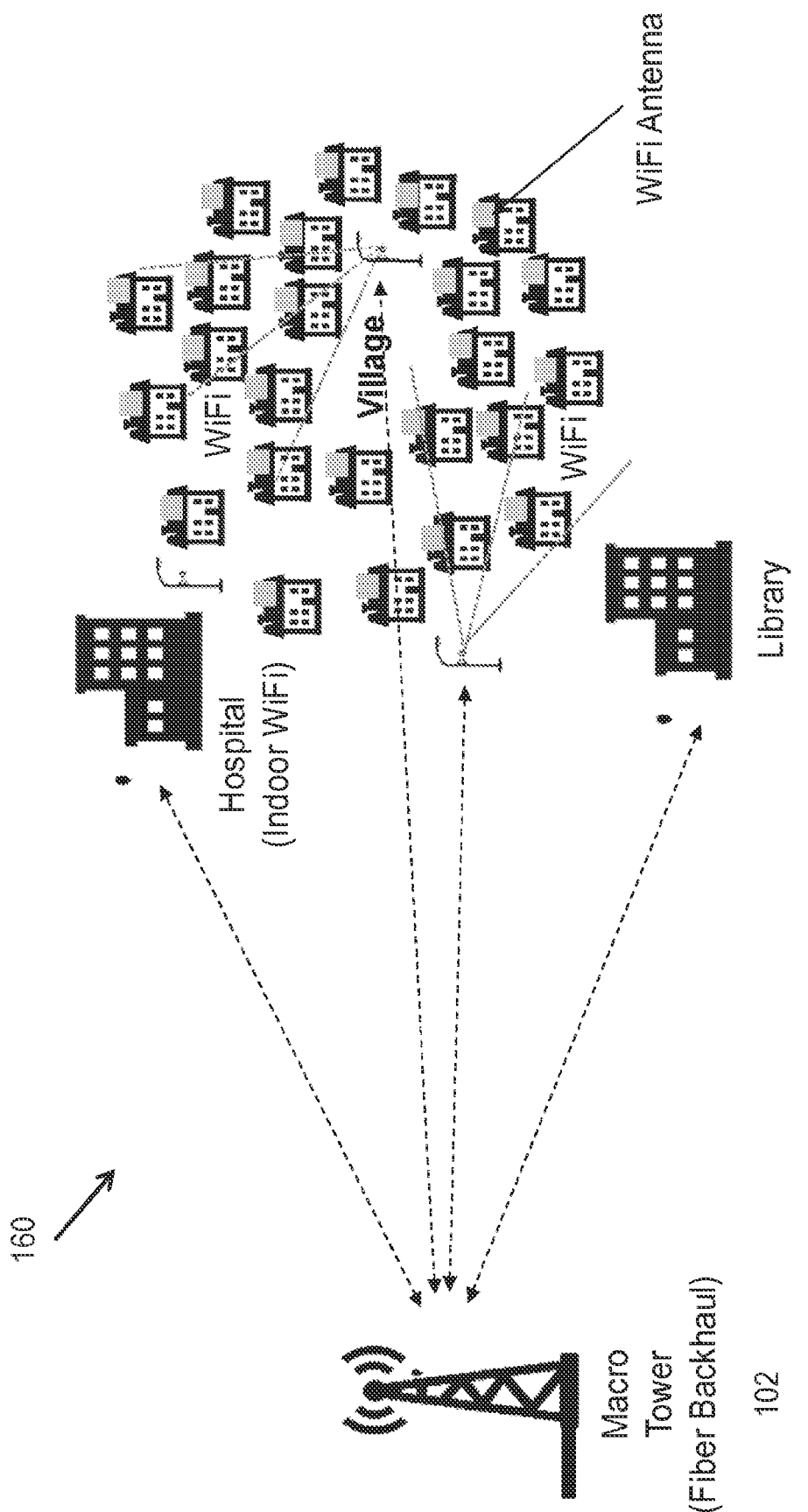
FIG. 1C shows another example of a fixed wireless access network.

FIG. 1C shows yet another configuration of a fixed access wireless communication system 160 in which hops are used to reach users. For example, one cell tower may transmit/receive from another cell tower, which would then relay the transmissions between the principle cell tower and the users, thus extending range of the fixed wireless access system. A backhaul may connect the transmission tower 102 with an aggregation router. For example, in one configuration, a 10 Gbps fiber connection may be used to feed data between a base station at a hub and a fiber hub aggregation router. In one advantageous aspect, deployment of this technology can be achieved without having to change any network bandwidth characteristics for harder to reach areas by using the hub/home access point (AP) configuration as a launch point. Some techniques disclosed herein can be embodied in implementations at the macro tower 102 or at transceiver apparatus located at the other locations.

Figure 1D:
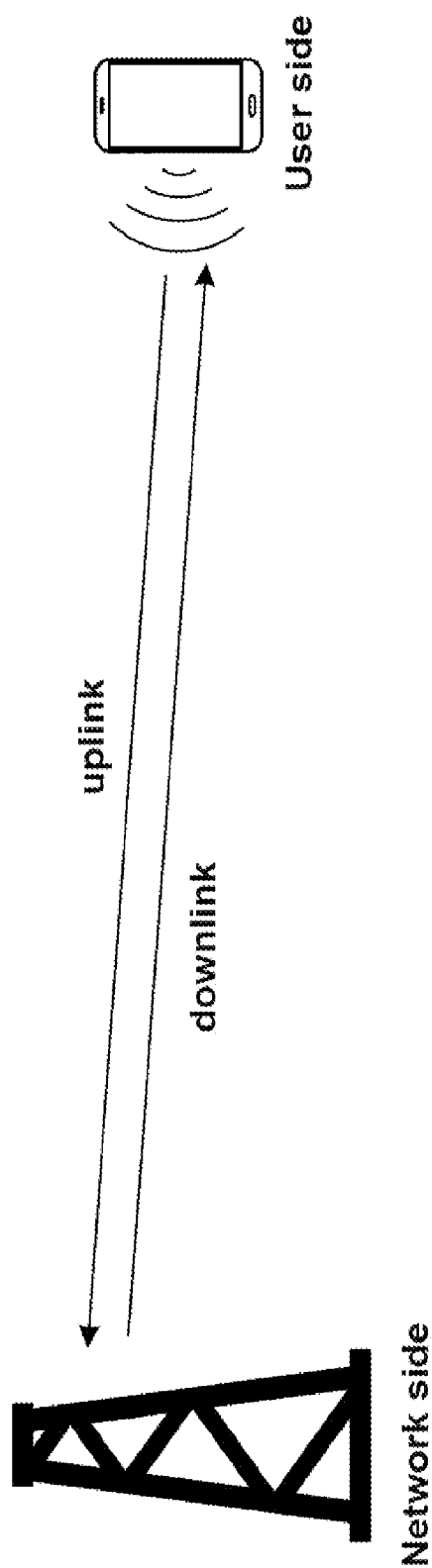
FIG. 1D shows an example of a simplified wireless network.

FIG. 1D shows a simplified wireless network to highlight certain aspects of the disclosed technology. A transmitter transmits wireless signals to a receiver in the wireless network. Some transmissions in the network, variously called as downlink or downstream transmissions, a network-side node such as a base station acts as a transmitter of wireless signals and one or more user devices act as the receiver of these wireless signals. For some other transmissions, as depicted in FIG. 1D, the direction of transmission may reversed. Such transmissions are often called uplink or upstream transmissions. For such transmissions, one or more user devices act as transmitters of the wireless signals and a network-side node such as the base station acts as the receiver of these signals (as depicted in FIG. 1D). Other type of transmissions in the network may include device-to-device transmissions, sometimes called direct or sideband transmissions. While the present document primarily uses the terms "downlink" and "uplink" for the sake of convenience, similar techniques may also be used for other situations in which transmissions in two directions are performed—e.g., inbound or incoming transmissions that are received by a wireless device and outbound or outgoing transmissions that are transmitted by a wireless device. For example, downlink transmissions may be inbound transmissions for a user device, while outbound transmissions for a network device. Similarly, uplink transmission may be inbound transmissions for a network device while outbound transmissions from a wireless device. Therefore, for some embodiments, the disclosed techniques may also be described using terms such as "inbound" and "outbound" transmission without importing any 3GPP-specific or other wireless protocol-specific meaning to the terms "uplink" and "downlink."

In some embodiments, the base-station has L physical antennas. These antennas may be arranged as a linear antenna array or in any other configuration. A spatial precoder (or shortly a precoder), is a complex vector of L elements, providing different weights to the emitted/received signal of the different antennas, thus spatially shaping the wave-front of the resulting signal. The spatial shaping (or precoding) is orthogonal to the time and frequency dimensions. Meaning that, for different frequency and time resources, different precoders may be applied. This is further detailed in Section 6.

In frequency division multiplexing (FDM) networks, the transmissions to a base station and the transmissions from the base station may occupy different frequency bands (each of which may occupy continuous or discontinuous spectrum). In time division multiplexing (TDM) networks, the transmissions to a base station and the transmissions from the base station occupy a same frequency band but are separated in time domain using a TDM mechanism such as time slot based transmissions. Other types of multiplexing are also possible (e.g., code division multiplexing, orthogonal time frequency space (OTFS) multiplexing, spatial multiplexing, etc.). In general, the various multiplexing schemes can be combined with each other. For example, in spatially multiplexed systems, transmissions to and from two different user devices may be isolated from each other using directional or orientational difference between the two end points (e.g., the user devices and a network station such as a base station).

Embodiments of the disclosed technology provide various improvements to the operation of wireless networks and equipment, including:

1) Accurate channel prediction on same band or on a different adjacent band based on instantaneous measurements over a limited band and over a short period of time, as described in Section 2.
2) Use of predicted channel state information. For example, Section 2 describes certain techniques for predicting channels at different time instances, frequencies and spatial positions, and Sections 3-5 describe certain techniques for reciprocal calibration and estimation.
3) Using the same time and frequency resources to support the transmission of multiple streams of information to multiple devices, as described in Section 6.

2. Channel Estimation for OTFS Systems

Figure 2:
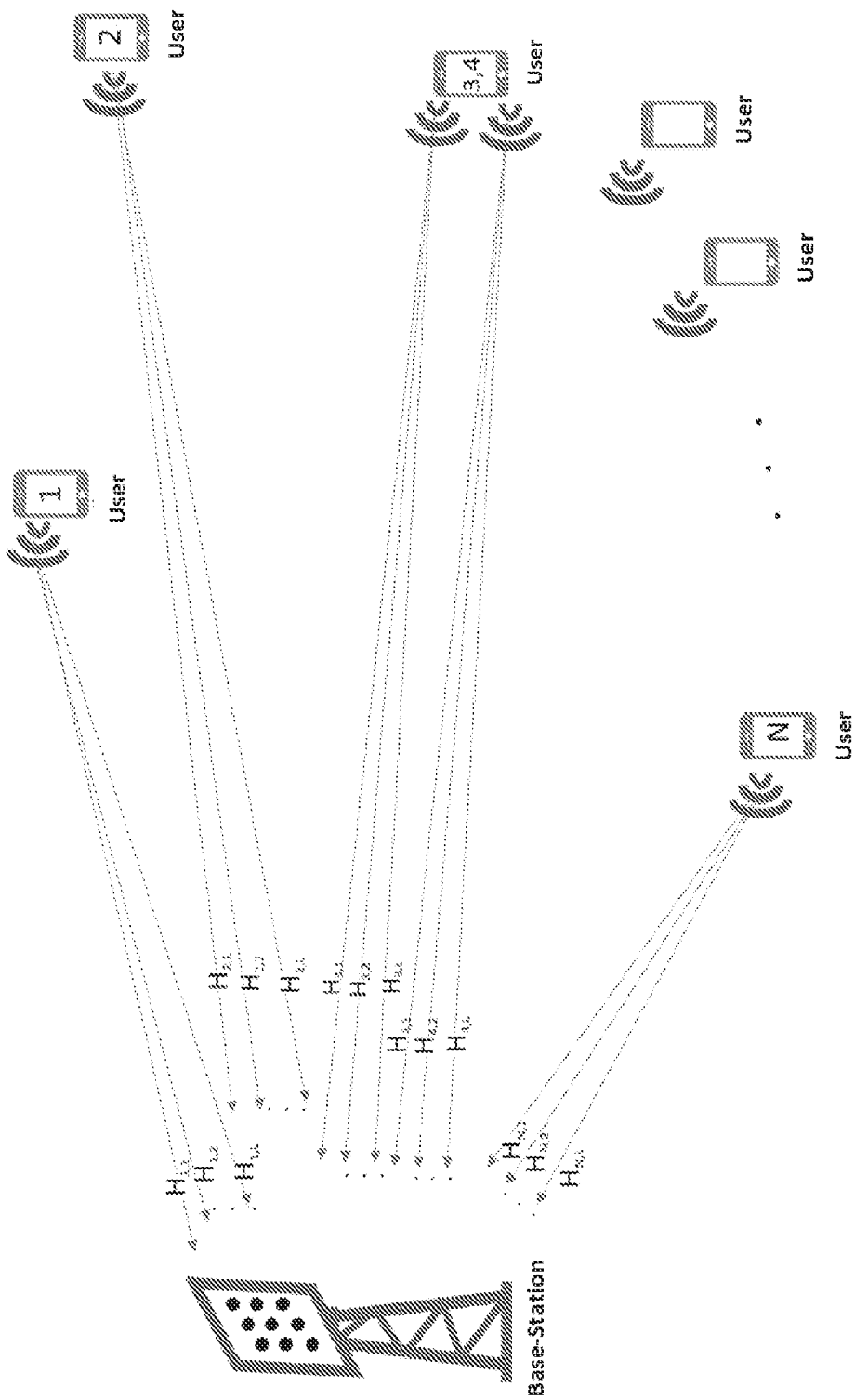
FIG. 2 shows an example of a wireless system including a base station with L antennas and multiple users.

This section overviews channel estimation for OTFS systems, and in particular, aspects of channel estimation and scheduling for a massive number of users. A wireless system, with a multi-antenna base-station and multiple user antennas, is shown in FIG. 2. Each transmission from a user antenna to one of the base-station antennas (or vice versa), experiences a different channel response (assuming the antennas are physically separated enough). For efficient communication, the base-station improves the users' received Signal-to-Interference-Noise-Ratio (SINR) by means of precoding. However, to precode, the base-station needs to have an accurate estimation of the downlink channels to the users during the transmission time.

In some embodiments, and when the channels are not static and when the number of users is very large, some of the challenges of such a precoded system include:

Accurately and efficiently estimating all the required channels

Predicting the changes in the channels during the downlink transmission time.

Typical solutions in systems, which assume a low number of users and static channels, are to let each user transmit known pilot symbols (reference signals) from each one of its antennas. These pilots are received by all the base-station antennas and used to estimate the channel. It is important that these pilot symbols do not experience significant interference, so that the channel estimation quality is high. For this reason, they are typically sent in an orthogonal way to other transmissions at the same time. There are different methods for packing multiple pilots in an orthogonal (or nearly-orthogonal) way, but these methods are usually limited by the number of pilots that can be packed together (depending on the channel conditions) without causing significant interference to each other. Therefore, it becomes very difficult to have an efficient system, when the number of user antennas is high and the channels are not static. The amount of transmission resources that is needed for uplink pilots may take a considerable amount of the system's capacity or even make it unimplementable. For prediction of the channel, it is typically assumed that the channel is completely static and will not change from the time it was estimated till the end of the downlink transmission. This assumption usually causes significant degradation in non-static channels.

It is assumed that the downlink and uplink channels are reciprocal and after calibration it is possible to compensate for the difference in the uplink-downlink and downlink-uplink channel responses. Some example embodiments of the calibration process using reciprocity are further discussed in Section 2.

Embodiments of the disclosed technology include a system and a method for packing and separating multiple non-orthogonal pilots, as well as a method for channel prediction. In such a system, it is possible to pack together a considerably higher number of pilots comparing to other commonly used methods, thus allowing an accurate prediction of the channel for precoding.

2.1 Second-Order Training Statistics

The system consists of a preliminary training step, in which all users send uplink orthogonal pilots to the base-station. Although these pilots are orthogonal, they may be sent at a very low rate (such as one every second) and therefore do not overload the system too much. The base-station receives a multiple of $N_{SOS}$ such transmissions of these pilots, and use them to compute the second-order statistics (covariance) of each channel.

Figure 3:
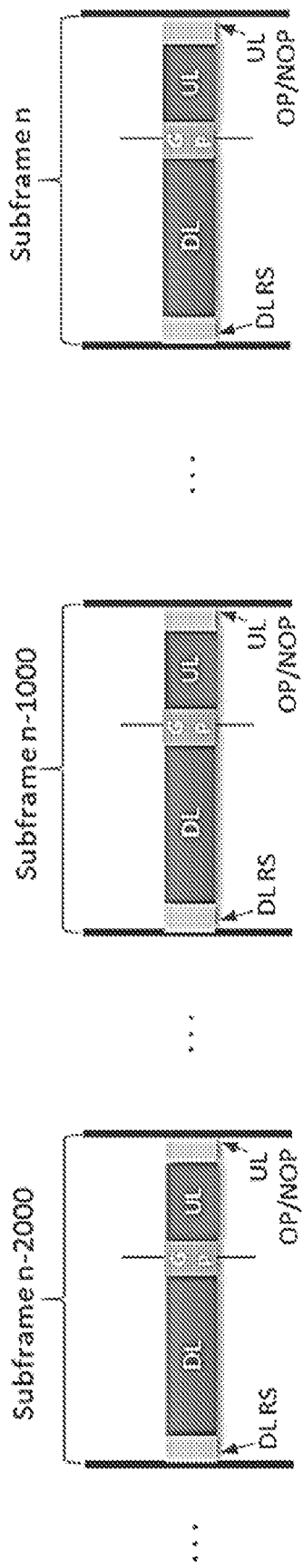
FIG. 3 shows an example of a subframe structure that can be used to compute second-order statistics for training.

FIG. 3 shows an example of such a system, where a subframe of length 1 msec consists of a downlink portion (DL), a guard period (GP) and an uplink portion (UL). Some of the uplink portion is dedicated to orthogonal pilots (OP) and non-orthogonal pilots (NOP). Each specific user is scheduled to send on these resources its pilots every 1000 subframes, which are equivalent to 1 sec. After the reception of $N_{SOS}$ subframes with pilots (equivalent to $N_{SOS}$ seconds), the base-station will compute the second-order statistics of this channel.

The computation of the second-order statistics for a user antenna u is defined as:

For each received subframe i=1,2, . . . , $N_{SOS}$ with orthogonal pilots and for each one of the L base-station receive antennas—estimate the channel along the entire frequency band ($N_f$ grid elements) from the pilots and store it as the i-th column of the matrix $H^{(u)}$ with dimensions ($N_f \cdot L$)×$N_{SOS}$.

Compute the covariance matrix $$R_{HH}^{(u)} = (H^{(u)})^H H^{(u)},$$

where $(\cdot)^H$ is the Hermitian operator.

For the case that the channel $H^{(u)}$ is non-zero-mean, both the mean and the covariance matrix should be determined.

To accommodate for possible future changes in the channel response, the second-order statistics may be updated later, after the training step is completed. It may be recomputed from scratch by sending again $N_{SOS}$ orthogonal pilots, or gradually updated. One possible method may be to remove the first column of $H^{(u)}$ and attach a new column at the end and then re-compute the covariance matrix again.

The interval at which these orthogonal pilots need to be repeated depends on the stationarity time of the channel, e.g., the time during which the second-order statistics stay approximately constant. This time can be chosen either to be a system-determined constant, or can be adapted to the environment. In particular, users can determine through observation of downlink broadcast pilot symbols changes in the second-order statistics, and request resources for transmission of the uplink pilots when a significant change has been observed. In another embodiment, the base-station may use the frequency of retransmission requests from the users to detect changes in the channel, and restart the process of computing the second-order statistics of the channel.

To reduce the computational load, it is possible to use principal component analysis (PCA) techniques on $$R_{HH}^{(u)}.$$

We compute $\{\lambda^{(u)}\}$, the $K^{(u)}$ most dominant eigenvalues of $$R_{HH}^{(u)},$$

arranged in a diagonal matrix $$D^{(u)} = \text{diag}(\lambda_1^{(u)}, \lambda_2^{(u)}, \ldots, \lambda_{K^{(u)}}^{(u)})$$

and their corresponding eigenvectors matrix $V^{(u)}$. Typically, $K^{(u)}$ will be in the order of the number of reflectors along the wireless path. The covariance matrix can then be approximated by $$R_{HH}^{(u)} \approx V^{(u)} \cdot D^{(u)} \cdot (V^{(u)})^H.$$

2.2 Non-Orthogonal Pilots

The non-orthogonal pilots (NOP), $P^{(u)}$, for user antenna u, may be defined as a pseudo-random sequence of known symbols and of size $N_{NOP}$, over a set of frequency grid elements. The base-station can schedule many users to transmit their non-orthogonal pilots at the same subframe using overlapping time and frequency resources. The base-station will be able to separate these pilots and obtain a high-quality channel estimation for all the users, using the method describes below.

Define the vector Y of size $(L \cdot N_{NOP}) \times 1$, as the base-station received signal over all its antennas, at the frequency grid elements of the shared non-orthogonal pilots. Let $\tilde{V}^{(u)}$ be the eigenvectors matrix $V^{(u)}$ decimated along its first dimension (frequency-space) to the locations of the non-orthogonal pilots.

The base-station may apply a Minimum-Mean-Square-Error (MMSE) estimator to separate the pilots of every user antenna:

For every user antenna u, compute $$R_{YY}^{(u)} = [\tilde{V}^{(u)} \odot P^{(u)}] \cdot D^{(u)} \cdot [\tilde{V}^{(u)} \odot P^{(u)}]^H$$

$$R_{XY}^{(u)} = \tilde{V}^{(u)} \cdot D^{(u)} \cdot [\tilde{V}^{(u)} \odot P^{(u)}]^H$$

Herein, $\odot$ is defined as the element-by-element multiplication. For a matrix A and vector B, the A$\odot$B operation includes replicating the vector B to match the size of the matrix A before applying the element-by-element multiplication.

If principal component analysis (PCA) is not used, the covariance matrices can be computed directly as:

$$R_{YY}^{(u)} = (P^{(u)}[P^{(u)}]^H) \odot R_{HH}^{(u)}$$

$$R_{XY}^{(u)} = (1[P^{(u)}]^H) \odot R_{HH}^{(u)}$$

For the set of user antennas shared on the same resources $u \in U$, compute $$R_{YY} = \sum_{u \in U} R_{YY}^{(u)}$$

and invert it. Note that it is possible to apply PCA here as well by finding the dominant eigenvalues of $R_{YY}$ ($D_{R_{YY}}$) and their corresponding eigenvectors matrix ($V_{R_{YY}}$) and approximating the inverse with $$R_{YY}^{-1} \approx V_{R_{YY}} \cdot D_{R_{YY}}^{-1} \cdot (V_{R_{YY}})^H.$$

For each user antenna u, compute the pilot separation filter $$C_P^{(u)} = R_{XY}^{(u)} \cdot R_{YY}^{-1}$$

For each user antenna u, separate its non-orthogonal pilots by computing $$H_{NOP}^{(u)} = C_P^{(u)} \cdot Y$$

Note that $$H_{NOP}^{(u)}$$

is the channel response over the frequency grid-elements of the non-orthogonal pilots for the L base-station received antennas. It may be also interpolated along frequency to obtain the channel response over the entire bandwidth.

2.3 Prediction training

Figure 4:
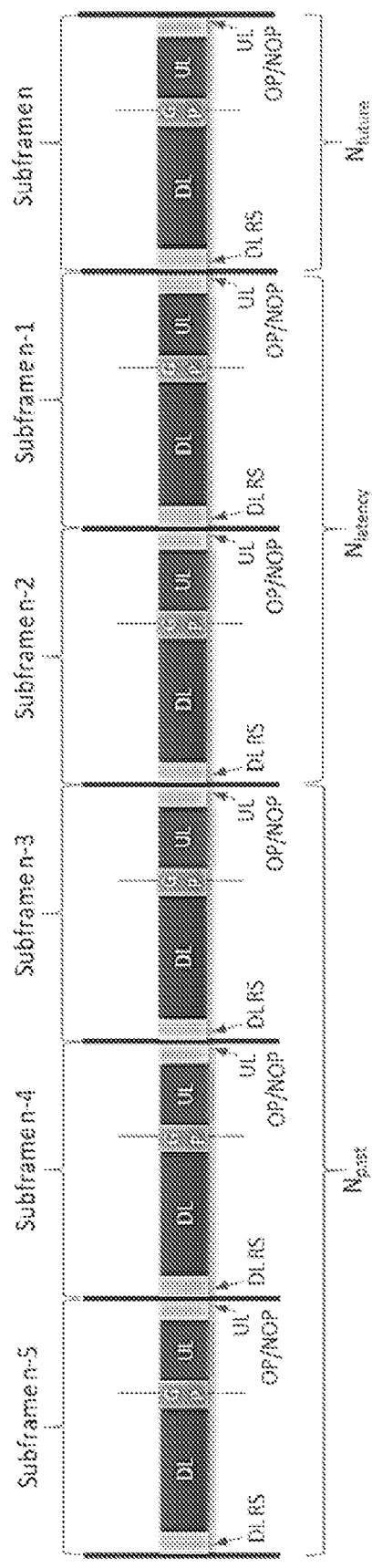
FIG. 4 shows an example of prediction training for channel estimation.

The method described in the previous section for separating non-orthogonal pilots is applied to train different users for prediction. In this step, a user sends uplink non-orthogonal pilots on consecutive subframes, which are divided to 3 different sections, as shown in the example in FIG. 4.

1. Past—the first $N_{past}$ subframes. These subframes will later be used to predict future subframes.
2. Latency—the following $N_{latency}$ subframes are used for the latency required for prediction and precoding computations.
3. Future—the last $N_{future}$ subframes (typically one), where the channel at the downlink portion will be later predicted.

Each user, is scheduled $N_{PR}$ times to send uplink non-orthogonal pilots on consecutive $N_{past}+N_{latency}+N_{future}$ subframes. Note that in one uplink symbol in the subframe, both orthogonal and non-orthogonal pilots may be packed together (although the number of orthogonal pilots will be significantly lower than the number of non-orthogonal pilots). The base-station applies the pilot separation filter for the non-orthogonal pilots of each user and computes $$H_{NOP}^{(u)}.$$

To reduce storage and computation, the channel response may be compressed using the eigenvector matrix computed in the second-order statistics step $$H_K^{(u)} = \left(\tilde{V}^{(u)}\right)^H \cdot H_{NOP}^{(u)}$$

For subframes, which are part of the "Past" section, store $$H_K^{(u)}$$

as columns in the matrix $$H_{past,(i)}^{(u)},$$

where i=1,2, . . . , $N_{PR}$. Use all or part of the non-orthogonal pilots to interpolate the channel over the whole or part of the downlink portion of the "Future" subframes, compress it using $\tilde{V}^{(u)}$ and store it as $$H_{future,(i)}^{(u)}.$$

Compute the following covariance matrices:

$$R_{past,(i)}^{(u)} = H_{past,(i)}^{(u)} \cdot \left(H_{past,(i)}^{(u)}\right)^H$$
$$R_{future,(i)}^{(u)} = H_{future,(i)}^{(u)} \cdot \left(H_{future,(i)}^{(u)}\right)^H$$
$$R_{future\_past,(i)}^{(u)} = H_{future,(i)}^{(u)} \cdot \left(H_{past,(i)}^{(u)}\right)^H$$

After all $N_{PR}$ groups of prediction training subframes have been scheduled, compute the average covariance matrices for each user $$R_{past}^{(u)} = \frac{1}{N_{PR}} \sum_{i=1}^{N_{PR}} R_{past,(i)}^{(u)}$$
$$R_{future}^{(u)} = \frac{1}{N_{PR}} \sum_{i=1}^{N_{PR}} R_{future,(i)}^{(u)}$$
$$R_{future\_past}^{(u)} = \frac{1}{N_{PR}} \sum_{i=1}^{N_{PR}} R_{future\_past,(i)}^{(u)}$$

Finally, for each user compute the MMSE prediction filter $$C_{PR}^{(u)} = R_{future\_past}^{(u)} \cdot \left(R_{past}^{(u)}\right)^{-1}$$

and its error variance for the precoder $$R_E^{(u)} = R_{future}^{(u)} - C_{PR}^{(u)} \cdot \left(R_{future\_past}^{(u)}\right)^H.$$

2.4 Scheduling a downlink Precoded Transmission

Figure 5:
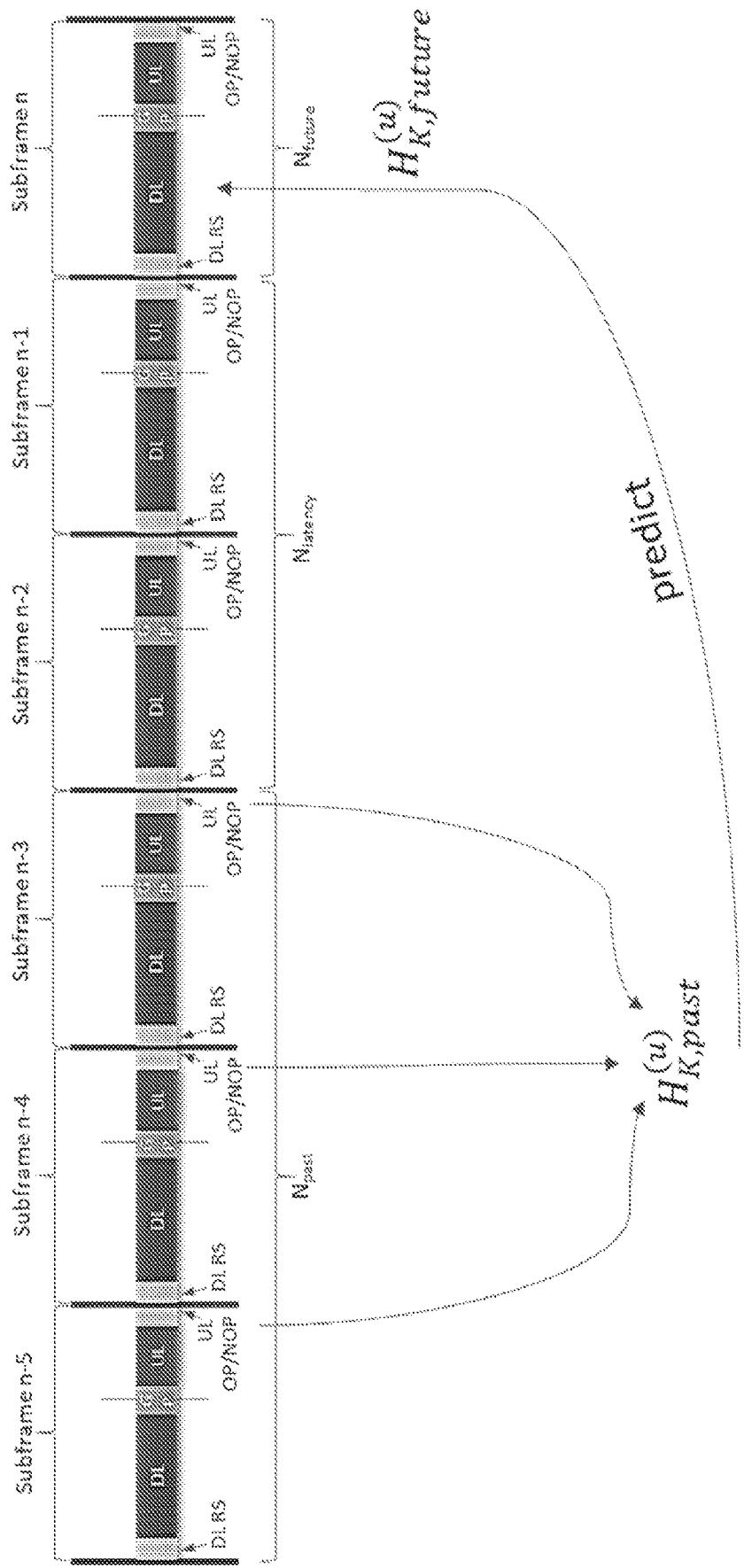
FIG. 5 shows an example of prediction for channel estimation.

For each subframe with a precoded downlink transmission, the base-station should schedule all the users of that transmission to send uplink non-orthogonal pilots for $N_{past}$ consecutive subframes, starting $N_{past}+N_{latency}$ subframes before it, as shown in FIG. 5. The base-station will separate the non-orthogonal pilots of each user, compress it and store the channel response as $$H_{K,past}^{(u)}.$$

Then, it will apply the prediction filter to get the compressed channel response for the future part $$H_{K,future}^{(u)} = C_{PR}^{(u)} \cdot H_{K,past}^{(u)}$$

Finally, the uncompressed channel response is computed as $$H_{future}^{(u)} = \tilde{V}^{(u)} \cdot H_{K,future}^{(u)}$$

The base-station may correct for differences in the reciprocal channel by applying a phase and amplitude correction, $\alpha(f)$, for each frequency grid-element $$H_{future\_reciprocity}^{(u)}(f) = \alpha(f) \cdot H_{future}^{(u)}(f)$$

Then, use $$H_{future\_reciprocity}^{(u)} \text{ and } R_E^{(u)}$$

of the participating users to compute the precoder for the downlink transmission.

2.5 Scheduling of the Uplink Pilots

If during a frame there are multiple orthogonal resources available for pilot transmission (e.g., different timeslots or different frequency grid elements), then the set of uplink pilots that needs to be transmitted can be divided into sets such that each set is transmitted on a different resource. The criterion of for the division into sets can be, e.g., the achievable pilot SINR. The transmission of non-orthogonal pilots leads to a reduction in the achievable pilot SINR, which is the more pronounced the stronger the alignment of the vector spaces containing the correlation matrices from different users is. Thus, arranging users in sets such that two pilots with very similar correlation matrices are not transmitted at the same time improves performance. However, other criteria are possible as well. For example, for users that have only a low SINR during data transmission, achieving a high pilot SINR might be wasteful; thus, achieving an optimal "matching" of the pilot SINR to the data SINR might be another possible criterion.

The embodiments of the disclosed technology described in this section may be characterized, but not limited, by the following features:

A wireless system in which a network node performs precoded downlink transmissions, which support a massive number of users, consisting of channel prediction, reciprocity adjustment and precoding, based on the second-order statistics of the channels.

A system including a mix of uplink orthogonal pilots and non-orthogonal pilots.

Computing the second-order statistics of a channel based on orthogonal pilots.

Separating non-orthogonal pilots from multiple users, using second-order statistics and computation of channel estimation.

Training for prediction of channel estimates.

Scheduling non-orthogonal uplink pilots based on second-order statistics.

Compressing channel responses using PCA

3. Reciprocal Calibration of a Communication Channel

This section covers reciprocal calibration of a communication channel for reverse channel estimation. In the recent years, to meet the increased demand on available bandwidth, many new techniques have been introduced in wireless communications. For example, the amount of bandwidth, measured as a total number or as a number of bits per Hertz per second number, has grown steadily over years in prevalent communication standards such as the Long Term Evolution (LTE). This trend is expected to grow even more due to the explosion of smartphones and multimedia streaming services.

Of the available bandwidth in a wireless network, some bandwidth is typically used by system overhead signaling that may be used for maintaining operational efficiency of the system. Examples of the overhead signaling includes transmission of pilot signals, transmission of system information, and so on. With time-varying nature of a communication channel between mobile end point(s), the system messages may have to be exchanged more frequently and the overhead may end up becoming significant. The embodiments described in the present document can be used to alleviate such bandwidth overhead, and solve other problems faced in wireless communication systems.

Figure 6:
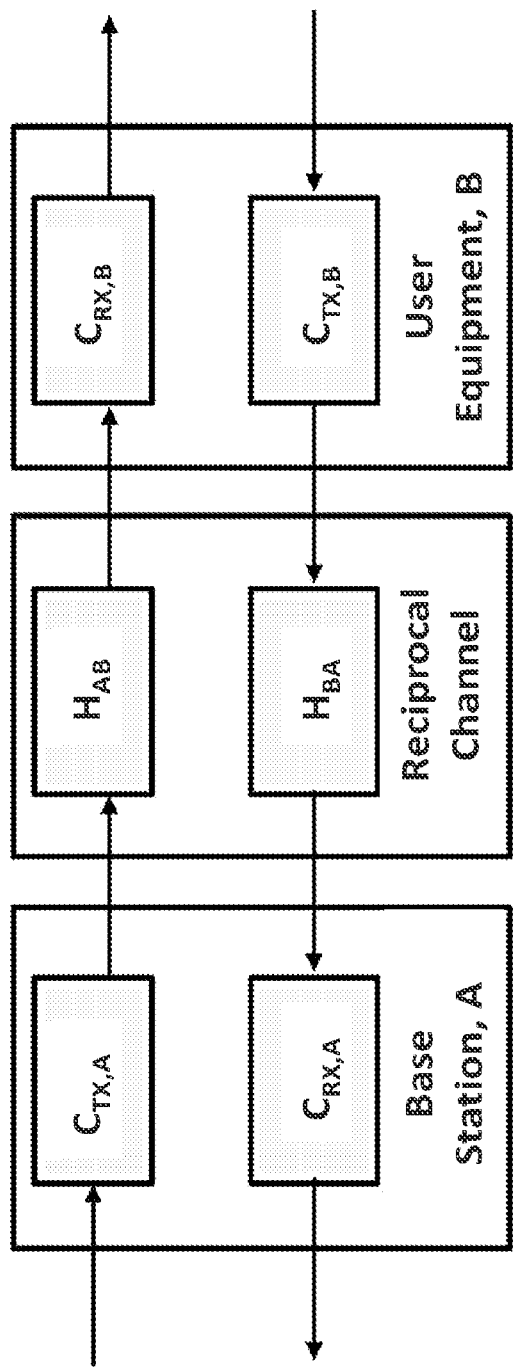
FIG. 6 shows an example of a wireless channel with reciprocity.

FIG. 6 shows an example block diagram of a communication channel with reciprocity. The composite wireless channel from A to B may be represented as: $\hat{H}_{A,B} = C_{RX,B} \cdot H_{A,B} \cdot C_{TX,A}$.

For the reciprocal channel, assume that $$H_{AB} = \lambda H_{BA}^T$$

for a complex scalar $\lambda$.

In the case of a non-reciprocal channel, with analog and RF components, Non-reciprocal analog and RF components: $C_{TX,A}$, $C_{RX,A}$, $C_{RX,B}$, $C_{TX,B}$, ideally for simplicity, it is beneficial if each matrix is a diagonal matrix. Such an embodiment may also use a design that minimizes the coupling between Tx and Rx paths.

Similarly, the composite channel from B to A is given by $\hat{H}_{B,A} = C_{RX,A} \cdot H_{B,A} \cdot C_{TX,B}$.

If all the C matrices can be estimated a priori, the BS to UE channel can be estimated from the UE to BS channel. In such a case, feeding back channel state information for transmit beamforming may not be needed, thereby making the upstream bandwidth available for data instead of having to transmit channel state information. Estimation of the C matrices may also improve system efficiency. In some embodiments disclosed herein, the reciprocity calibration may be performed by calibrating Tx and Rx of the BS and UE side during a startup or a pre-designated time. The diagonal matrices $C_{TX,A}$, $C_{RX,A}$, $C_{RX,B}$, $C_{TX,B}$ may be estimated. These matrices may be re-estimated and updated periodically. The rate of change of the C matrices will typically be slow and may be related to factors such as the operating temperature of the electronics used for Tx and Rx.

3.1 Brief Discussion

In point to multi-point (P2MP) systems and fixed wireless access (FWA) systems, multi-user MIMO (MU-MIMO) is used for increasing the system throughput. One of the components of MU-MIMO is a transmit pre-coder based beam-forming at the Base Station (BS) transmitter. BS sends signals to all User Equipments (UE) (say n of them) simultaneously.

In operation, n−1 signals, intended for n−1 individual UEs, will act as interference for the target UE. A transmit pre-coder cancels the interference generated at the target UE by the n−1 un-intended signals meant for other UEs. To build a pre-coder, down link channel state information (CSI) is used.

In an extrinsic beamforming technique, CSI is fed back from the UE to BS through a feedback up-link channel. However, considerable amount of data BW is used for this, thus affecting the overall system throughput efficiency.

For Time Division Duplex (TDD) systems, the physical channel in the air (sometimes called the radio channel) is reciprocal within the channel coherence time. e.g., the case wherein the uplink (UE to BS) and downlink (BS to UE) are identical (in SISO (transpose in MIMO). However, when the transceiver front-end (FE) hardware is also taken into account, channel reciprocity no longer holds. This is due to the non-symmetric characteristics of the RF hardware. It includes PA non-linearity, RF chain crosstalk, phase noise, LNA non-linearity and noise figure, carrier and clock drifts etc.

In some embodiments, a calibration mechanism can be designed to calibrate for the nonreciprocal components of the wireless link such that embodiments can estimate the down-link by observing the up-link with the help of these calibration coefficients. If this is feasible, no CSI feedback is necessary (as in the case of extrinsic beam forming), thus improving the overall system throughput efficiency. The associated beamforming is also sometimes called intrinsic beamforming. The technique disclosed in this patent document can be used to solve the above discussed problem, and others.

3.2 Notation

In the description herein, $h_{a_1 a_2}$ denotes the channel from transmitter (TX) a1 to receiver (RX) a2. This notation is different from the conventional MIMO channel notation. In the conventional methods, this will be denoted as $h_{a_2 a_1}$). Also, conjugate of a complex quantity is represented with a*, e.g., conj(h)=h*.

3.3 Reciprocity Calibration for Precoding

A precoded transmission is based on the knowledge of the exact channel response between the transmitting antenna(s) of a first terminal denoted by A—typically a base-station (BS)—to the receiving antenna(s) of a second terminal denoted by B—typically a piece of Consumer Premises Equipment (CPE) or a user equipment (UE). This channel response can be considered to be composed of three different parts as illustrated in FIG. 3. First, the channel response of the transmitter in terminal A. Second, the channel response of the different reflectors. Third, the channel response of the receiver in terminal B. The transmitter channel responses may be due to the transmit chain circuitry such as power amplifiers, digital to analog converters (DACs), frequency upconverters and so on. The receiver channel response may be due to receiver-side circuitry such as low noise block (LNB), frequency downconverter, analog to digital conversion circuitry (ADC).

There are two main differences between the channel responses at terminals A and B and the channel response of the wireless channel reflectors:
1. The channel response of the wireless channel reflectors in a time-division duplex (TDD) system is reciprocal whereas the channel response of the terminals is not.
2. The channel response of the wireless channel reflectors may change rapidly (e.g., in 1-10 milliseconds, depending on the Doppler of the reflectors and terminals), but the channel response of the terminals changes slowly, mostly with temperature.

There are several methods for obtaining the complete channel response from terminal A to B described in the literature. For example, an explicit method would be to send known reference signals from terminal A to B and have terminal B transmit back the values of the received reference signals to terminal A. This is often referred to as explicit feedback. However, each value must be represented with multiple bits, and in a system where terminal A has many antennas, there are many user terminals and significant Doppler effects causing the propagation channel to change rapidly, the amount of information that needs to be transmitted can severely reduce the overall system efficiency. In the extreme case with high levels of Doppler, it is simply not possible to feedback all the required Channel State Information (CSI) quickly enough, resulting in stale CSI and suboptimal precoding.

Instead, a TDD system can use an approach known as "reciprocity calibration" to obtain the relationship between the non-reciprocal parts of the channel response in both transmission directions: the AB (from A to B) and the BA (from B to A). Terminal B first transmits known reference signals that allow terminal A to compute the AB channel response. Using knowledge of the non-reciprocal relationship, terminal A can adjust the BA channel response to make it suitable for precoding a transmission back to terminal B.

More formally, for a multi-carrier TDD system that uses multi-carrier modulation, where the channel can be described as a complex value in the frequency domain for a specific sub-carrier (tone), the three components of the AB channel response can be denoted as $$H_A^{TX}, H^{CH} \text{ and } H_B^{RX}.$$

Similarly, the three components of the BA channel response are $$H_B^{TX}, H^{CH} \text{ and } H_A^{RX}.$$

The overall downlink (AB) channel response is $$H_{AB} = H_A^{TX} \cdot H^{CH} \cdot H_B^{RX} \quad (55)$$

and the overall uplink (BA) channel response is $$H_{BA} = H_B^{TX} \cdot H^{CH} \cdot H_A^{RX} \quad (56)$$

From $H_{AB}$ and $H_{BA}$, the reciprocity calibration factor can be written as $$\alpha = \frac{H_A^{TX} \cdot H_B^{RX}}{H_B^{TX} \cdot H_A^{RX}} \quad (57)$$

Therefore, if $H_{BA}$ is known at terminal A, it can compute $H_{AB} = \alpha H_{BA}$. The question that remains is how to obtain $\alpha$. Note that for the multi-carrier system, the above Equations (55) to (57) will provide reciprocity calibration values and channel responses on a per sub-carrier basis for sub-carriers on which reference signals are transmitted.

Different methods exist within the literature for computing the reciprocity calibration factor. The most straight forward of these is to utilize explicit feedback as described above, but only feed back $H_{AB}$ when $\alpha$ is re-calculated. Since the transmitter and receiver channel responses change relatively slowly, the rate of feedback is typically in the order of minutes and thus represents negligible overhead for a modest number of terminals and antennas. However, when the number of antennas in terminal A and the number of CPEs (terminal B) is large, as can be the case in a massive multiple-input multiple-output (MIMO) system with many subscribers, the feedback overhead can consume a considerable portion of the system capacity.

Another approach is to have terminal A transmit reference signals between its own antennas and calculate calibration factors for only $$H_A^{TX} \text{ and } H_A^{RX}.$$

That is, obtain:

$$\alpha_A = \frac{H_A^{TX}}{H_A^{RX}} \quad (58)$$

which results in $$\tilde{H}_{AB} = \alpha_A \cdot H_{BA} = H_A^{TX} \cdot H_B^{TX} \cdot H^{CH} \quad (59)$$

Terminal A will then precode one reference symbol using $\tilde{H}_{AB}$ that terminal B can use to remove its $$H_B^{TX} \text{ and } H_B^{RX}$$

contributions from all subsequent precoded transmissions. This technique may be called relative calibration. Whilst this approach entirely removes the need for feedback of $H_{BA}$, the need for terminal A to transmit to itself during a calibration procedure and then to CPEs that could be located many hundreds of meters or even kilometers away can create dynamic range challenges. It is typically desirable to use the same hardware gain stages in the transmit chain when calibrating as those used for transmission, since having to switch gain stages between calibration and transmission can change the nature of $$H_A^{TX} \text{ and } H_A^{RX}.$$

This document describes a new approach for computing the reciprocity calibration factor that avoids the dynamic range concern of relative calibration whilst maintaining high levels of efficiency when scaling to a larger number of antennas and terminals. As described herein, the reference signals transmitted for calibration and at the same power level as typical signal transmissions, and hence are better suited to capture and calibrate the distortions introduced by transmit/receive circuitry.

3.4 Reciprocity Calibration via Receiver-Side Inversion

Let Terminal A transmit known reference signals over a subset of multi-carrier tones and P be a specific reference signal at one of these tones. For example, Terminal A may use every Mth subcarrier for reference signal transmission, where M is an integer. For example, M may be 8 or 16 in practical systems. Terminal B receives $$Y_B = H_{AB} \cdot P + W \quad (60)$$

where W is additive white Gaussian noise with zero mean and variance $N_0$. Note that the above equation is a scalar equation because the equation represents the received signal at a single subcarrier. For each subcarrier on which a reference is transmitted, there will be one such equation. Terminal B estimates $H_{AB}$ from $Y_B$ and inverts it. To avoid singularities and cope with a large dynamic range, regularized zero forcing may be used to compute the inversion:

$$\tilde{H}_{AB}^{-1} = \frac{H_{AB}^*}{H_{AB}^* \cdot H_{AB} + N_0} \approx H_{AB}^{-1} \quad (61)$$

Terminal B then transmits $$\tilde{H}_{AB}^{-1}$$

back to terminal A over the same tone. This transmission should quickly follow the first one—especially in the presence of Doppler—to ensure $H^{CH}$ remains relatively constant. Terminal A then receives $$Y_B = H_{BA} \cdot \tilde{H}_{AB}^{-1} + W \quad (62)$$

Ignoring the noise term, which may be averaged out over multiple transmissions, it can be seen that $Y_B$ is the inverse of the reciprocity calibration factor:

$$Y_B \approx \frac{H_B^{TX} \cdot H^{CH} \cdot H_A^{RX}}{H_A^{TX} \cdot H^{CH} \cdot H_B^{RX}} = \frac{H_B^{TX} \cdot H_A^{RX}}{H_A^{TX} \cdot H_B^{RX}} = \alpha^{-1} \quad (63)$$

Since these are scalar values, the inversion processing is for both $H_{AB}$ and $Y_B$ is straightforward. Here, the inverse reciprocity calibration factor represents a ratio of circuitry channel from Terminal B to Terminal A, and a circuitry channel from Terminal A to Terminal B.

In multi-carrier systems, the above-described procedure may be repeated over multiple tones and the result interpolated to yield the full set of calibration factors over the bandwidth of interest. This full set may be obtained, for example, by averaging or interpolating the calibration factors are the subcarriers at which reference signals were transmitted. Since the Tx and Rx contributions of both terminal A and B will be relatively flat across frequency, it should be possible to use a sparse subgrid of tones with the appropriate interpolation to obtain an accurate level of calibration.

The results of the channel estimation as above may be combined with channel estimation of the $H^{CH}$ channel to obtain an estimate of the overall channel $H_{AB}$ and $H_{BA}$.

4. Second-order Statistics for FDD Reciprocity

This section covers using second order statistics of a wireless channel to achieve reciprocity in frequency division duplexing (FDD) systems. FDD systems may have the following challenges in implementing such a precoded system:

The downlink channel response is different from the uplink channel response, due to the different carrier frequencies. On top of that, there is a different response of the transmit and receive RF components in the base-station and user equipment.

For non-static channels, the base-station needs to predict the channel for the time of the transmission.

In some embodiments, the base-station may send, before every precoded downlink transmission, reference signals (pilots) to the user equipment. The users will receive them and send them back to the base-station as uplink data. Then, the base-station will estimate the downlink channel and use it for precoding. However, this solution is very inefficient because it takes a large portion of the uplink capacity for sending back the received reference signals. When the number of users and/or base-station antennas grow, the system might not even be implementable. Also, the round-trip latency, in non-static channels, may degrade the quality of the channel prediction.

4.1 Second-Order Statistics Training

Figure 7:
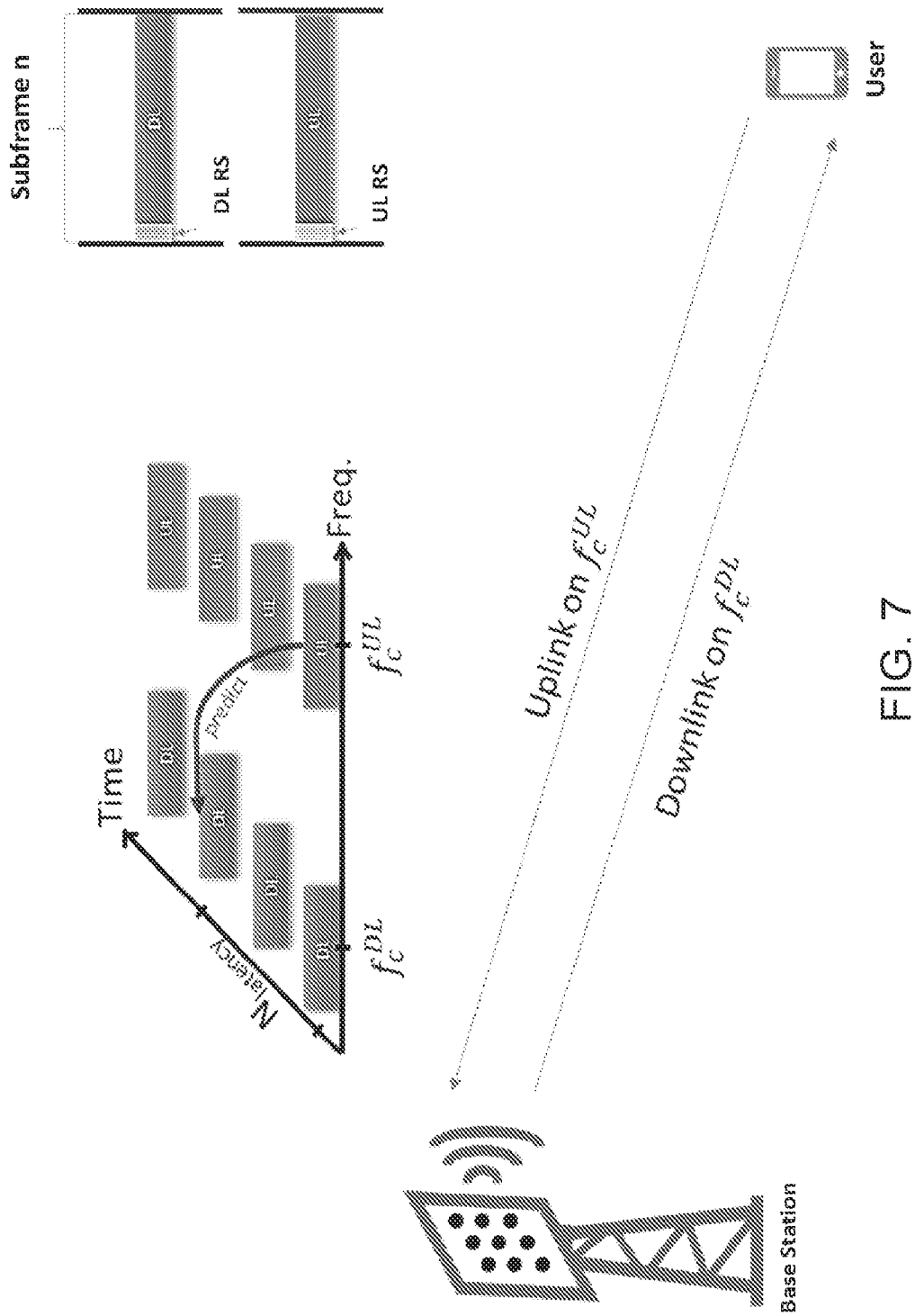
FIG. 7 is a block diagram of an example of the prediction setup in an FDD system.

For simplicity, the case with a single user antenna and the L base-station antennas is considered, but can be easily extended to any number of users. The setup of the system is shown in FIG. 7. The base-station predicts from the uplink channel response, the downlink channel response in a different frequency band and $N_{latency}$ subframes later.

To achieve this, the system preforms a preliminary training phase, consisting of multiple sessions, where in each session i=1,2, . . . , $N_{training}$, the following steps are taken:

At subframe n, the user equipment transmits reference signals (RS) in the uplink. The base-station receives them and estimate the uplink channel $$H_{UL}^{(i)}$$

over the L base-station antennas.

At subframe n+$N_{latency}$, the base-station transmits reference signals in the downlink from all its antennas. The user equipment receives it and sends it back as uplink data in a later subframe. The base-station computes the downlink channel estimation for it, $$H_{DL}^{(i)}.$$

In a different implementation, it is possible that the UE will compute the channel estimation and send it to the base-station as uplink data.

The base-station computes the second-order statistics $$R_{UL}^{(i)} = H_{UL}^{(i)} \cdot (H_{UL}^{(i)})^H$$
$$R_{DL,UL}^{(i)} = H_{DL}^{(i)} \cdot (H_{UL}^{(i)})^H$$
$$R_{DL}^{(i)} = H_{DL}^{(i)} \cdot (H_{DL}^{(i)})^H$$

Herein, $(\bullet)^H$ is the Hermitian operator. For the case that the channel has non-zero-mean, both the mean and the covariance matrix should be determined. When the training sessions are completed, the base-station averages out the second order statistics:

$$R_{UL} = \frac{1}{N_{training}} \sum_{i=1}^{N_{training}} R_{UL}^{(i)}$$
$$R_{DL,UL} = \frac{1}{N_{training}} \sum_{i=1}^{N_{training}} R_{DL,UL}^{(i)}$$
$$R_{DL} = \frac{1}{N_{training}} \sum_{i=1}^{N_{training}} R_{DL}^{(i)}$$

Then, it computes the prediction filter and the covariance of the estimation error:

$$C_{prediction} = R_{DL,UL} \cdot (R_{UL})^{-1}$$

$$R_E = R_{DL} - C_{prediction} \cdot (R_{DL,UL})^H$$

The inversion of $R_{UL}$ may be approximated using principal component analysis techniques. We compute $\{\lambda\}$, the K most dominant eigenvalues of $R_{UL}$, arranged in a diagonal matrix $D = \text{diag}(\lambda_1, \lambda_2, \ldots, \lambda_K)$ and their corresponding eigenvectors matrix V. Typically, K will be in the order of the number of reflectors along the wireless path. The covariance matrix can then be approximated by $R_{UL} \approx V \cdot D \cdot (V)^H$ and the inverse as $$R_{UL}^{-1} \approx V \cdot D^{-1} \cdot (V)^H.$$

Note, that there is a limited number of training sessions and that they may be done at a very low rate (such as one every second) and therefore will not overload the system too much.

To accommodate for possible future changes in the channel response, the second-order statistics may be updated later, after the training phase is completed. It may be recomputed from scratch by initializing again new $N_{training}$ sessions, or by gradually updating the existing statistics.

The interval at which the training step is to be repeated depends on the stationarity time of the channel, e.g., the time during which the second-order statistics stay approximately constant. This time can be chosen either to be a system-determined constant, or can be adapted to the environment. Either the base-station or the users can detect changes in the second-order statistics of the channel and initiate a new training phase. In another embodiment, the base-station may use the frequency of retransmission requests from the users to detect changes in the channel, and restart the process of computing the second-order statistics of the channel.

4.2 Scheduling a Downlink Precoded Transmission

For each subframe with a precoded downlink transmission, the base-station should schedule all the users of that transmission to send uplink reference signals $N_{latency}$ subframes before. The base-station will estimate the uplink channel responses and use it to predict the desired downlink channel responses $$H_{DL} = C_{prediction} \cdot H_{UL}$$

Then, the downlink channel response $H_{DL}$ and the prediction error covariance $R_E$ will be used for the computation of the precoder.

5. Embodiments for Reciprocal Geometric Precoding

Embodiments of the disclosed technology include a method for applying MU-MIMO (Multi-User Multiple-In-Multiple-Out) in a wireless system. In MU-MIMO, a transmitter with multiple antennas (typically a cellular base-station) is transmitting to multiple independent devices (also referred to as UE—User Equipment), each having one or more receiving antennas, on the same time and frequency resources. To enable a receiving device to correctly decode its own targeted data, a precoder is applied to the transmitted signal, which typically tries to maximize the desired received signal level at the receiving device and minimize the interference from transmissions targeted to other devices. In other words, maximize the SINR (Signal to Interference and Noise Ratio) at each receiving device. The transmitted signal is arranged in layers, where each layer carries data to a specific user device.

Figure 8:
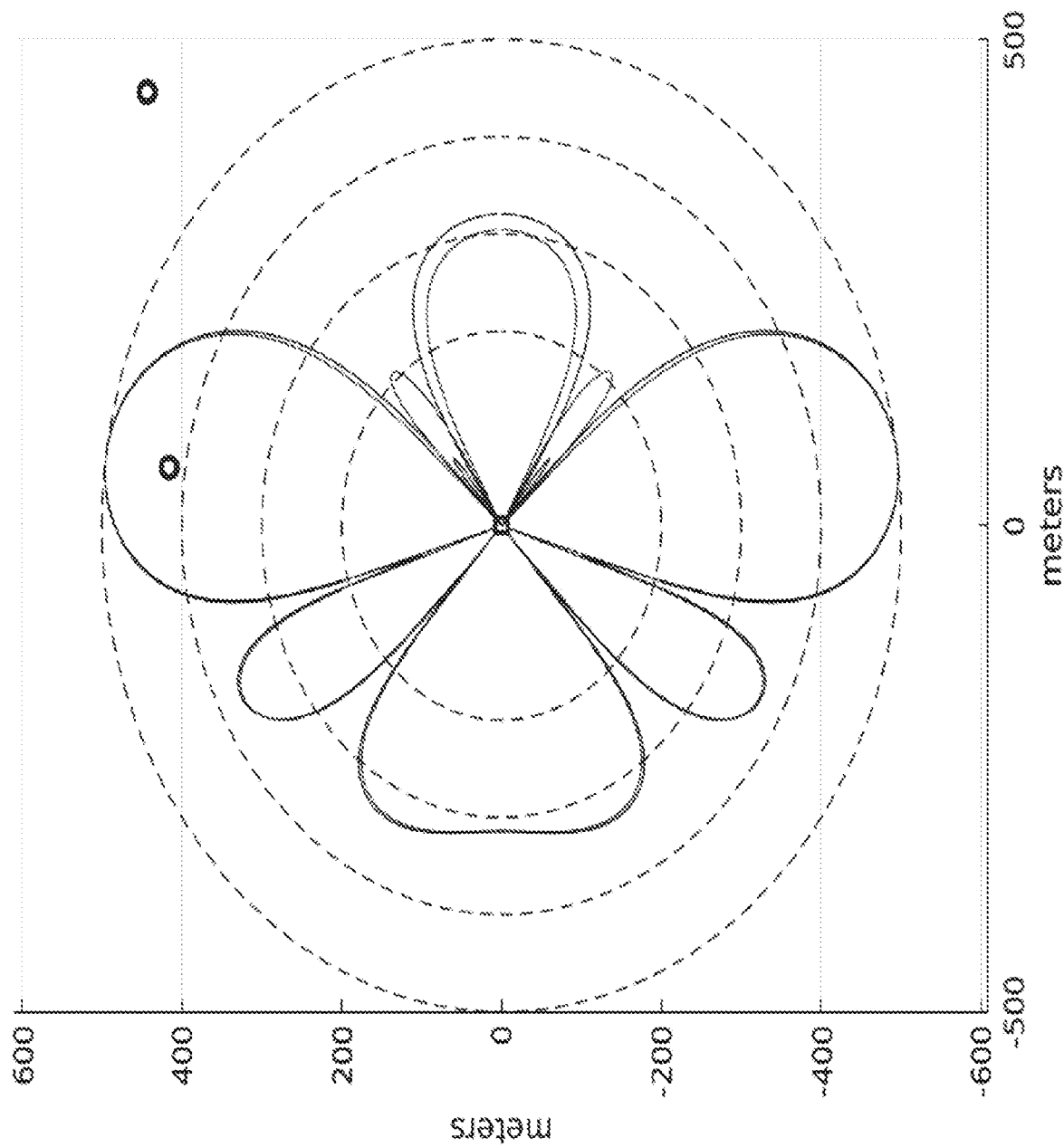
FIG. 8 shows an example transmission pattern using precoding in a communication network.

A spatial precoder is a precoder that operates in the spatial domain by applying in each layer different weights and phases to the transmission of each antenna. This shapes the wave-front of the transmitted signal and drives more of its energy towards the targeted device, while minimizing the amount of energy that is sent towards other devices. FIG. 8 shows an example of a spatial precoder.

To simplify the following description, without any loss of generality, the downlink transmitting device is referred to as the base-station (BS) and the downlink receiving device is referred to as the UE (see, for example, FIG. 1A).

5.1 Codebook-Based Precoding

In this technique there is a predefined set of known precoders, available for both BS and UE. Upon receiving a precoded transmission, a UE may blindly assume that each one of the precoders was used and try to decode the received signal accordingly. This method is not very efficient, especially when the codebook is large. Another approach is based on feedback. The UE analyzes a reception of a known reference signal by computationally applying different precoders from the codebook. The UE selects the precoder that maximizes its received SINR and sends a feedback to the BS, which one is the preferable precoder.

In some implementations, this technique has the following limitations:

(1) The codebook has a limited number of entries and therefore, may not have a good enough spatial resolution to optimally address all the cases of the targeted UE. Also, the computational complexity at the UE, grows when this codebook is large.

(2) Each UE selects the best precoder for itself, however, this precoder may not be optimal for other UEs. To address that, the BS needs to carefully selects the set of UE for each precoded transmission, in such a way, that their precoders are as orthogonal as possible. This imposes a heavy constraint on the scheduler at the BS, especially in scenarios with a large number of layers.

5.2 Precoding based on Explicit Feedback

From the dirty paper coding theorem, we can derive that if all the channels from the BS antennas to the receiving UE antennas are known, we can optimally precode the transmission to all UE. The implementation of such a precoding scheme in a real system, is challenging and may require that the UE will send feedback to the BS on the received downlink channel. When the UE or any of the wireless channel reflectors are mobile, the feedback of the channel response may no longer represent the state of the channel, at the time the precoder is applied and prediction may also be required. Note, that this precoder, in some sense, tries to invert the channel.

5.3 Reciprocal Geometric Precoding

A wireless channel is a super-position of reflections. A geometric precoder is based on the geometry of these reflectors. This geometry tends to change relatively slow comparing to typical communication time scales. For example, considering the spatial domain, the Angle of Arrival (AoA) of the rays from the wireless reflectors (or directly from the UE) to the BS antennas, will be relatively constant in a time scale of tens of milliseconds and frequency independent. This is unlike the channel state, which is time and frequency dependent. The reciprocal property of the wireless channel allows us to use information about the channel obtained from uplink transmissions (UE to BS) for downlink precoded transmissions (BS to UE).

The geometric precoder, projects the transmission of each layer into a subspace, which is spanned by the reflectors of a specific user and orthogonal as much as possible to the reflectors of other layers. This subspace is time and frequency independent and relies solely on the geometry of the channel. The channel geometry is captured by means of a covariance matrix. The proposed technique may use uplink reference signals to compute the channel response at each one of the BS receiving antennas and the covariance matrix of these measurements.

For example, in an LTE/5G NR system, the BS may use the uplink Sounding Reference Signals (SRS) transmitted by a UE, or the uplink Demodulation Reference Signals (DMRS) to compute the channel response at different time and frequency resource elements and from them compute the spatial covariance matrix.

More formally, let i=1, . . . , K be a user (or layer) index and L represent the number of BS antennas. Let $H_i(f, t)$ be a complex column vector, representing the channel response at the L BS antennas, at time t=1, . . . , $N_t$ and frequency f=1, . . . , $N_f$. Note, that $N_t$ may be 1 and $N_f$ may also represent a small part of the used bandwidth. The L×L covariance matrix may be computed directly by $$R_i = \frac{1}{N_f \cdot N_t} \sum_{f,t} H_i(f, t) \cdot H_i^H(f, t)$$

Herein, (•) H is the Hermitian operator, or indirectly using techniques like maximum likelihood (e.g., a Toeplitz maximum likelihood technique).

5.4 Finding the Vector Space

Let K represent the number of users for the precoded transmission and $R_i$ their uplink spatial covariance matrices.

Let's also assume some normalized uplink power allocation for each user, denoted by $q_i \geq 0$ and satisfying, $$\sum_{i=1}^{K} q_i = 1.$$

The optimal uplink vector space, V_iˆi*, that spans the desired channels from the user to the BS and orthogonal to the channels from the other users, is the one that maximizes the SI NR at the BS:

$$V_i^* = \underset{V_i}{\mathrm{argmax}} \left\{ \frac{q_i V_i^H R_i V_i}{\sum_{j \neq i} q_j V_i^H R_j V_i + N_0} \right\}$$

Herein, the enumerator term is the signal and the denominator terms are the interference and the additive noise variance.

Herein, $$V_i^*$$

can be directly computed as the maximum eigenvector of the following uplink SINR matrix:

$$SINR_i^{(UL)} = \left( \sum_{j \neq i} q_j R_j + N_0 I \right)^{-1} \cdot q_i R_i$$

5.5 Downlink Duality

Due to the reciprocal property of the wireless channel, the same vector space computed for the uplink can be used for downlink precoding as well. Therefore, by using just uplink reference signals, we can obtain the optimal vector space for the downlink. This is in contrasts to the explicit feedback method, which required actual channel state information of the downlink to be transmitted as data in the uplink, or the codebook-based precoding approach, which requires feedback of the selected precoder.

However, the selected uplink power allocation is not dual and therefore not optimal for the downlink. In the uplink, the BS receives, per layer, different channels and projects them all into a single vector space, whereas in the downlink the UE receives on the same channel, transmissions on different vector spaces.

In can be mathematically proven, that there exists a dual power allocation, $p_i \geq 0$ for the downlink, satisfying $\sum_{i=1}^{K} p_i = 1$, that can achieve the same SINR as the uplink:

$$SINR_i^{\star(UL)} =$$

$$\frac{q_i V_i^{\star H} R_i V_i^\star}{\sum_{j \neq i} q_j V_i^{\star H} R_j V_i^\star + N_0} = \frac{p_i V_i^{\star H} R_i V_i^\star}{\sum_{j \neq i} p_j V_j^{\star H} R_i V_j^\star + N_0} = SINR_i^{\star(DL)}$$

5.6 Downlink Power Allocation

To compute the dual downlink power allocation, we define a user cross-interference matrix, $$A_{K \times K}^{(DL)},$$

with entries $$A_{i,j}^{(DL)} = \begin{cases} SINR_i^{\star(UL)} \cdot \dfrac{N_0}{V_i^{\star H} R_i V_i^\star} & i = j \\ SINR_i^{\star(UL)} \cdot \dfrac{(V_j^{\star H} R_i V_j^\star + N_0)}{V_i^{\star H} R_i V_i^\star} & i \neq j \end{cases}$$

Herein, i, j=1, ..., K. Note, that a dual cross-interference matrix can be computed for the uplink as well.

It can be mathematically proven that the optimal power allocation for the downlink is derived from the normalized absolute value of the elements of the maximum eigenvector of $A^{(DL)}$, denoted by $V_{A^{(DL)}}$:

$$p_i = \frac{|V_{A^{(DL)}}(i)|}{\sum_i |V_{A^{(DL)}}(i)|}$$

Note, that this power allocation is statistically targeting equal SINR at each receiving UE. However, when scheduling users, a BS may adjust this power allocation to allow different SINRs for different UE, according to their downlink traffic requirements.

5.7 Precoder

The precoder for user i is computed as $$P_i = p_i \cdot conj(V_i^*).$$

Here, conj represents conjugate operation.

5.8 Examples of Reference Signals

This precoder, which projects the transmitted signal into different vector spaces, does not "invert" the channel and the UE must equalize the channel. Therefore, the UE must receive precoded reference signals as well along with the precoded data. The reference signals may be one of the conventional reference signals, such as a demodulation reference signal or a sounding reference signal. Alternatively, or in addition, a new reference signal may be used for facilitating the computations described herein.

5.9 Scheduling

When the number of available users for precoded downlink transmission is larger than K, the BS may want to specifically select K users that are spatially separated as much as possible. The BS may use the spatial covariance matrices, $R_i$, to determine this set of users.

5.10 Example Procedure

One example procedure for computing a reciprocal geometric precoder is as follows:

(1) Choose an uplink power allocation (may be simply a uniform allocation, $q_i=1/K$).
(2) For each user i, receive uplink reference signals and compute channel response $H_i(f, t)$
(3) For each user i, from the received channel response, compute covariance matrix $R_i$
(4) For each user i, compute uplink SINR matrix, $$SINR_i^{(UL)},$$

and find its maximum eigenvector $$V_i^*$$

(5) Compute downlink user cross-interference matrix, $A^{(DL)}$ and find its maximum eigenvector $V_{A^{(DL)}}$
(6) For each user i, compute downlink power allocation, $p_i$ from $V_{A^{(DL)}}$
(7) For each user i, compute geometric precoder $P_i$ from $p_i$ and $$V_i^*$$

6. Spectral Sharing Wireless Systems

A spectral sharing wireless system is a system where multiple streams of information are transmitted over the same time and frequency resources. Similar systems are also known as multi-user multiple input multiple output (MU-MIMO) systems. Generally, these systems have two different types of communication signals:

Common—In the downlink, these transmitted signals are targeting all user devices. They may consist of reference signals, control channels, broadcast channels, etc. In the uplink, these transmitted signals are originating from multiple user devices and may consist of reference signals, control channels, random access channels, etc.

User-specific—In the downlink, these transmitted signals are targeting one or more user devices, which share the same spectrum. Each user device has its own specific data stream(s) (also known as a layers). In the uplink, these transmitted signals are originating from multiple user devices and contain specific data streams coming from each user device and shared on the same spectrum.

For example, in the Third Generation Partnership Project (3GPP) Long Term Evolution (LTE) or the fifth generation new radio (5G NR) systems, common downlink signals may be cell reference signals (CRS), physical downlink control channel PDCCH and physical broadcast synchronization channel PBSCH, common uplink signals may be sounding reference signal SRS, physical uplink shared control channel PUSCH and physical random access channel PRACH, user-specific downlink signals may be physical downlink shared channel PDSCH and user-specific uplink signals may be physical uplink control channel PUCCH.

In some implementations, overlaying transmissions of multiple user-specific data streams on the same frequency and time resources is enabled by multiple antennas at the base-station and the usage of the spatial domain. A different spatial precoder is applied to each data stream targeting a specific user device. The choice of precoders in existing systems relies on downlink channel feedback for a channel response, codebook selection or beam matching index. Some of these methods do not perform very well and some overload the system with the amount of feedback transmissions that has to be processed in a given time budget. These closed-loop methods typically have poor performance with mobility.

The embodiments of spectrum sharing wireless systems may use only a small set of uplink channel measurements to schedule and communicate with multiple user devices on the same frequency and time resources on both downlink and uplink, even in FDD systems, and are very efficient and robust to mobility.

In existing wireless systems, not all user devices support advanced MU-MIMO transmission modes. These legacy user devices may operate under the assumption that there is no spectrum sharing at all. These user devices may not have any means, or may only have partial means, to provide downlink channel feedback of any sort, and may not support precoded reference signals, which may be required for the equalization of the precoded data transmissions. In these embodiments, spectral sharing transmissions are possible even to and from these legacy user devices, without any modifications to their existing hardware or software.

6.1 Example Embodiments of a Common Precoder

Let $P_c$ Represent the common precoder. In the downlink, the purpose of the common precoder is to emit a signal that will reach all the user-devices in the base-station's sector, or a region served by the base station. In the uplink, the common precoder is used for all the cases where the reception is not from a small known set of multiple user devices. Note that in the uplink processing it is actually a "post-coder" that is applied to the received signal. However, for simplicity, the term "precoder" will be used for the uplink as well.

An example of a common precoder is an isotropic precoder that generates a signal with equal angular energy. Mathematically, this precoder is a discrete delta function in the spatial domain (e.g., across spatial positioning of antenna array elements) and a constant value in the transformed angular domain.

$$P_c = [0, \ldots, 0, 1, 0, \ldots, 0]$$

$$\mathcal{F}\{P_c\} = \text{constant}$$

where $\mathcal{F}\{\bullet\}$ is the discrete Fourier transform.

Figure 9:
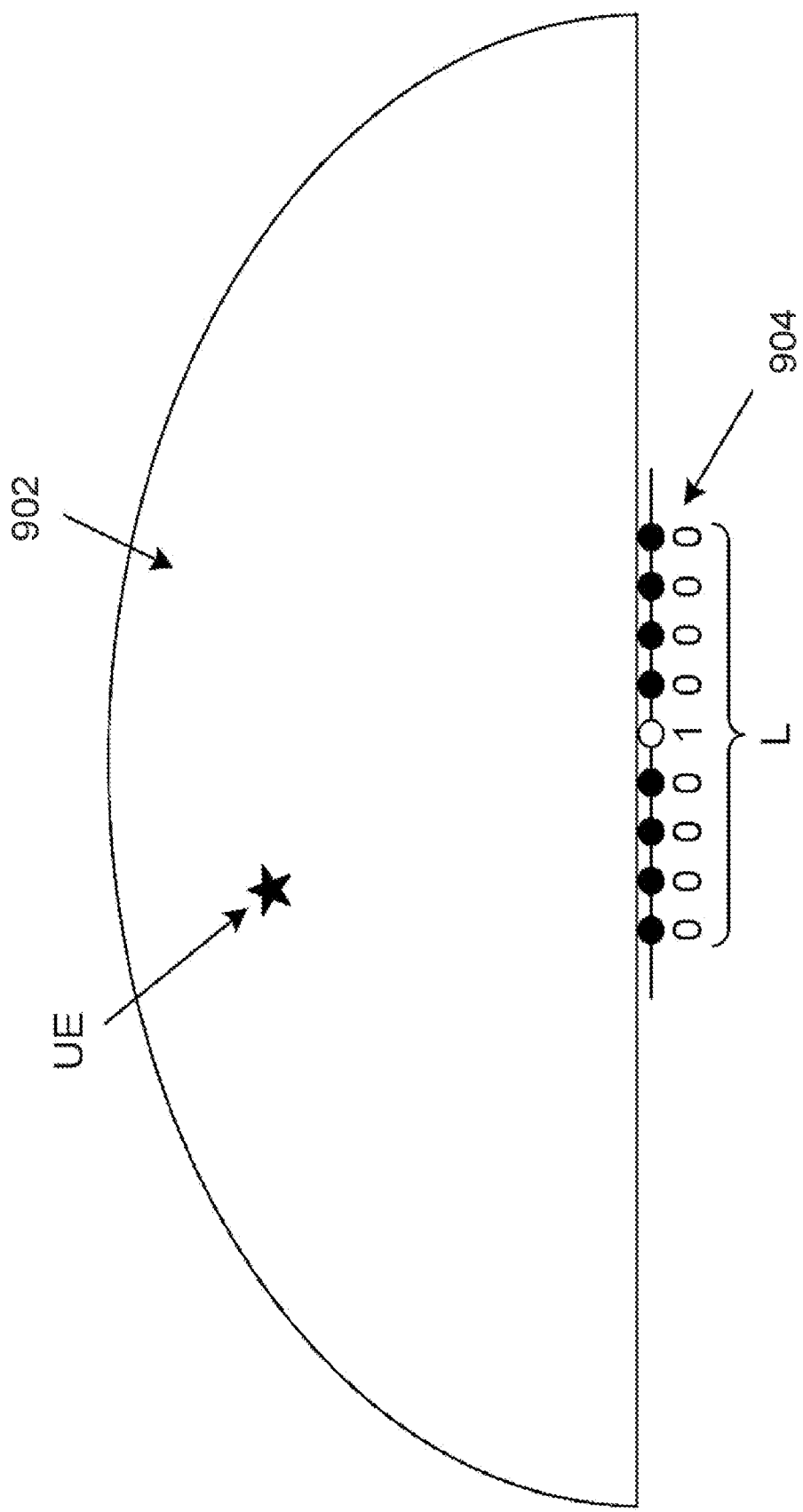
FIG. 9 shows an example of a common precoder.

FIG. 9 illustrates such a precoder. Note, that the common precoder is not required to be constant over time and frequency. Different time and frequency resources may use different common precoders. The semicircle 902 represents constant energy over all angles. The black star represents a user device (or User Equipment). The blue and red small circles 904 represent the antennas and the numbers beneath them are the precoder weights.

6.2 Example Embodiments of a User Device-Specific Precoder

Let, $$P_{us}^i = [w_1^i, w_2^i, \ldots, w_L^i],$$

be the user-specific precoder for user i, where $$w_l^i, l = 1, \ldots, L,$$

are complex weights. In the downlink, the purpose of the user-specific precoder is to maximize the received signal energy at the specific user device, while minimizing the interference to the other receiving user devices. In other words, maximize the Signal to Interference and Noise Ratio (SINR) at a specific user device. In the reciprocal uplink, the purpose of the precoder (post-coder) is to maximize the received signal energy at the base-station from a specific user device, while minimizing the received interfering signals from other transmitting user devices. FIG. 10 illustrates an example of such a precoder. The blue shape represents a radiation pattern. Most of the energy is focused towards UE #1 (as shown by lobe 1002), which is the target user device, while minimal energy is targeted towards the direction of UE #2 (another receiving user device). The weights applied to each antenna are shown below the antennas in the array 1004.

6.3 Example Embodiments of Downlink Sharing of Physical Channels

In the downlink, the base station may use its frequency and time resources to multiplex different physical channels. Some of these channels may be transmitted through common precoders and some through user-specific precoders. Table 5 shows an example of such multiplexing of physical channels. Note that each frequency and time resource element may be transmitted with a single or multiple precoders, depending on how many data streams are sharing this element. User-specific precoded data will typically share a resource element with multiple user-devices. However, transmission of data for a single user device on a resource element, may also be done using a common precoder.

Figure 11B:
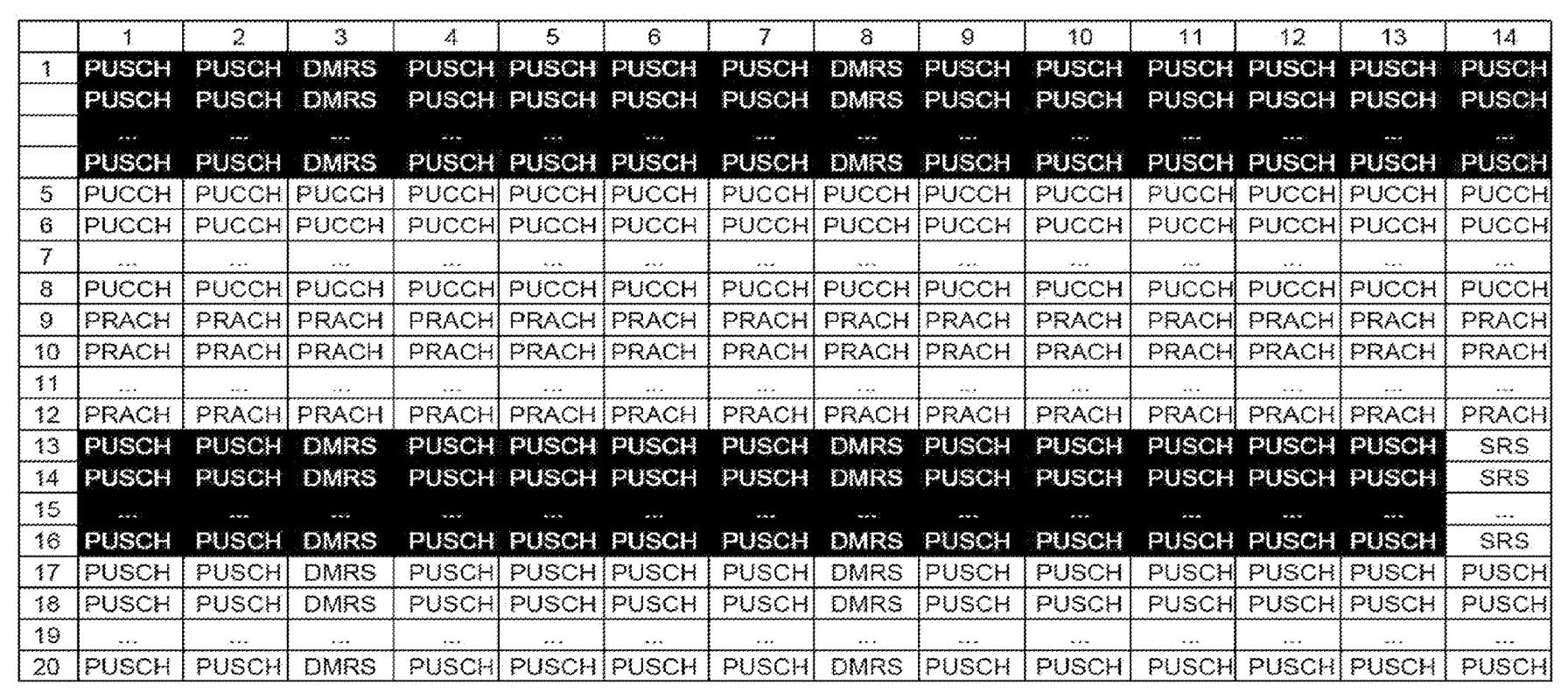

Table 5 shows Downlink physical channels sharing example, using 3GPP terminology. The grid represents frequency and time resources (22×14). The same information is also shown in FIG. 11A by grayscale-coding. Italicized entries (with same grayscale in FIG. 11A) represent common precoding and un-italicized entries (with common grayscale coding) represent user-specific precoding. Rows 1-7 represent user-specific precoded data transmission (PDSCH) for multiple user devices, along with some common precoded reference signals (CRS) and common precoded control channel (PDDCH). Rows 8-11 represent a common precoded broadcast channel transmission (PBCH). Rows 12-15 represent a common precoded single user device data transmission (PDSCH) with no spectrum sharing. Rows 16-22 represent a user-specific precoded data transmission (PDSCH) with reference signals (DMRS) for multiple user devices and common precoded reference signals (CRS).

TABLE 5

Example of sharing downlink physical channels

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | PDCCH | PDCCH | PDSCH | CRS | PDSCH | PDSCH | PDSCH | PDSCH | PDSCH | CRS | PDSCH | PDSCH | PDSCH | PDSCH |
| 2 | CRS | PDCCH | PDSCH | PDSCH | PDSCH | PDSCH | CRS | PDSCH | PDSCH | PDSCH | PDSCH | PDSCH | CRS | PDSCH |
| 3 | PDCCH | PDCCH | PDSCH | PDSCH | PDSCH | PDSCH | PDSCH | PDSCH | PDSCH | PDSCH | PDSCH | PDSCH | PDSCH | PDSCH |
| 4 | PDCCH | PDSCH | PDSCH | PDSCH | PDSCH | PDSCH | PDSCH | PDSCH | PDSCH | PDSCH | PDSCH | PDSCH | PDSCH | PDSCH |
| 5 | PDCCH | PDCCH | PDSCH | CRS | PDSCH | PDSCH | PDSCH | PDSCH | PDSCH | CRS | PDSCH | PDSCH | PDSCH | PDSCH |
| 6 | CRS | PDCCH | PDSCH | PDSCH | PDSCH | PDSCH | CRS | PDSCH | PDSCH | PDSCH | PDSCH | PDSCH | CRS | PDSCH |
| 7 | PDCCH | PDCCH | PDSCH | PDSCH | PDSCH | PDSCH | PDSCH | PDSCH | PDSCH | PDSCH | PDSCH | PDSCH | PDSCH | PDSCH |
| 8 | PBCH | PBCH | PBCH | PBCH | PBCH | PBCH | PBCH | PBCH | PBCH | PBCH | PBCH | PBCH | PBCH | PBCH |

TABLE 5-continued

Example of sharing downlink physical channels

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 9 | PBCH | PBCH | PBCH | PBCH | PBCH | PBCH | PBCH | PBCH | PBCH | PBCH | PBCH | PBCH | PBCH | PBCH |
| 10 | ... | ... | ... | ... | ... | ... | ... | ... | ... | ... | ... | ... | ... | ... |
| 11 | PBCH | PBCH | PBCH | PBCH | PBCH | PBCH | PBCH | PBCH | PBCH | PBCH | PBCH | PBCH | PBCH | PBCH |
| 12 | PBCH | PBCH | PBCH | PBCH | PBCH | PBCH | PBCH | PBCH | PBCH | PBCH | PBCH | PBCH | PBCH | PBCH |
| 13 | PDSCH | PDSCH | PDSCH | PDSCH | PDSCH | PDSCH | PDSCH | PDSCH | PDSCH | PDSCH | PDSCH | PDSCH | PDSCH | PDSCH |
| 14 | ... | ... | ... | ... | ... | ... | ... | ... | ... | ... | ... | ... | ... | ... |
| 15 | PDSCH | PDSCH | PDSCH | PDSCH | PDSCH | PDSCH | PDSCH | PDSCH | PDSCH | PDSCH | PDSCH | PDSCH | PDSCH | PDSCH |
| 16 | PDSCH | DMRS | PDSCH | CRS | PDSCH | PDSCH | PDSCH | PDSCH | DMRS | CRS | PDSCH | PDSCH | PDSCH | PDSCH |
| 17 | CRS | PDSCH | PDSCH | PDSCH | PDSCH | DMRS | CRS | PDSCH | PDSCH | PDSCH | PDSCH | DMRS | CRS | PDSCH |
| 18 | PDSCH | PDSCH | PDSCH | PDSCH | PDSCH | PDSCH | PDSCH | PDSCH | PDSCH | PDSCH | PDSCH | PDSCH | PDSCH | PDSCH |
| 19 | PDSCH | DMRS | PDSCH | PDSCH | PDSCH | PDSCH | PDSCH | PDSCH | DMRS | PDSCH | PDSCH | PDSCH | PDSCH | PDSCH |
| 20 | PDSCH | PDSCH | PDSCH | CRS | PDSCH | DMRS | PDSCH | PDSCH | PDSCH | CRS | PDSCH | DMRS | PDSCH | PDSCH |
| 21 | CRS | PDSCH | PDSCH | PDSCH | PDSCH | PDSCH | CRS | PDSCH | PDSCH | PDSCH | PDSCH | PDSCH | CRS | PDSCH |
| 22 | PDSCH | PDSCH | PDSCH | PDSCH | PDSCH | PDSCH | PDSCH | PDSCH | PDSCH | PDSCH | PDSCH | PDSCH | PDSCH | PDSCH |

6.4 Example Embodiments of Uplink Sharing of Physical Channels

Different uplink physical channels may be multiplexed within the frequency and time resources. The base-station receives at all its antennas the uplink transmissions from all sources and process it.

Common channels, which may represent transmissions cases which are not from a small known set of multiple user devices, are processed with a common precoder, P_c (l,f,t). The received and processed data in the base-station is:

$$Y_{P_c}(f, t) = \sum_{l=1}^{L} P_c(l, f, t) \cdot \left[ \sum_i H^i(l, f, t) \cdot X^i(f, t) + n(l, f, t) \right].$$

Herein, f and t are frequency and time indexes, $X^i(f, t)$ are uplink data symbols from user device i, $H^i(l, f, t)$ is the frequency channel response from user device i to antenna l, and n(l, f, t) is an additive noise term.

Similarly, user-specific channels are processed with their user-specific precoders:

$$Y_{P_{us}}^i(f, t) = \sum_{l=1}^{L} P_{us}^i(l, f, t) \cdot \left[ \sum_i H^i(l, f, t) \cdot X^i(f, t) + n(l, f, t) \right].$$

The operation of applying the user-specific precoders to the received uplink signal acts as a channel decoupler, which converts a MU-MIMO link to a parallel system with decoupled SISO links, $$Y_{P_{us}}^i.$$

Figure 14:
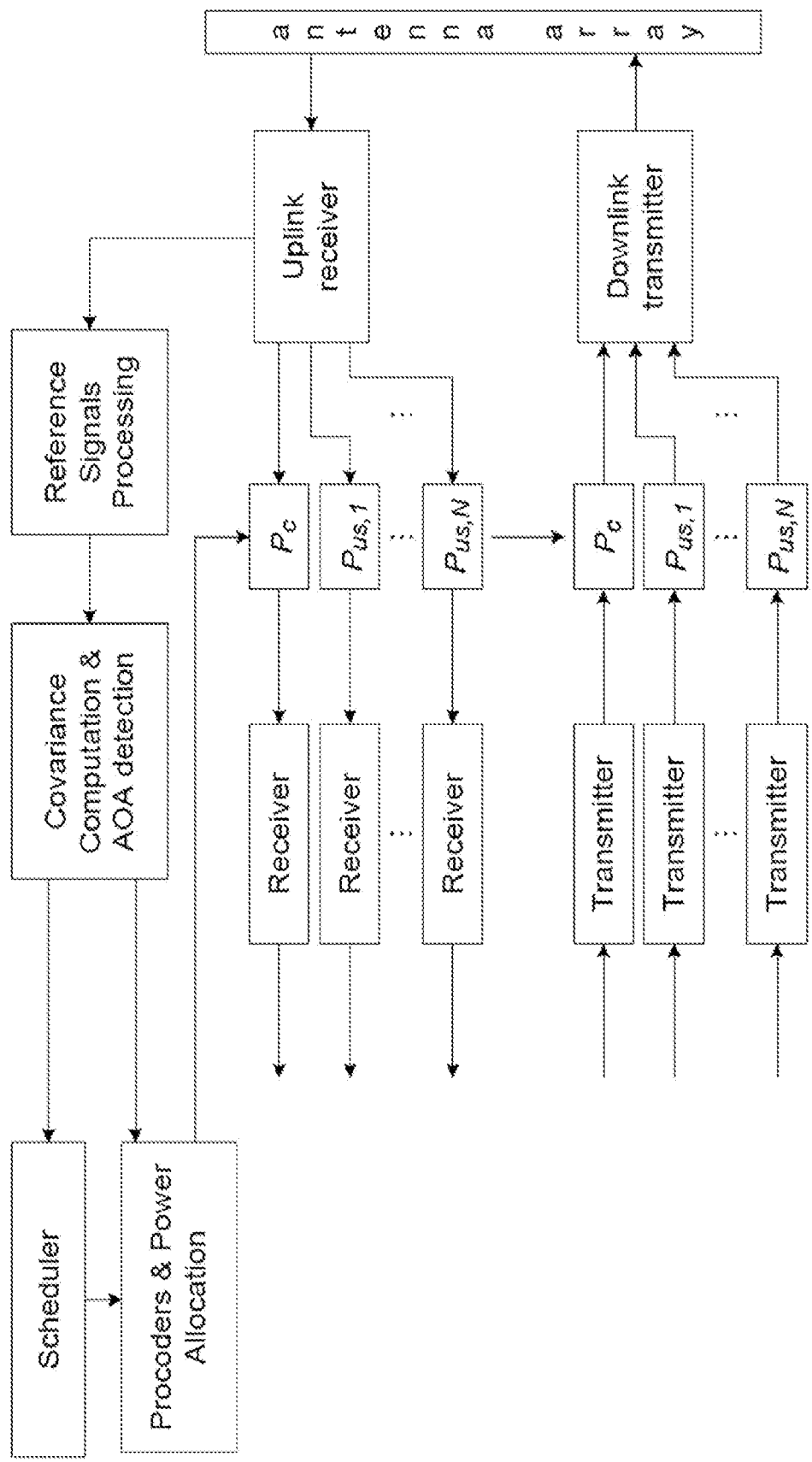
FIG. 14 is a block diagram showing an example of a network-side device.

This enables parallel implementation of independent receivers at the base-station (as shown in FIG. 14).

Table 6 (and FIG. 11B) shows an example for such multiplexing of physical channels. Here as well, the selection of precoder type is per resource element. User-specific precoded data will typically share the resource element with multiple user devices. However, processing of data from a single user on a resource element, may also be done using a common precoder.

Table 6 shows uplink physical channels sharing example, using 3GPP terminology. The grid represents frequency and time resources (20×14). Italicized and commonly grayscale-coded entries represent common precoding and un-italicized and commonly grayscale-coded entries represent user-specific precoding. Rows 1-4 represent user-specific uplink data transmissions (PUSCH) with demodulation reference signals (DMRS) from multiple user devices, to be processed with user-specific precoders. Rows 5-8 represents common uplink control channel transmissions (PUCCH), to be processed with a common precoder. Rows 9-12 represents common uplink random access channel transmissions (PRACH), to be processed with a common precoder. Rows 13-16 represent user-specific uplink data transmissions (PUSCH) with demodulation reference signals (DMRS) from multiple user devices, to be processed with user-specific precoders, except for the last column, which has common sounding reference signals (SRS), which may be processed with a common precoder. Rows 17-20 has a single user-specific data transmission with demodulation reference signals, which may be processed with a common precoder or with a user-specific precoder.

TABLE 6

Example of sharing uplink physical channels

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | PUSCH | PUSCH | DMRS | PUSCH | PUSCH | PUSCH | PUSCH | DMRS | PUSCH | PUSCH | PUSCH | PUSCH | PUSCH | PUSCH |
| 2 | PUSCH | PUSCH | DMRS | PUSCH | PUSCH | PUSCH | PUSCH | DMRS | PUSCH | PUSCH | PUSCH | PUSCH | PUSCH | PUSCH |
| 3 | ... | ... | ... | ... | ... | ... | ... | ... | ... | ... | ... | ... | ... | ... |
| 4 | PUSCH | PUSCH | DMRS | PUSCH | PUSCH | PUSCH | PUSCH | DMRS | PUSCH | PUSCH | PUSCH | PUSCH | PUSCH | PUSCH |
| 5 | PUCCH | PUCCH | PUCCH | PUCCH | PUCCH | PUCCH | PUCCH | PUCCH | PUCCH | PUCCH | PUCCH | PUCCH | PUCCH | PUCCH |
| 6 | PUCCH | PUCCH | PUCCH | PUCCH | PUCCH | PUCCH | PUCCH | PUCCH | PUCCH | PUCCH | PUCCH | PUCCH | PUCCH | PUCCH |

TABLE 6-continued

Example of sharing uplink physical channels

|    | 1 | 2 | 3 | 4 | 5 | 6 | 7 | 8 | 9 | 10 | 11 | 12 | 13 | 14 |
|----|---|---|---|---|---|---|---|---|---|----|----|----|----|----|
| 7  | ... | ... | ... | ... | ... | ... | ... | ... | ... | ... | ... | ... | ... | ... |
| 8  | PUCCH | PUCCH | PUCCH | PUCCH | PUCCH | PUCCH | PUCCH | PUCCH | PUCCH | PUCCH | PUCCH | PUCCH | PUCCH | PUCCH |
| 9  | PRACH | PRACH | PRACH | PRACH | PRACH | PRACH | PRACH | PRACH | PRACH | PRACH | PRACH | PRACH | PRACH | PRACH |
| 10 | PRACH | PRACH | PRACH | PRACH | PRACH | PRACH | PRACH | PRACH | PRACH | PRACH | PRACH | PRACH | PRACH | PRACH |
| 11 | ... | ... | ... | ... | ... | ... | ... | ... | ... | ... | ... | ... | ... | ... |
| 12 | PRACH | PRACH | PRACH | PRACH | PRACH | PRACH | PRACH | PRACH | PRACH | PRACH | PRACH | PRACH | PRACH | PRACH |
| 13 | PUSCH | PUSCH | DMRS | PUSCH | PUSCH | PUSCH | PUSCH | DMRS | PUSCH | PUSCH | PUSCH | PUSCH | PUSCH | SRS |
| 14 | PUSCH | PUSCH | DMRS | PUSCH | PUSCH | PUSCH | PUSCH | DMRS | PUSCH | PUSCH | PUSCH | PUSCH | PUSCH | SRS |
| 15 | ... | ... | ... | ... | ... | ... | ... | ... | ... | ... | ... | ... | ... | ... |
| 16 | PUSCH | PUSCH | DMRS | PUSCH | PUSCH | PUSCH | PUSCH | DMRS | PUSCH | PUSCH | PUSCH | PUSCH | PUSCH | SRS |
| 17 | PUSCH | PUSCH | DMRS | PUSCH | PUSCH | PUSCH | PUSCH | DMRS | PUSCH | PUSCH | PUSCH | PUSCH | PUSCH | PUSCH |
| 18 | PUSCH | PUSCH | DMRS | PUSCH | PUSCH | PUSCH | PUSCH | DMRS | PUSCH | PUSCH | PUSCH | PUSCH | PUSCH | PUSCH |
| 19 | ... | ... | ... | ... | ... | ... | ... | ... | ... | ... | ... | ... | ... | ... |
| 20 | PUSCH | PUSCH | DMRS | PUSCH | PUSCH | PUSCH | PUSCH | DMRS | PUSCH | PUSCH | PUSCH | PUSCH | PUSCH | PUSCH |

6.5 Examples of Initial Procedures

Herein, the procedures required for a user device to transmit/receive data on a shared spectrum are described. Before that, the base-station may schedule the user to transmit/receive as a single user device without any spectral sharing.

An example procedure may be as follows:
1. User device transmits uplink reference signals. These reference signals may be dedicated for channel sounding or may be a part of an uplink data transmission. For example, SRS or uplink DMRS in LTE/5G NR.
2. The base station may compute from received reference signals, an uplink channel response, $H^i(l, f, t)$.
3. The base station may compute a spatial covariance matrix $R_i$ of dimensions L×L. There are different methods for computing this covariance matrix. For example, averaging out across $N_f$ tones and $N_t$ time samples rank-1 covariance matrices, directly computed from the channel response:

$$R_i = \frac{1}{N_f N_t} \sum_{f,t} H^i(l, f, t) \cdot (H^i(l, f, t))^H.$$

Herein, (•) H is the Hermitian conjugate operation. Other more advanced techniques to compute $R_i$, such as Maximum Likelihood or parameterized covariance construction may also be applied.

4. The base station may detect main angle of arrival (AOA) of the radiation waves. The concept of main AOA assumes that the wireless channel reflections are typically coming in some angular spread around a main angle. This step is useful for scheduling users that have some angular separation. Different techniques may be used for computing the main AOA. For example, transforming the spatial channel response to the angular domain and detecting the angle with the highest energy. Alternatively, more sophisticated techniques that detect the angles of the reflectors, such as L−1 minimization and Maximum Likelihood may also be applied. If a user does not have a distinguish main AOA, such in some cases of complete Non-Line-Of-Sight (NLOS), or very large angular spread, the base-station may decide to keep this user device as a single user and not share the spectrum for it with other devices.
5. Once the base-station computed the spatial covariance matrix and the main AOA for a user device, it is ready for scheduling of spectral sharing uplink or downlink transmissions. Note, that both these measurements are robust and not very sensitive to mobility, as they rely solely on the geometry of the channel, which typically changes slowly. The base-station may refresh and update these metrics, based on the channel conditions and/or a rate of change of channel conditions.

6.6 Examples of Scheduling

Figure 12:
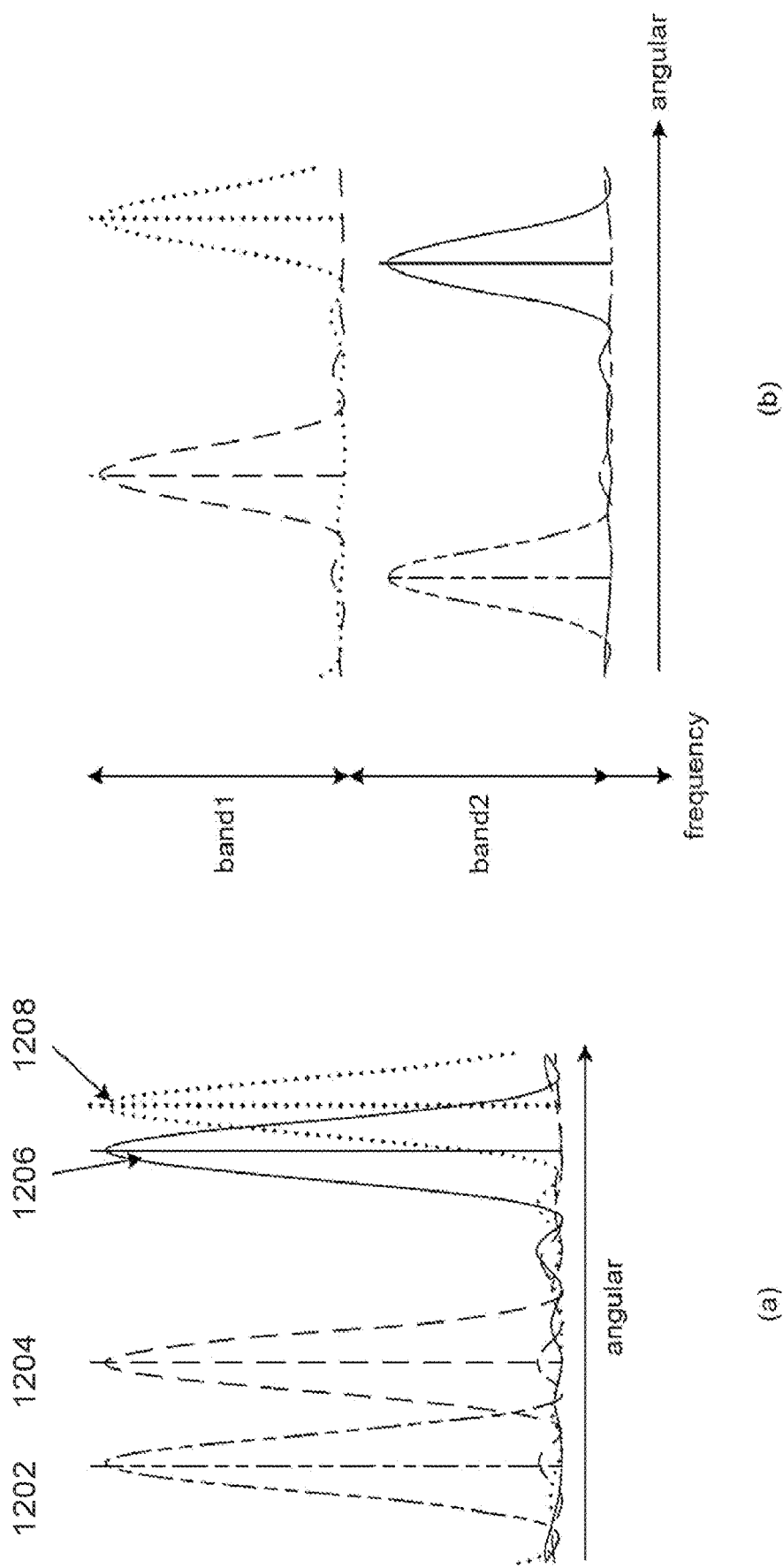
FIG. 12 shows an example of two-dimensional scheduling.

For spectral sharing wireless systems, the scheduling algorithm needs to take into consideration, on top of the standard metrics such as traffic requirements (throughput, latency, etc.) and channel conditions (frequency response, SINR, etc.), also the angular separation of the users. The minimum angular separation is a function of the number of base-station antennas, beam structure and required SINR. For a set of users that needs to be scheduled for a downlink or uplink transmission in a specific time frame, the scheduling algorithm needs to allocate user devices on a two-dimensional plane of frequency and angle. Using the detected main AOA, the scheduling algorithm selects user devices with enough angular separation to minimize the cross-interference between all the user devices sharing the same frequency and time resources elements. FIG. 12 shows an example of such scheduling for 4 user devices. The beam patterns 1202, 1204, 1206 and 1208 represent four UEs, plotted along the angular axis in the horizontal direction. On the right, one possible method of separating these transmissions includes using time/frequency locations for 1204 and 1208 that are separated in angular domain, and similarly combining 1202, 1206 transmission to occur at same time/frequencies.

6.7 Examples of Precoder Computations

Once a set of user devices is selected for a spectral sharing transmission, the base-station can compute from their covariance matrices, the precoders to be applied to either the downlink transmission, or the uplink reception. A precoder may be computed as a vector that maximizes some criterion, typically SINR related.

In its general form, the precoder may satisfy the following conditions:
A. Maximizing the signal energy in some angular sector. This focuses the energy toward the main AOA of the targeted user device.
B. Minimizing the signal energy in some angular sectors. This reduces the interference towards the other user devices sharing the spectrum.
C. Minimizing the signal energy compared to a reference beam in some angular sector. This shapes the beam to match a reference beam (which will typically be the beam of the common precoder).

In the downlink, the energy of the precoders may also be scaled by some power allocation, to further control the receive SINR of each user device, as described in the previous sections.

As an example, precoder computation for 2 user devices may consist of computing a precoder for the first user device as a vector that maximizes the signal energy at the main AOA of the first user device, while minimizing the signal energy at the direction of the main AOA of the second user device, and computing a precoder for the second user device, as a vector that maximizes the signal energy at the main AOA of the second user device, while minimizing the signal energy at the direction of the main AOA of the first user device.

6.8 Examples of Precoding in FDD

The computation of the precoder is based on uplink channel measurements only. In general, the computed precoders are correct for the uplink frequency and should only be applied to the uplink reception. In FDD, for the downlink, the computed precoders should be scaled up or down by the ratio of the downlink to uplink frequencies.

The equations below explain the scaling procedure for a linear antenna array with antenna spacing of $\Delta x$. Let $P_{UL}$ be a computed precoder vector and let $\alpha = f_{DL}/f_{UL}$ be the frequencies ratio. The continuous spatial function of the uplink precoder may be expressed as:

$$\tilde{P}_{UL}(x) = \sum_{l=1}^{L} P_{UL}(l) \cdot \text{sinc}\left(\frac{x - (l-1)}{\Delta x}\right).$$

The precoder vector for the downlink is obtained by sampling a continuous downlink precoder function, $\tilde{P}_{DL}(x)$, in the spatial domain, defined as a scaled version of $\tilde{P}_{UL}(x)$ by a factor of $\alpha$, i.e., $$\tilde{P}_{DL}(x) = P_{UL}(\alpha x) = \sum_{l=1}^{L} P_{UL}(l) \cdot \text{sinc}\left(\frac{\alpha x - (l-1)}{\Delta x}\right).$$

Herein, the discrete precoder vector for the downlink is:

$$P_{DL}(l) = P_{DL}(x)|_{x=(l-1)\Delta x}.$$

Herein, $l=1, \ldots, L$. Note that this scaling operation may also be implemented as a resampling operation of the uplink precoder vector by a factor of $\alpha^{-1}$.

Alternatively, for some methods of parameterized construction of the covariance matrix $R_i$, the detected main AOA may be scaled by a factor of $\alpha$, generating a scaled covariance matrix adapted for the downlink frequency and no further scaling of the precoder vector is required.

Figure 15A:
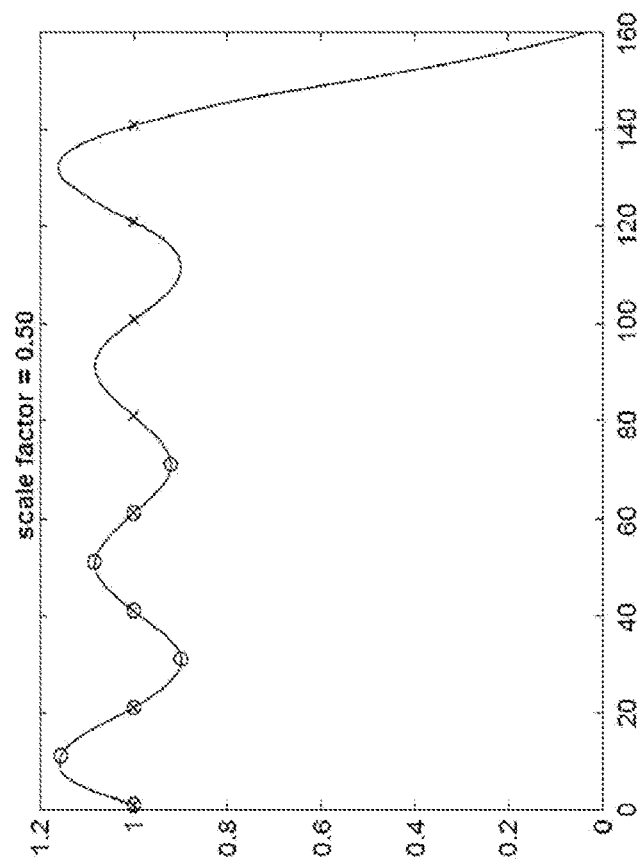
FIGS. 15A and 15B show examples of scaling operations with scale factors 0.5 and 2.0, respectively.

FIG. 15A shows a scaling example in which scale factor is 0.5. In FIG. 15A, original estimated channel response is shown by X marks. This represents, for example, results of measurements performed on the uplink signals. The circle samples represent resulting scaled response derived according to the three equations above.

Figure 15B:
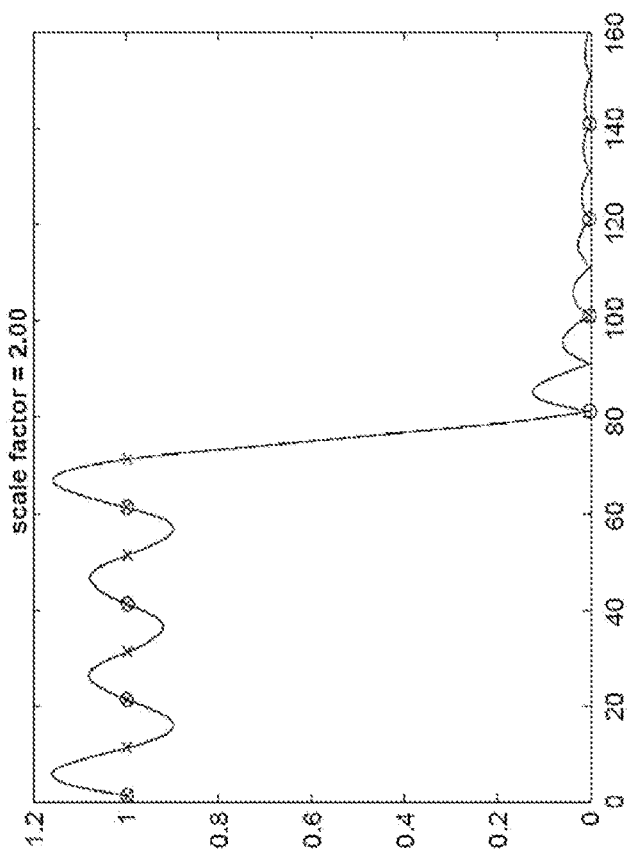

FIG. 15B shows another example in which the scale factor is 2. While the examples in FIGS. 15A and 15B are relatively simple scale factors, they are included to further explain the concept of scaling operation disclosed in the present document.

6.9 Examples of Pre-Compensation

Figure 13:
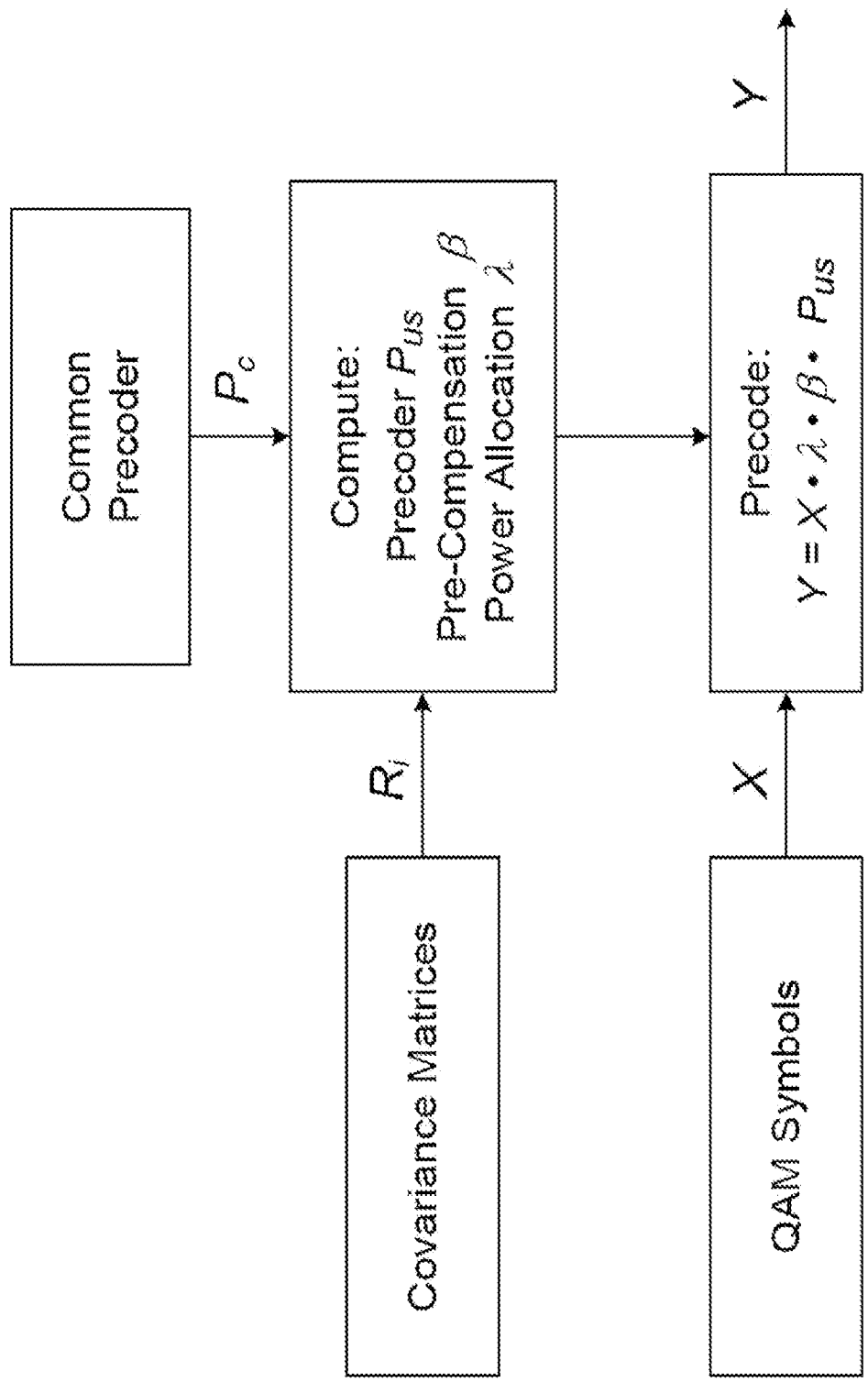
FIG. 13 shows an example of a pre-compensation operation.

To support legacy user devices, which do not support precoded reference signals, pre-compensation of their precoded QAM symbols should be performed. The pre-compensation factor scales all precoded QAM symbols of the user-specific data stream that is transmitted to that user device in the downlink, as illustrated in FIG. 13. The purpose of the pre-compensation factor is to compensate for the difference in the channel response between the user-specific precoder and the common precoder. This way, the receiving device, receives a user-specific precoded transmission with a channel response that is like the common precoded channel response. Then, the user-device may equalize its user-specific data transmission with reference signals that were transmitted while using the common precoder.

In FIG. 13, the covariance matrices and the common precoder are used for computing the user-specific precoder vectors P_us, the power allocation $\lambda$ and the pre-compensation $\beta$. Then, each QAM (or QPSK) symbol, X, for that user-specific stream is scaled by $\lambda$ and $\beta$ and then multiply by the precoder. The output is the scaled and precoded vector Y.

For example, in LTE, legacy devices may only support transmission mode 1 (TM1) and are not designed to receive multi-user transmissions or to use precoded reference signals for equalization (DMRS). The only available reference signals for equalization of PDSCH data are the cell-reference signals (CRS). In a spectral sharing system, as described in this document, CRS may be precoded with a common precoder and multiple PDSCH transmissions may be precoded with user-specific precoders, sharing the same spectrum. Due to the pre-compensation of the QAM symbols, a user device will receive both CRS and PDSCH with the same channel response and will be able to equalize it and decode it.

6.10 Examples of Base Station Architectures

The spectral sharing system, may be implemented at the base-station with independent parallel receivers/transmitters, as shown in FIG. 14. No joint processing in required in the receivers or transmitters to cancel out cross-interference between the users. Only the computation of precoders takes into consideration, the different users sharing the spectrum.

As shown in FIG. 14, signals to/from the antenna array that is used for transmission or reception of signals may be processed as follows. An uplink receiver circuit may receive signals from antenna arrays. The reference signal portion may be passed to a reference signal processing system that performs the covariance computation and angle of arrival computations. The results of these computations are provided to a scheduler and/or a precoder/power allocator for future use. The user-specific signals may be passed through postcoders Pc, Pus, 1 . . . Pus,N for N user devices and corresponded post-processed signal may be used for data receiver be a receiver that performs demodulation/error correction coding and so on.

On the transmit-side, streams for each user device may be passed through the pre-coder and through downlink transmission circuitry and applied to the antenna array for transmission in the downlink direction.

6.11 Examples of Extensions to Multi-Layer Communication

The scheme described in the previous subsections, can be easily extended from single polarization antennas to dual polarization antennas. Each one of the L base station antennas may be a dual polarization antenna and the user device may have a dual polarization antenna as well. With this configuration, it is possible to transmit two independent data streams (or layers) from the base-station to a user device and from a user device to the base-station. Each dual polarization antenna at the base station forms a 2×2 link with the dual polarization antenna at the user device, as seen in FIG. 16. Both dual polarization antennas may use the same exact precoders. The covariance matrices, used for precoders' computation, may be derived from the uplink channel response of any of the dual polarization antennas, or both.

FIG. 16 shows an example of a dual polarization link between a base-station and a user device (UE). The base-station's antennas in this example are on a linear antenna array on the left side, marked with 'X's and the user device is on the right. Each base-station's dual-polarization antenna forms a 2×2 link to the dual polarization antenna of the user device.

This multi-layer per use-device concept can be further extended to more than two layers, by using additional antenna arrays at the base station, spaced apart from each other and multiple dual polarization antennas at the user device, as seen in the example of FIG. 17.

FIG. 17 shows a multi-layer per user device example. The base-station has 2 antenna arrays, each with L dual polarization antennas. The user device has 2 dual-polarization antennas. This is equivalent to L 4×4 links to the user device.

6.12 Examples of Extensions to Multiple Base Stations

The multi-layer scheme, as described above, can be implemented on separate base-stations spaced apart from each other. Each base-station may have one or more antenna arrays and the user device may have multiple antennas. The transmission/reception of each base-station may be independent of the other base-stations or coordinated using a side-link.

7. Examples of Operational Advantages of the Described Techniques

The various techniques described throughout the present document provide several operational advantages by features that distinguish these techniques from conventional precoding technology and digital communication systems.

For example, in one advantageous aspect, the AOA may be measured based on any and all electromagnetic emissions from user device. For example, in various embodiments, reference signal transmissions or control signal transmissions (e.g., on uplink physical control channel PUCCH) or data transmissions (e.g., on uplink physical data transmission channel PUSCH) received at the network station may be processed for determining the AOA. Some example techniques have been described with reference to FIGS. 9, 10 and 11A.

In some embodiments, the network station may perform decomposition and separation to resolve multiple emitters and or reflections thereof. For example, a user device may include multiple antennas, each of which emits its own electromagnetic signal. The techniques described with reference to FIGS. 9 to 14 allow for estimation of AOA for each reflection of a signal transmitted by each user device.

In some embodiments, reliability of the measured AOA values can be improved by processing multiple measurements collected over a number of uplink transmissions by applying mathematical functions such as averaging or denoising or iterative filtering.

As described in the present document, the use of AOA estimates may be advantageously used for determining precoding and scheduling transmissions to and from user devices. Further, the angle accuracy may be improved by adapting and adjusting periodicity of uplink reference signals transmissions from user devices based on dynamic channel conditions. The network station may also adjust periodicity of the uplink reference signals according to available network bandwidth. The channel dynamics may be based on a measured user device mobility or reflectors/scatterer mobility or both. For example, in some embodiments, the network station may schedule user devices to send uplink reference signals such that the more mobile the channel is, the more frequent the uplink reference signals are sent to the network station. In some embodiments, for a particular wireless device that is in angular proximity of several other wireless devices, e.g., when a number of other wireless devices in a given angle period is greater than a threshold, a finer AOA measurement may be achieved by having the wireless device send uplink reference signal transmissions more frequently than in a situation when the wireless device does not have as many wireless devices in its angular proximity.

8. Examples of Methods and Implementations of the Disclosed Technology

In some embodiments, and in the context of at least Section 6, the following technical solutions use one or more of the techniques described herein.

1. A wireless communication system, comprising a network station (e.g., 110 or 102), and multiple user devices (e.g., 120), wherein data transmissions over the same time and frequency resources are shared between multiple user devices, in downlink and/or uplink, using spatial user device separation that is dynamically computed by the network station, and where the network station derives spatial user device separation based on uplink channel measurements. For example, FIGS. 1A-1D illustrate examples of wireless communication systems.

2. The system of solution 1, wherein the uplink channel measurements are derived from uplink reference signals. For example. Sections 2 and 3 describe example techniques for performing uplink channel measurements 3. The system of any of solutions 1-2, wherein the network station derives the spatial user device separation in absence of feedback information about downlink channel measurements from the multiple user devices. As described throughout the document, the network station may only use uplink measurements and will not use or require any feedback messages from user devices regarding quality of downlink channel.

4. The system of any of solutions 1-3, wherein the downlink and uplink are frequency division duplexed. For example, in LTE systems, two different frequency bands are used for uplink and downlink transmissions.

5. The system of any of solutions 1-4, wherein the data transmissions between the network station and the multiple user devices use dual polarization antennas. Section 6.11 describes additional examples.

6. The system of any of solutions 1-5, wherein the network station comprises L dual polarization antennas and a user device comprises at least one dual polarization antenna, and wherein data transmissions are performed on L 2×2 link between each of the L dual polarization antennas and the at least one dual polarization antenna, wherein L is an integer. Section 6.11 describes additional examples of multiple dual polarization antenna configurations.

7. The system of solutions 1-6, wherein the system is a Long Term Evolution (LTE) or a Fifth Generation New Radio (5G NR) system and the reference signals are sounding reference signals or demodulation reference signals. As described in the present document, the disclosed techniques may be used in the legacy LTE or in the upcoming 5G wireless systems.

8. The system of any of solutions 2-7, wherein the uplink reference signals are received by the network station according to a schedule of uplink reference signal transmissions that is generated by the network station and communicated to the multiple user devices.

9. The system of solution 8, wherein the schedule is configured to cause different mobile devices to perform uplink reference signal transmissions at different occurrence frequencies according to measured channel dynamics for the different mobile devices.

10. The system of any of solutions 1-9, wherein the dynamically computed spatial user device separation is computed using an angle of arrival (AOA) estimate for each user device, wherein the AOA estimate is computed for a given user device by averaging over multiple signal receptions from the given user device over different frequencies or at different times.

With reference to the above-listed solutions, in some embodiments, only uplink channel measurements are used to determine spatial separation of different user devices and thus applying a precoding for downlink signal transmissions. Such a scheme may be implemented in an FDD or a TDD system. Additional implementation examples are provided in Section 6.

Figure 18:
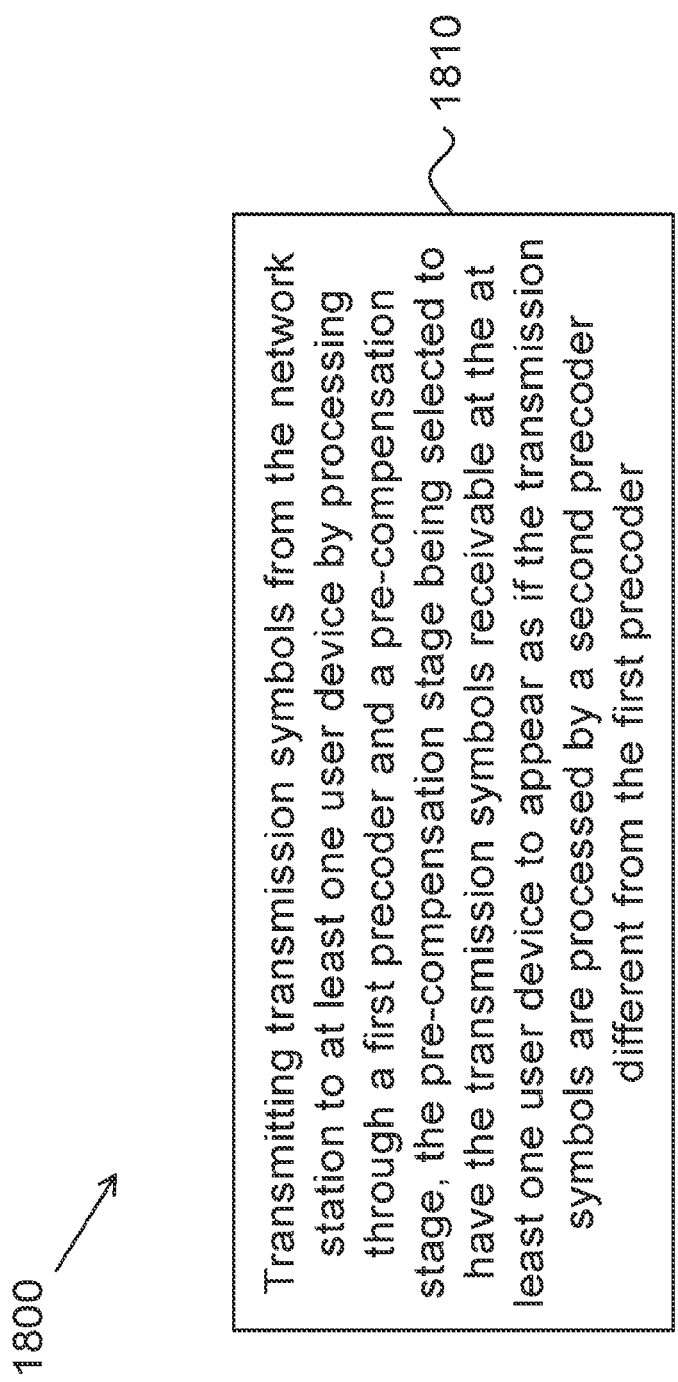

11. A method of wireless communication (e.g., method 1800 shown in FIG. 18), implemented by a network station in a wireless system comprising the network station and multiple user devices, comprising transmitting (1810) transmission symbols from the network station to at least one user device by processing through a first precoder and a pre-compensation stage, wherein the pre-compensation stage is selected to have the transmission symbols receivable at the at least one user device to appear as if the transmission symbols are processed by a second precoder different from the first precoder. Some examples are disclosed in Section 6.

12. The method of solution 11, wherein the first precoder is a user device-specific precoder and the second precoder is a common precoder. Section 6 provides examples of a common precoder and a user device-specific precoder.

13. The method of solution 12, wherein the second precoder is approximately an isotropic precoder. For example, the precoder may be nominally designed to be isotropic, or to have equal magnitude in all directions. However, due to practical considerations, directionality may vary by a few dBs (e.g., within +/−0.5 dB flatness).

14. The method of any of solutions 11-14, wherein the transmission symbols are transmitted using dual polarization antennas. Section 6.11 describes additional examples of dual polarization.

15. The method of any of solutions 11-14, comprising determining the first precoder based on reference signal transmissions received from the at least one user device.

16. The method of solution 15, wherein the determining the first precoder is performed by estimating an angle of arrival estimate (AOA) from the at least one user device, wherein the AOA estimate is processed over one or more received transmissions from the at least one user device, wherein the multiple received transmissions include reference signal transmissions and/or other control transmissions and/or data transmissions.

17. A method of wireless communication (e.g., method 1900 shown in FIG. 19), comprising determining (1910), by a first wireless device, a second wireless device specific first precoder used for precoding transmissions, wherein the first precoder is determined to match a second precoder at a specific angular sector, and wherein the first precoder is determined based on channel measurements of transmissions from the second wireless device to the first wireless device. Here, depending on channel directionality, the first and the second wireless devices may be network station and/or user devices.

18. The method of solution 17, further including performing, a transmission from the first wireless device to the second wireless device using the first precoder for precoding the transmission. For example, the first precoder may be a downlink channel precoder at a different frequency than uplink, and may have been completely derived from uplink signal measurements, as is described throughout the document.

19. The method of any of solutions 17-18, further including performing, a reception by the first wireless device from the second wireless device using the first precoder for post-coding the transmission. As described, for example with respect to FIG. 14, a post-coder may be used for processing received signals.

20. The method of any of solutions 17-19, wherein the transmission is directed to the specific angular sector. For example, Section 6 and FIG. 10 describe examples of using angular beams in which a specific angular sector is covered by wireless transmissions (or receptions).

21. The method of any of solutions 17-20, wherein the second precoder is approximately an isotropic precoder. As previously discussed, due to practical considerations such as device geometries and non-linearities, angular response flatness, which is ideally identical, may vary within a tolerance such as +/−0.5 db.

22. The method of any of solutions 17-21, wherein the first wireless device is a base station and the second wireless device is a user device.

23. The method of any of solutions 17-22, wherein the first wireless device is a user device and the second wireless device is a base station.

24. The method of any of solutions 18-24, wherein the first precoder is completely determined from channel measurements of transmissions from the second wireless device to the first wireless device. Section 6, for example, discloses techniques for determining a precoder by only relying on measurements on the uplink signals.

25. The method of solution 17, wherein the first precoder is determined by performing a scaling operation on a result of channel measurements of transmissions from the second wireless device to the first wireless device. For example, Section 6 describes some examples of scaling operations.

26. The method of any of solutions 17-25, comprising determining the first precoder based on reference signal transmissions received from the at least one user device.

27. The method of solution 26, wherein the determining the first precoder is performed by estimating an angle of arrival estimate (AOA) from the at least one user device, wherein the AOA estimate is processed over one or more received transmissions from the at least one user device, wherein the multiple received transmissions include reference signal transmissions and/or other control transmissions and/or data transmissions.

Figure 20:
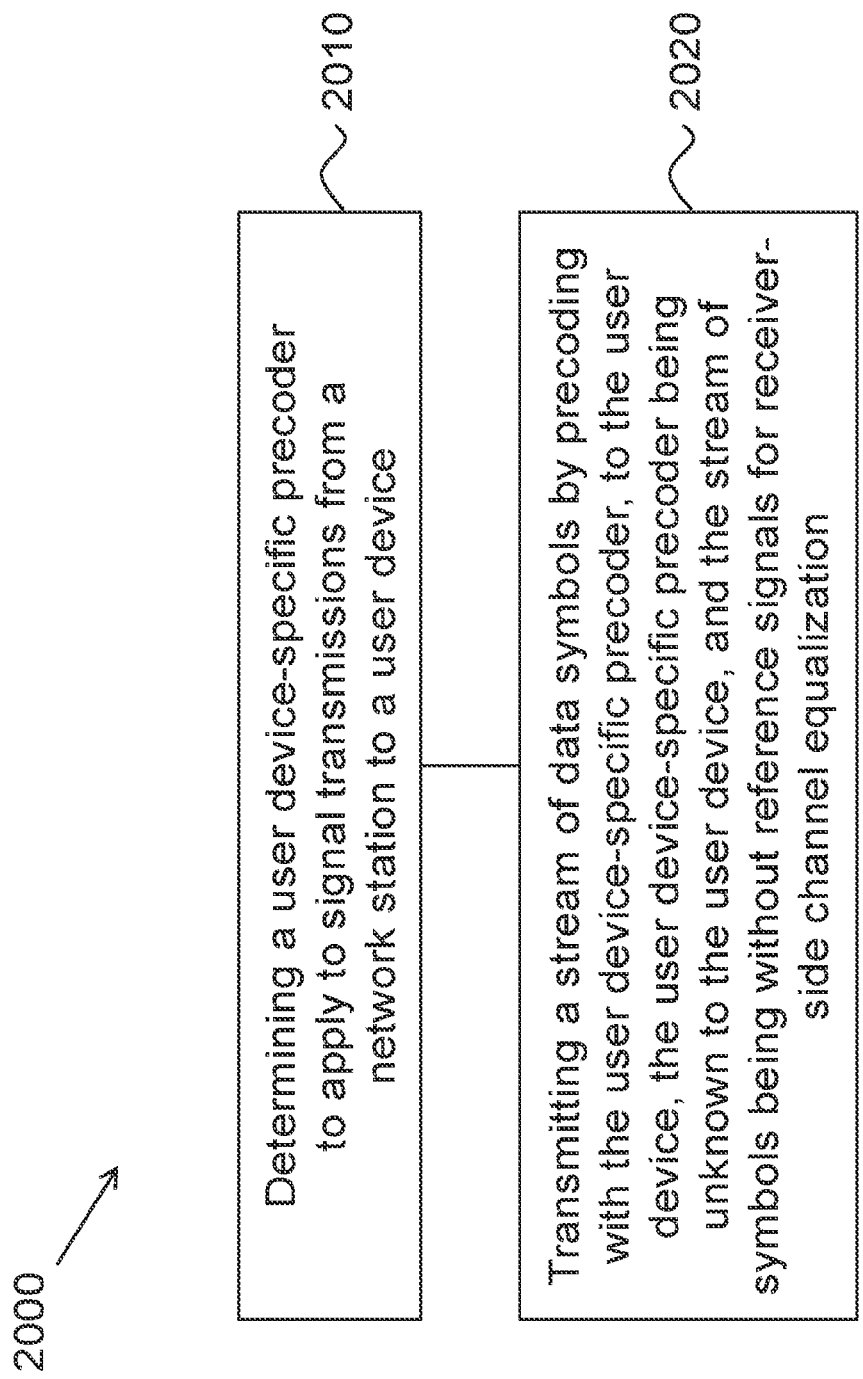

28. A method of wireless communication (e.g., method 2000 shown in FIG. 20), comprising determining (2010) a user device-specific precoder to apply to signal transmissions from a network station to a user device, and transmitting (2020) a stream of data symbols by precoding with the user device-specific precoder, to the user device, wherein the user device-specific precoder is unknown to the user device, and wherein the stream of symbols is without reference signals for receiver-side channel equalization. Some example ways by which this method can be implemented are described in Sections 2 and 6. For example, the user-device specific precoder is not known to the user device because the network station is able to completely determine this decoder from uplink channel measurements and without the user device needing to perform downlink calculations or providing a feedback signal to the network station.

29. The method of solution 28, wherein the user device-specific precoder is not signaled from a codebook that can be search by the user device.

30. The method of any of solutions 28-29, wherein the determining the user device-specific precoder includes determining the user device-specific precoder entirely from measurements performed on transmissions from the user device, wherein the transmissions do not include feedback information regarding transmissions to the user device.

31. The method of any of solutions 28-30, wherein the network station is a Long Term Evolution (LTE) or a Fifth Generation New Radio (5G NR) base station and wherein the stream of symbols is a physical downlink shared channel (PDSCH) without any demodulation reference signal (DMRS).

Figure 21:
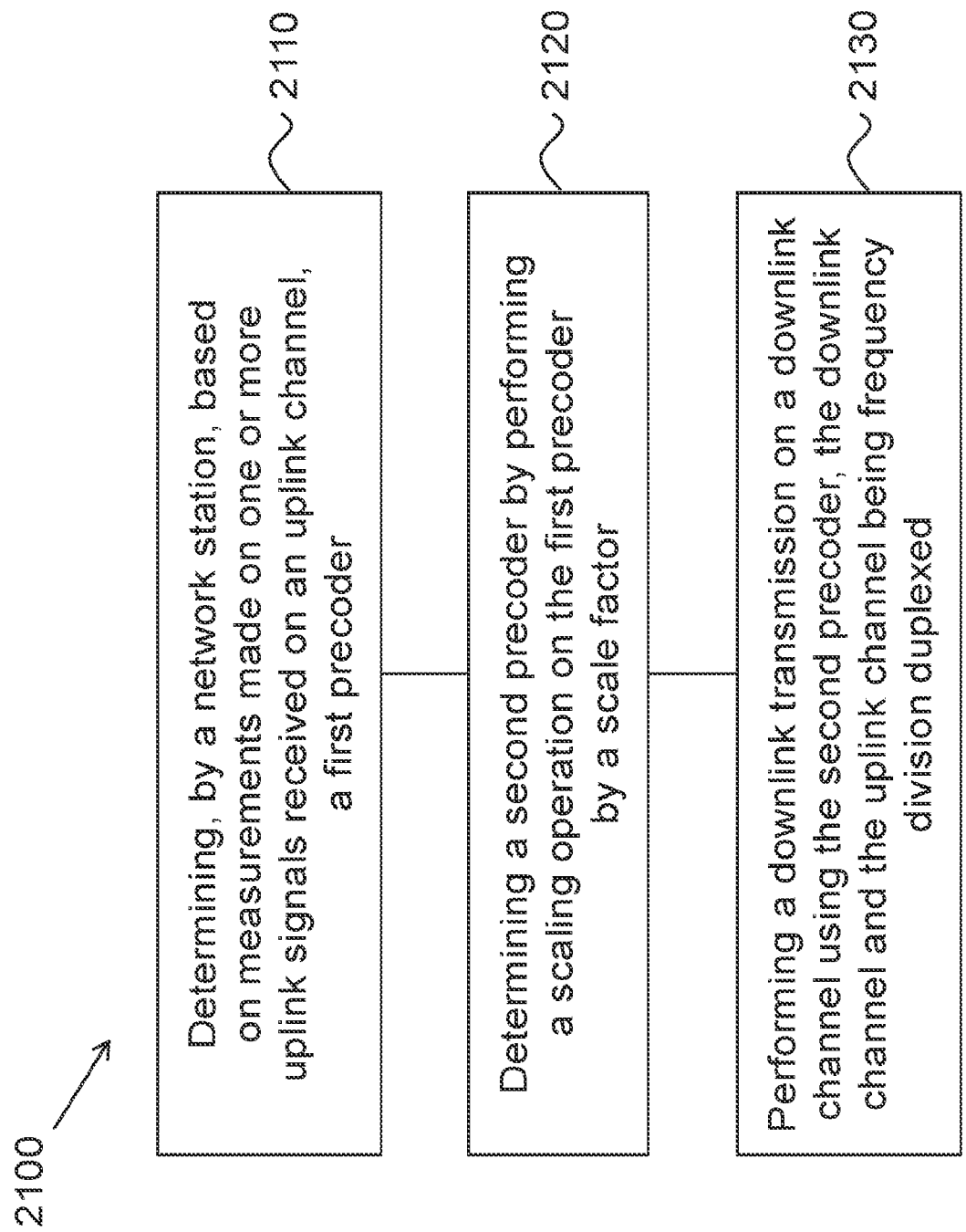

32. A method of wireless communication (e.g., method 2100 shown in FIG. 21), comprising determining (2110), by a network station, based on measurements made on one or more uplink signals received on an uplink channel, a first precoder, determining (2120) a second precoder by performing a scaling operation on the first precoder by a scale factor, and performing (2130) a downlink transmission on a downlink channel using the second precoder, wherein the downlink channel and the uplink channel are frequency division duplexed. Sections 5 and 6 describe some example techniques that can be used to implement this method.

33. The method of solution 32, wherein the scale factor is proportional to a frequency ratio of the downlink channel to the uplink channel.

34. The method of any of solutions 32-33, wherein the first precoder is determined from a spatial covariance matrix. Section 4 provides examples of spatial covariance matrix R_i and various ways for computing this matrix.

35. The method of any of solutions 32-34, wherein the determining the second precoder includes determining the second precoder in a different frequency band than a frequency band of the first precoder. Additional details are described with reference to Section 6.

36. The method of any of solutions 32-35, further including, performing another downlink transmission by precoding using a common precoder that is common to all user devices.

Figure 22:
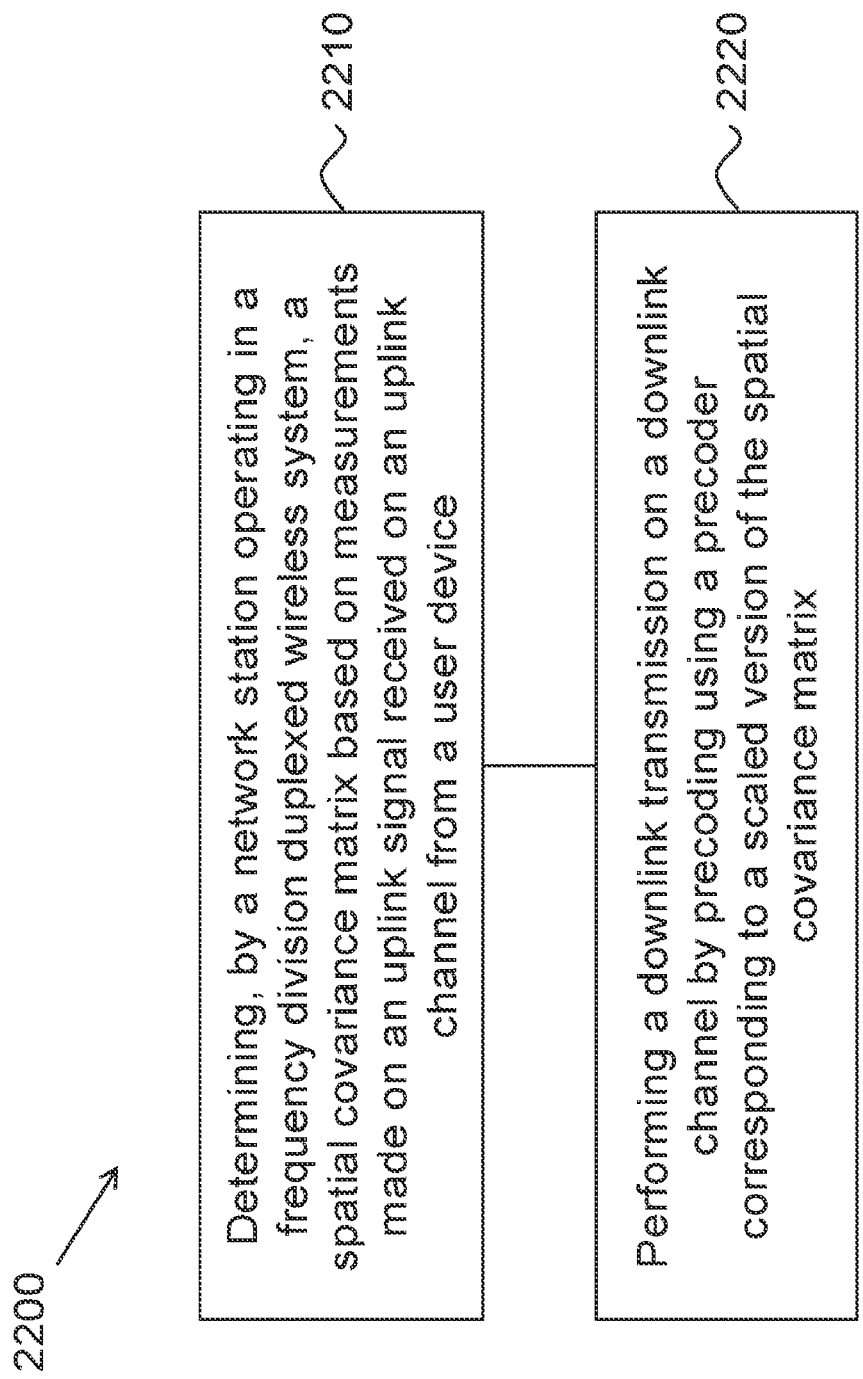

37. A method of wireless communication (e.g., method 2200 shown in FIG. 22), comprising determining (2210), by a network station operating in a frequency division duplexed wireless system, a spatial covariance matrix based on measurements made on an uplink signal received on an uplink channel from a user device, and performing (2220) a downlink transmission on a downlink channel by precoding using a precoder corresponding to a scaled version of the spatial covariance matrix. Some additional details and examples are described in Sections 5 and 6.

38. The method of solution 37, wherein spatial covariance matrix is scaled using a ratio between a downlink channel frequency and an uplink channel frequency.

39. The method of solution 37, wherein the spatial covariance matrix is determined by estimating a channel response matrix and determining the spatial covariance matrix from the channel response matrix.

40. The method of any of solutions 37-39, further comprising estimating a main angle of arrival (AOA) of the uplink signal, and using the main AOA in scheduling subsequent transmissions to the user device.

41. The method of any of solutions 37-40, wherein the spatial covariance matrix is determined from the main AOA.

42. The method of solution 37-41, wherein the main AOA is estimated to be an angle with a highest received energy.

43. The method of solution 40, wherein the scheduling allocates time and frequency resources to the subsequent transmissions by grouping the user device with other user devices having dissimilar main AOAs compared to the main AOA.

44. The method of any of solutions 40-43, wherein the estimating the main AOA includes improving accuracy by processing a number of AOA measurements over multiple transmissions of the uplink signal.

45. The method of solution 44, wherein the number of AOA measurements used for the estimating is proportional to a measured mobility of the user device.

46. The method of solution 45, wherein the network station controls a periodicity at which the user device performs uplink transmissions to be proportional to the measured mobility.

Figure 23:
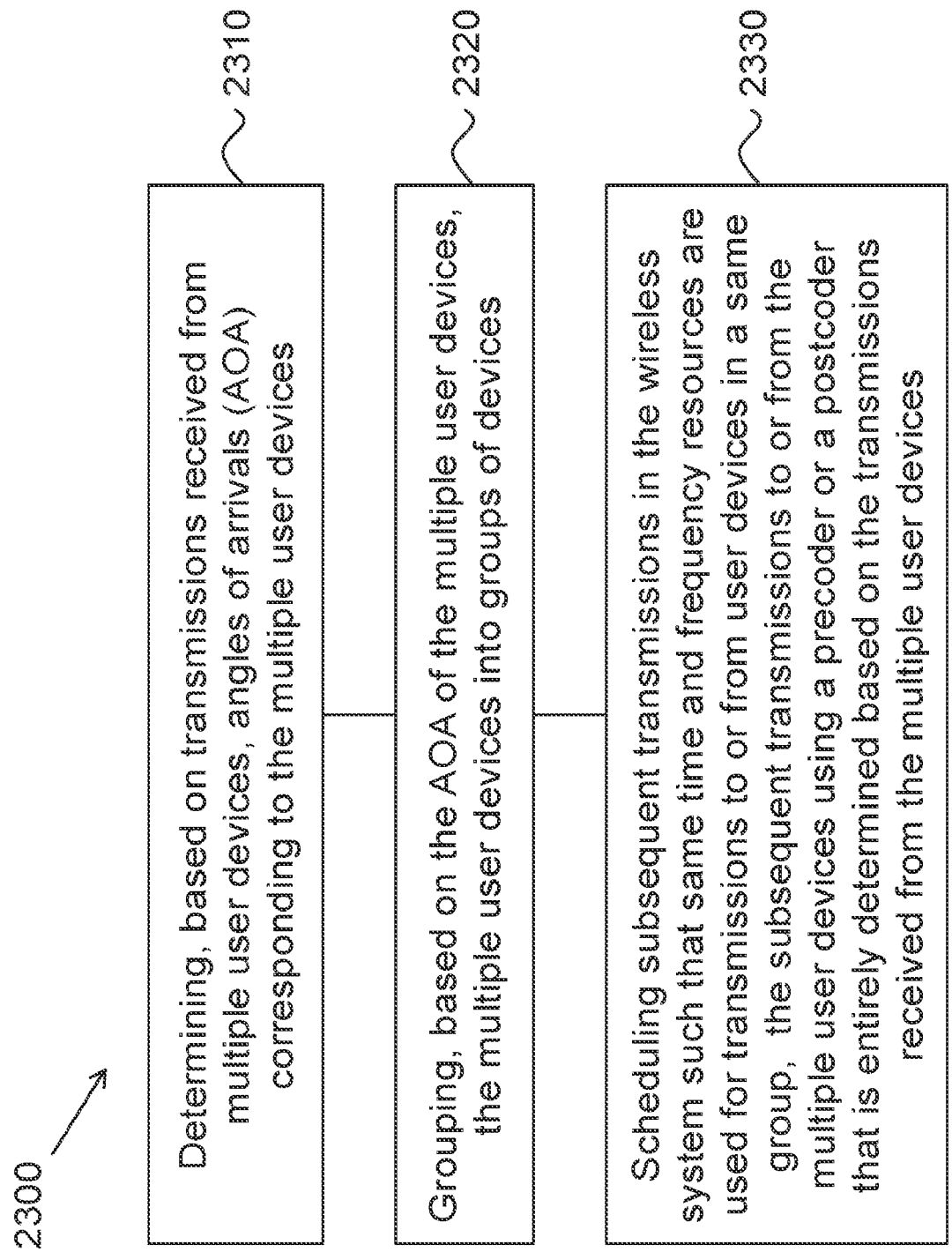

47. A method of wireless communication (e.g., method 2300 shown in FIG. 23), implemented by a network station in a wireless system, comprising determining (2310), based on transmissions received from multiple user devices, angles of arrivals (AOA) corresponding to the multiple user devices, grouping (2320), based on the AOA of the multiple user devices, the multiple user devices into groups of devices, and scheduling (2330) subsequent transmissions in the wireless system such that same time and frequency resources are used for transmissions to or from user devices in a same group, wherein the subsequent transmissions to or from the multiple user devices use a precoder or a postcoder that is entirely determined based on the transmissions received from the multiple user devices. Sections 4-5 and FIG. 14 provide some examples of this technique.

Figure 24:
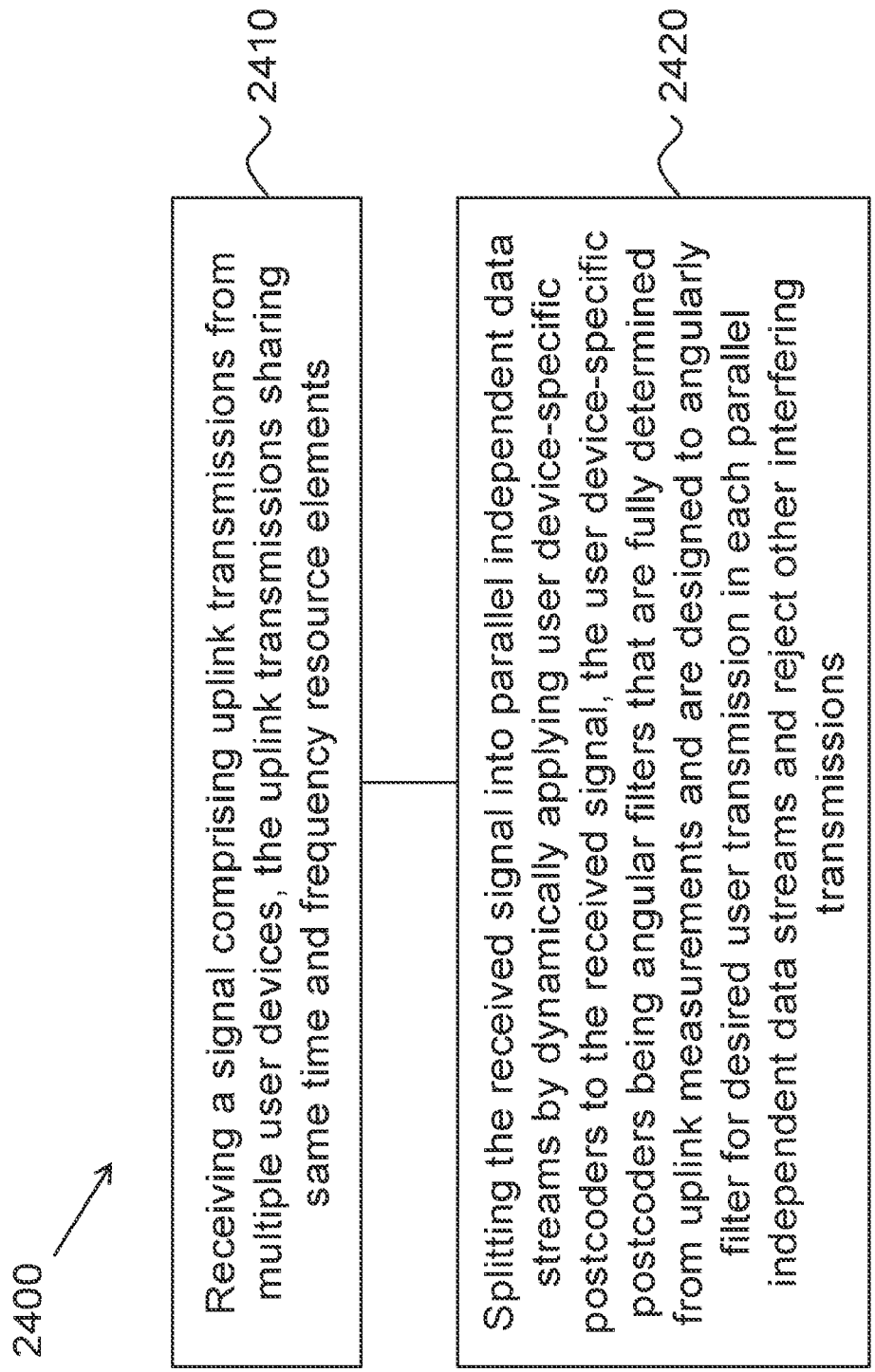

48. A method of wireless communication (e.g., method 2400 shown in FIG. 24), implemented by a network station of a wireless system, comprising receiving (2410) a signal comprising uplink transmissions from multiple user devices, wherein the uplink transmissions share same time and frequency resource elements, and splitting (2420) the received signal into parallel independent data streams by dynamically applying user device-specific postcoders to the received signal, wherein the user device-specific postcoders are angular filters that are fully determined from uplink measurements and are designed to angularly filter for desired user transmission in each parallel independent data streams and reject other interfering transmissions. Sections 4-5 and description referring to FIG. 14 describe some examples of this method.

Figure 25:
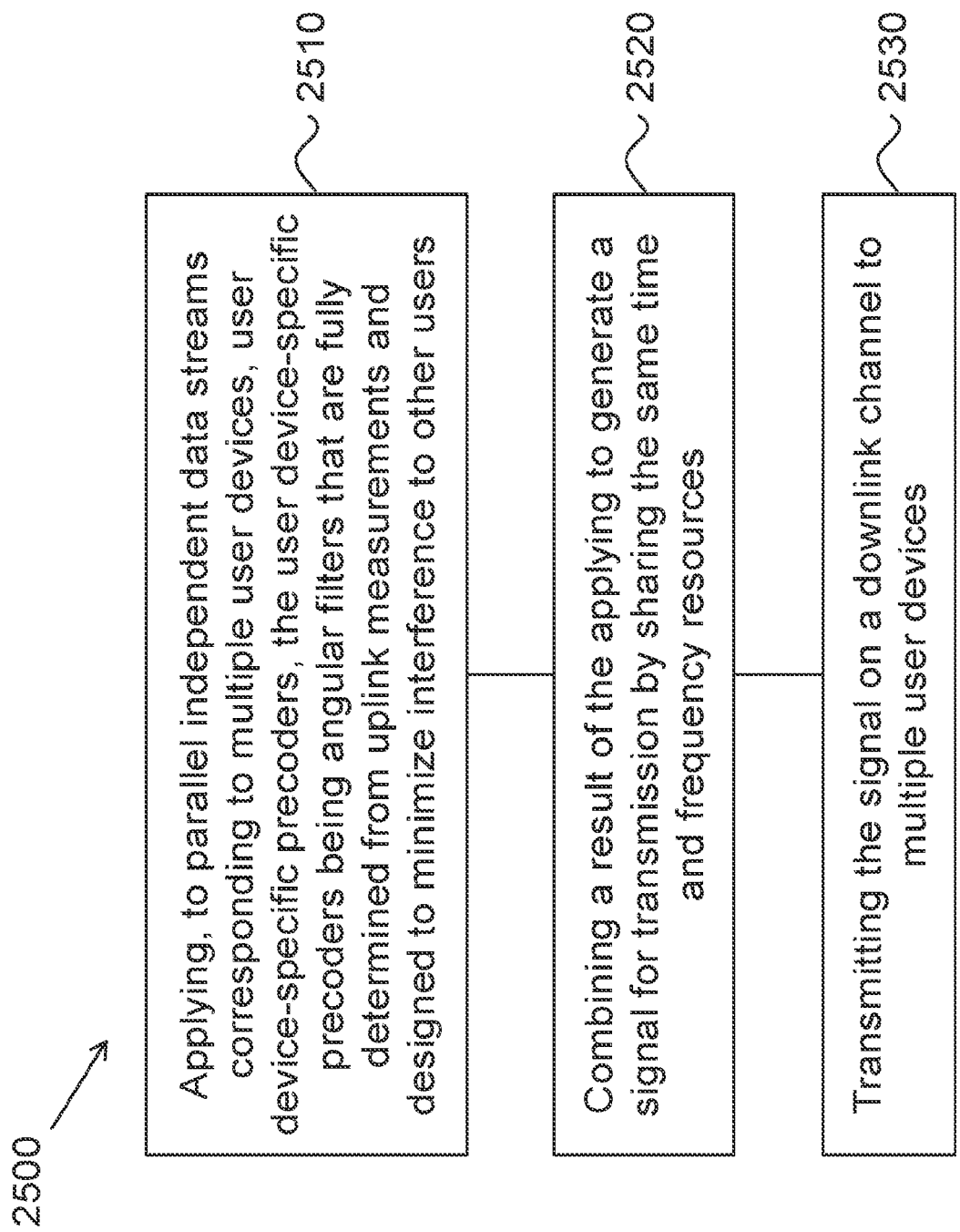

49. A method of wireless communication (e.g., method 2500 shown in FIG. 25), implemented by a network station of a wireless system, comprising applying (2510), to parallel independent data streams corresponding to multiple user devices, user device-specific precoders, combining (2520) a result of the applying to generate a signal for transmission by sharing the same time and frequency resources, and transmitting (2530) the signal on a downlink channel to multiple user devices, wherein the user device-specific precoders are angular filters that are fully determined from uplink measurements and designed to minimize interference to other users. Sections 4-5 and description referring to FIG. 14 describe some examples of this method.

50. The method of any of solutions 47-49, wherein the network station controls the multiple user devices to perform uplink transmissions of reference signals according to a measured channel dynamics of an uplink channel between each user device and the network station.

51. The method of any of solutions 47-50, wherein accuracy of measurements of the user-device specific precoders or the angles of arrivals is improved by averaging over a number of observations.

Figure 26:
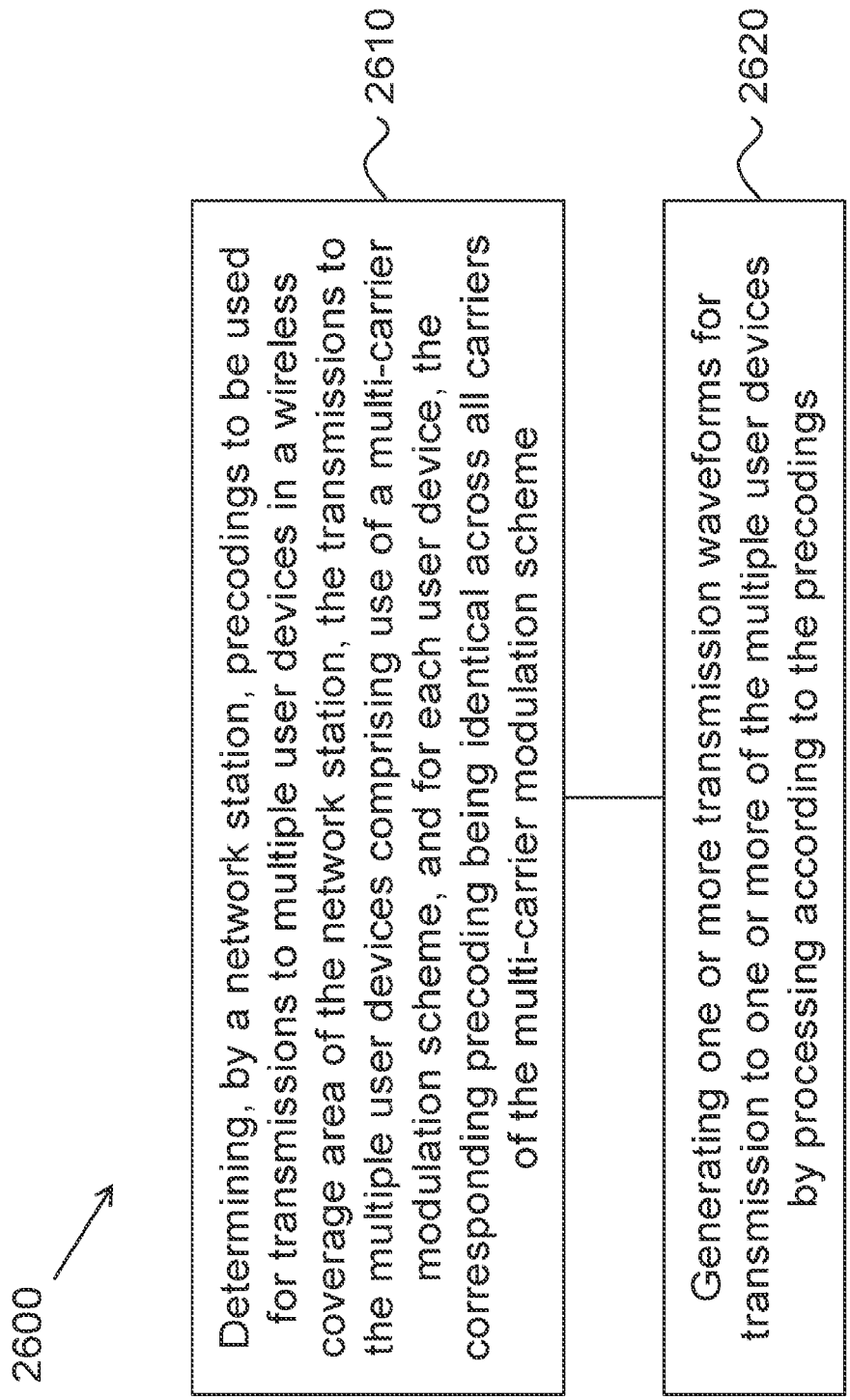

52. A method of wireless communication (e.g., method 2600 shown in FIG. 26), comprising determining (2610), by a network station, precodings to be used for transmissions to multiple user devices in a wireless coverage area of the network station, wherein the transmissions to the multiple user devices comprise use of a multi-carrier modulation scheme, and wherein, for each user device, the corresponding precoding is identical across all carriers of the multi-carrier modulation scheme, and generating (2620) one or more transmission waveforms for transmission to one or more of the multiple user devices by processing according to the precodings. Sections 4-5 and description referring to FIG. 14 describe some examples of this method. In some embodiments, the term "identical" may mean "same within a limit." For example, practical considerations related to implementations may impose a limit on how identical or flat the precoder can be. A tolerance of +/−0.5 dB may, for example, be observed, although the precoder may still be considered to be flat or identical across all subcarriers. Some implementations use a "zero forcing" technique in which certain unwanted subcarriers are "nulled out" by a precoder that exhibits a null (e.g., a 10 dB or 20 dB or greater attenuation at certain frequencies). However, in contrast to such a zero forcing technique, some embodiments of precoders that are "identical" across different carriers may avoid such zero-forcing attenuations at certain frequencies. In such cases, "identical" may simply mean that precoders may not attenuate any frequency more than a threshold amount compared to any other frequency in the transmission band. The threshold may be, for example, 0.5 dB or 3 dB or 6 dB, depending on characteristics of wireless channels and reflectors experienced by transmissions between user devices and the network device.

In the above-described solution, the multi-carrier modulation may correspond to the orthogonal time frequency space (OTFS) modulation or orthogonal frequency division multiplexing (OFDM) modulation in which multiple subcarriers or tones are individually modulated using quadrature phase shift keying (QPSK) or quadrature amplitude modulation QAM symbols.

53. The method of solution 52, wherein the precodings are spatial precodings determined based on estimated angles of arrival for the multiple user devices.

54. The method of any of solutions 52-53, wherein the one or more transmission waveforms to the one or more of the multiple user devices occupy overlapping time and frequency resources.

55. The method of any of solutions 52-54, wherein the one or more transmission waveforms to the one or more of the multiple user devices occupy same time and frequency resources.

56. The method of solution 52, wherein the corresponding precoding for each user device is calculated by estimating a single precoder across all carriers. Some examples are described in Sections 2-6 of the present document. For example, the equations in Section 6.4 through Section 6.8 disclose some example implementations of precoders.

57. A wireless communication apparatus comprising a processor and a wireless transceiver, wherein the processor is configured to perform a method recited in any of solutions 11 to 56 using the transceiver for transmitting or receiving signals.

It will be appreciated that techniques are disclosed that may be practiced in wireless systems by devices to precode transmissions to other devices in one direction based on transmissions received in a reverse direction and determination of channel state based on the received transmissions. In one advantageous aspect, this method avoids the overheads and operational inefficiencies associated with the use of codebooks or channel state feedback reporting.

Figure 27:
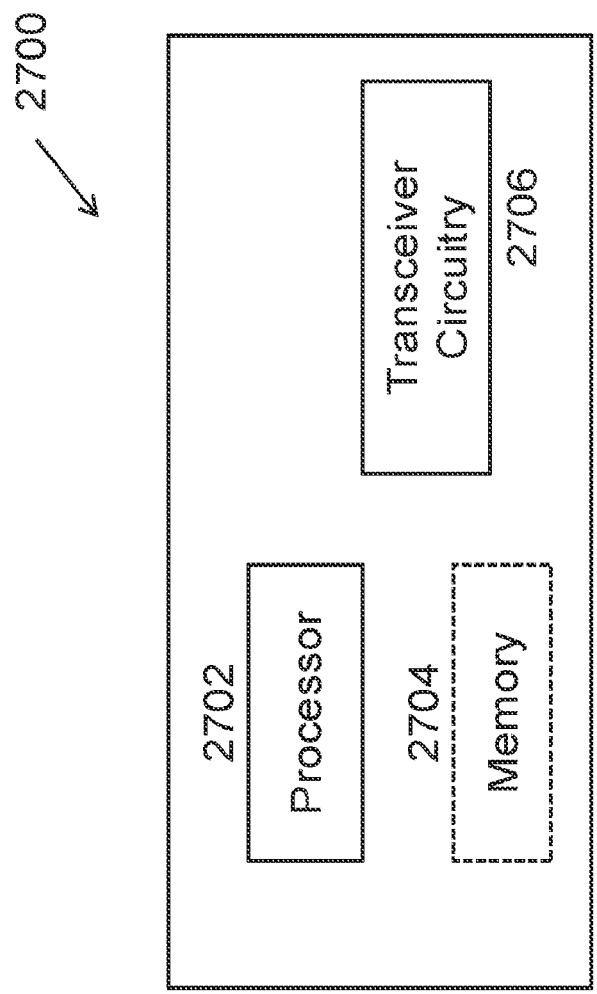
FIG. 27 shows an example of a wireless transceiver apparatus.

FIG. 27 shows an example of a wireless transceiver apparatus 2700. The apparatus 2700 may be used to implement the node or a UE or a network-side resource that implements channel estimation/prediction tasks. The apparatus 2700 includes a processor 2702, an optional memory (2704) and transceiver circuitry 2706. The processor 2702 may be configured to implement techniques described in the present document. For example, the processor 2702 may use the memory 2704 for storing code, data or intermediate results. Alternatively, the memory may be internal to the processor. The transceiver circuitry 2706 may perform tasks of transmitting or receiving signals. This may include, for example, data transmission/reception over a wireless link such as Wi-Fi, mmwave or another link, or a wired link such as a fiber optic link.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless communication, comprising:
   determining, by a first wireless device, a second wireless device specific first precoder used for precoding transmissions, wherein the first precoder is determined to match a second precoder at a specific angular sector, wherein the first precoder is determined based on channel measurements of transmissions from the second wireless device to the first wireless device, wherein the first precoder is determined by estimating an angle of arrival estimate (AOA) from at least one user device, wherein the AOA estimate is processed over one or more received transmissions from the at least one user device, and wherein multiple received transmissions include reference signal transmissions and/or other control transmissions and/or data transmissions;
   performing, a transmission from the first wireless device to the second wireless device using the first precoder for precoding the transmission; and
   performing, a reception by the first wireless device of a transmission from the second wireless device using the first precoder for post-coding the transmission.

2. The method of claim 1, wherein the transmission is directed to the specific angular sector.

3. The method of claim 1, wherein the second precoder is approximately an isotropic precoder.

4. The method of claim 1, wherein the first wireless device is a base station and the second wireless device is a user device.

5. The method of claim 1, wherein the first wireless device is a user device and the second wireless device is a base station.

6. The method of claim 1, wherein the first precoder is completely determined from channel measurements of transmissions from the second wireless device to the first wireless device.

7. The method of claim 1, wherein the first precoder is determined by performing a scaling operation on a result of channel measurements of transmissions from the second wireless device to the first wireless device.

8. The method of claim 1, comprising:
   determining the first precoder based on reference signal transmissions received from the second wireless device.

9. A first wireless device comprising one or more processors and a transceiver, wherein the one or more processors are configured to:
   determine, by the first wireless device, a second wireless device specific first precoder used for precoding transmissions, wherein the first precoder is determined to match a second precoder at a specific angular sector, wherein the first precoder is determined based on channel measurements of transmissions from the second wireless device to the first wireless device, wherein the first precoder is determined by estimating an angle of arrival estimate (AOA) from at least one user device, wherein the AOA estimate is processed over one or more received transmissions from the at least one user device, and wherein multiple received transmissions include reference signal transmissions and/or other control transmissions and/or data transmissions; and wherein the transceiver is configured to:

perform a transmission from the first wireless device to the second wireless device using the first precoder for precoding the transmission; and performing a reception by the first wireless device of a transmission from the second wireless device using the first precoder for post-coding the transmission.

10. The first wireless device of claim 9, wherein the second precoder is approximately an isotropic precoder.

11. The first wireless device of claim 9, wherein the first wireless device is a base station and the second wireless device is a user device.

12. The first wireless device of claim 9, wherein the first wireless device is a user device and the second wireless device is a base station.

13. The first wireless device of claim 9, wherein the first precoder is completely determined from channel measurements of transmissions from the second wireless device to the first wireless device.

14. The first wireless device of claim 9, wherein the first precoder is determined by performing a scaling operation on a result of channel measurements of transmissions from the second wireless device to the first wireless device.

15. The first wireless device of claim 9, wherein the one or more processors are configured to:

determine the first precoder based on reference signal transmissions received from the second wireless device.

* * * * *